US012692070B2

(12) United States Patent
Heggebø

(10) Patent No.:  US 12,692,070 B2
(45) Date of Patent:       Jul. 28, 2026

(54) CONTAINER HANDLING VEHICLE WHICH CAN LOAD AND/OR UNLOAD ITSELF

(71) Applicant: Autostore Technology AS, Nedre Vats (NO)

(72) Inventor: Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 403 days.

(21) Appl. No.: 17/924,918

(22) PCT Filed: May 18, 2021

(86) PCT No.: PCT/EP2021/063150
§ 371 (c)(1),
(2) Date: Nov. 11, 2022

(87) PCT Pub. No.: WO2021/239515
PCT Pub. Date: Dec. 2, 2021

(65) Prior Publication Data
US 2023/0183002 A1      Jun. 15, 2023

(30) Foreign Application Priority Data

May 25, 2020   (NO) .................................... 20200612
Nov. 30, 2020   (NO) .................................... 20201315

(51) Int. Cl.
*B65G 1/04*          (2006.01)

(52) U.S. Cl.
CPC .... *B65G 1/0464* (2013.01); *B65G 2201/0235* (2013.01)

(58) Field of Classification Search
CPC ...................... B65G 1/0464; B65G 2201/0235
(Continued)

(56) References Cited

U.S. PATENT DOCUMENTS 2,778,512 A * 1/1957 Strona ....................... B66C 1/24
                                                                      414/542
3,623,562 A * 11/1971 Pitra ......................... B60S 9/14
                                                                      180/200
(Continued)

FOREIGN PATENT DOCUMENTS

CN            106379681 A       2/2017
CN            111422547 A  *   7/2020   ........... B65G 1/0464
(Continued)

OTHER PUBLICATIONS

Coquau, Stephane, Office Action for European Patent Application No. EP21727817.5, dated Sep. 30, 2024, 5 pages, pub. by the EPO, Rijswijk Netherlands.
(Continued)

*Primary Examiner* — James Keenan
(74) *Attorney, Agent, or Firm* — Baker Botts L.L.P.

(57) ABSTRACT

A two-dimensional rail system includes a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction. The first and second sets of parallel rails form a grid which divides the rail system into a plurality of grid cells. A container handling vehicle for operation on the two-dimensional rail system includes a base, a support structure, a container, and a support surface. The base includes moving guides for the container handling vehicle along the rail system in the first direction and the second direction respectively. The support structure is provided on the base and extends from a lower section at the base to an upper section. The container lifting device includes a lifting frame for lifting a storage container up from a storage position below the rail system. The lifting
(Continued)

frame is suspended from a set of suspension points of the upper section of the support structure. The support surface supports the storage container and provides a first holding position arranged at a lower elevation than the lifting frame when the lifting frame is in a docked state adjacent the upper section of the support structure. The container handling vehicle includes a movement mechanism to translate horizontally the set of suspension points or the support surface with respect to the base, such that a lifted storage container can be placed on the support surface and the lifting frame disconnected from the lifted storage container.

29 Claims, 30 Drawing Sheets

(58) Field of Classification Search
USPC .......................... 180/199, 200; 414/542, 591
See application file for complete search history.

(56) References Cited

U.S. PATENT DOCUMENTS

| | | | | | |
|---|---|---|---|---|---|
| 5,211,523 | A | * | 5/1993 | Andrada Galan ...... | B60L 50/52 |
| | | | | | 414/280 |
| 6,666,643 | B1 | * | 12/2003 | Heynssens ............ | B60P 1/4435 |
| | | | | | 414/522 |
| 6,913,102 | B2 | * | 7/2005 | Sugata ................ | B66F 9/07568 |
| | | | | | 180/68.5 |
| 7,744,333 | B2 | * | 6/2010 | Chaddock ............. | B60P 1/6427 |
| | | | | | 414/498 |
| 8,554,643 | B2 | * | 10/2013 | Kortelainen ......... | B65G 1/0485 |
| | | | | | 414/280 |
| 11,370,643 | B2 | * | 6/2022 | Hasegawa ................. | B66F 9/10 |
| 11,530,120 | B2 | * | 12/2022 | Ueda .................... | B65G 1/0464 |
| 2003/0077159 | A1 | | 4/2003 | Iizuka | |
| 2015/0291357 | A1 | | 10/2015 | Razumov | |
| 2017/0121109 | A1 | | 5/2017 | Behling | |
| 2017/0260011 | A1 | | 9/2017 | Schoeppe et al. | |
| 2019/0322451 | A1 | | 10/2019 | Bastian, II et al. | |
| 2020/0307974 | A1 | | 10/2020 | Hasegawa et al. | |

FOREIGN PATENT DOCUMENTS

| | | | | |
|---|---|---|---|---|
| DE | 102020207852 | A1 | | 12/2021 |
| EP | 3192751 | A1 | | 7/2017 |
| EP | 3929107 | A1 | | 12/2021 |
| JP | 05286423 | A | * | 11/1993 |
| JP | 2021-116187 | A | | 8/2021 |
| NO | 317366 | B1 | | 10/2004 |
| WO | 2014/075937 | A1 | | 5/2014 |
| WO | 2014/090684 | A1 | | 6/2014 |
| WO | 2015/193278 | A1 | | 12/2015 |
| WO | 2017/081281 | A1 | | 5/2017 |
| WO | 2018/146304 | A1 | | 8/2018 |
| WO | WO-2019076760 | A1 | * | 4/2019 ........... B65G 1/0414 |
| WO | 2019/101725 | A1 | | 5/2019 |
| WO | 2019/137870 | A1 | | 7/2019 |
| WO | 2019/172824 | A1 | | 9/2019 |
| WO | 2020/094336 | A1 | | 5/2020 |
| WO | 2020/094339 | A1 | | 5/2020 |
| WO | 2021/223757 | A1 | | 11/2021 |

OTHER PUBLICATIONS

International Search Report issued in PCT/EP2021/063150 on Jul. 22, 2021 (4 pages).
Written Opinion of the International Searching Authority issued in PCT/EP2021/063150 on Jul. 22, 2021 (8 pages).
Norwegian Search Report issued in No. 20200612 mailed on Dec. 22, 2020 (2 pages).
Norwegian Search Report issued in No. 20201315 mailed on Sep. 22, 2021 (2 pages).
Coquau, Stephane, Office Action for European Patent Application No. 21727817.5, dated Feb. 5, 2025, 5 pages, pub. by the EPO, Rijswijk Netherlands.
Miyake, Susumu, Office Action in JP2022571791 mailed May 13, 2025, 13 pages, Japan Patent Office, Toyko, Japan.
Coquau, Stephane, Office Action in EP21727817.5, mailed Jul. 7, 2025, 4 pages, European Patent Office, Rijswijk, Netherlands.
Peltonen, Marko, Office Action in NO20201315, mailed Sep. 30, 2025, 2 pages, Norwegian Industrial Property Office, Oslo, Norway.
Zhu, Simin, Office Action in CN202180059828.2, mailed Apr. 30, 2025, 27 pages, The State Intellectual Property Office of the People's Republic of China, Beijing, China.
Coquau, Stephane, Office Action in EP21727817.5, mailed Jan. 15, 2026, 6 pages, European Patent Office, Munich, Germany.
Zhu, Simin, Office Action in CN202180059828.2, mailed Nov. 19, 2025, 25 pages, The State Intellectual Property Office of the People's Republic of China, Beijing, China.
Lee, Jae-Won, Office Action in KR1020227044878, mailed Jan. 12, 2026, 16 pages, Korean Intellectual Property Office, Daejeon, Korea.
Coquau, Stephane, Office Action in EPO patent application 21727817.5, mailed May 4, 2026, 5 pages, European Patent Office, Munich, Germany.
Zhu, Simin, Office Action in Chinese patent application 202180059828.2, mailed Apr. 23, 2026, 10 pages, The State Intellectual Property Office of the People's Republic of China, Beijing, China.

* cited by examiner

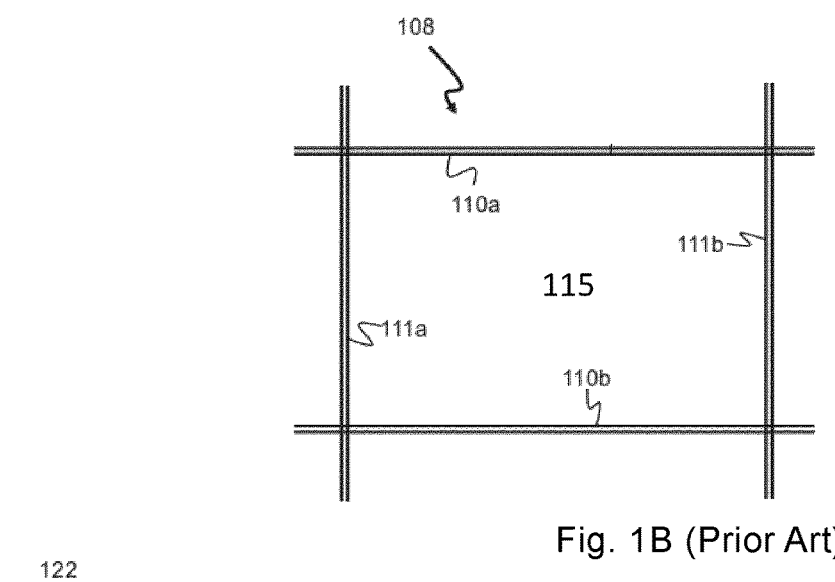
Fig. 1B (Prior Art)
Fig. 1C (Prior Art)
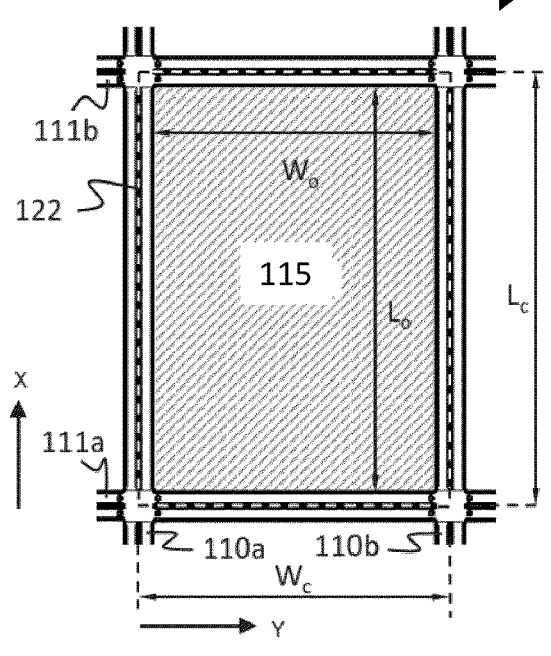
Fig. 1D (Prior Art)

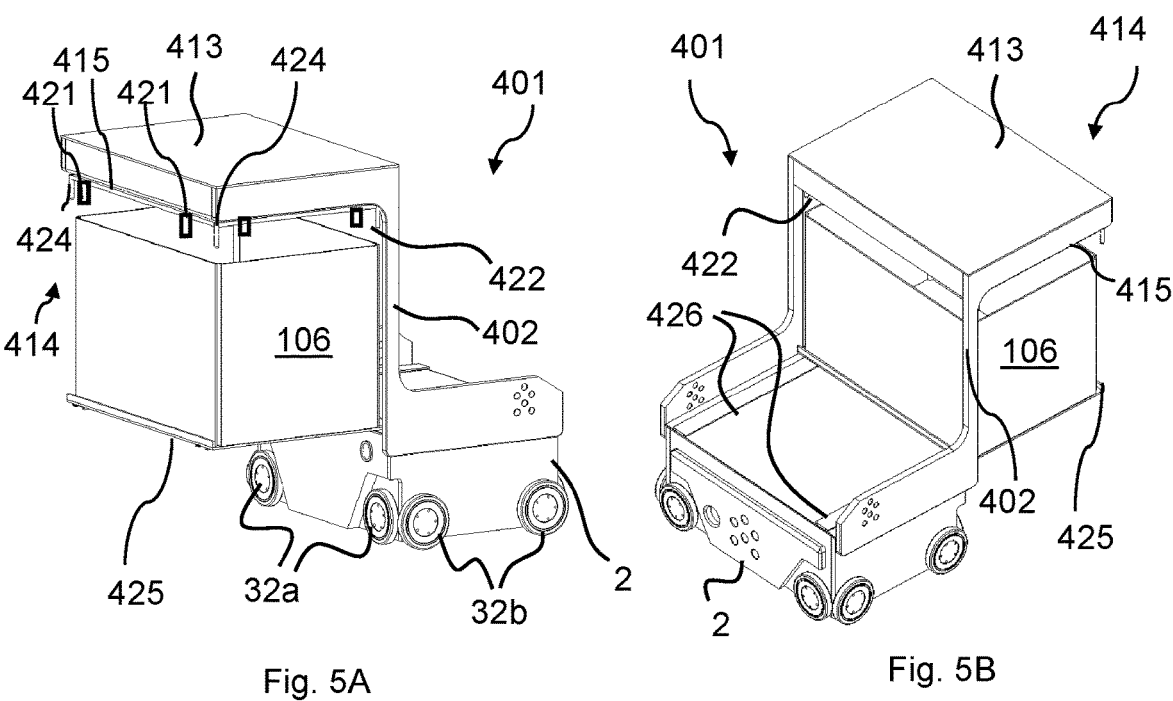
Fig. 5A
Fig. 5B
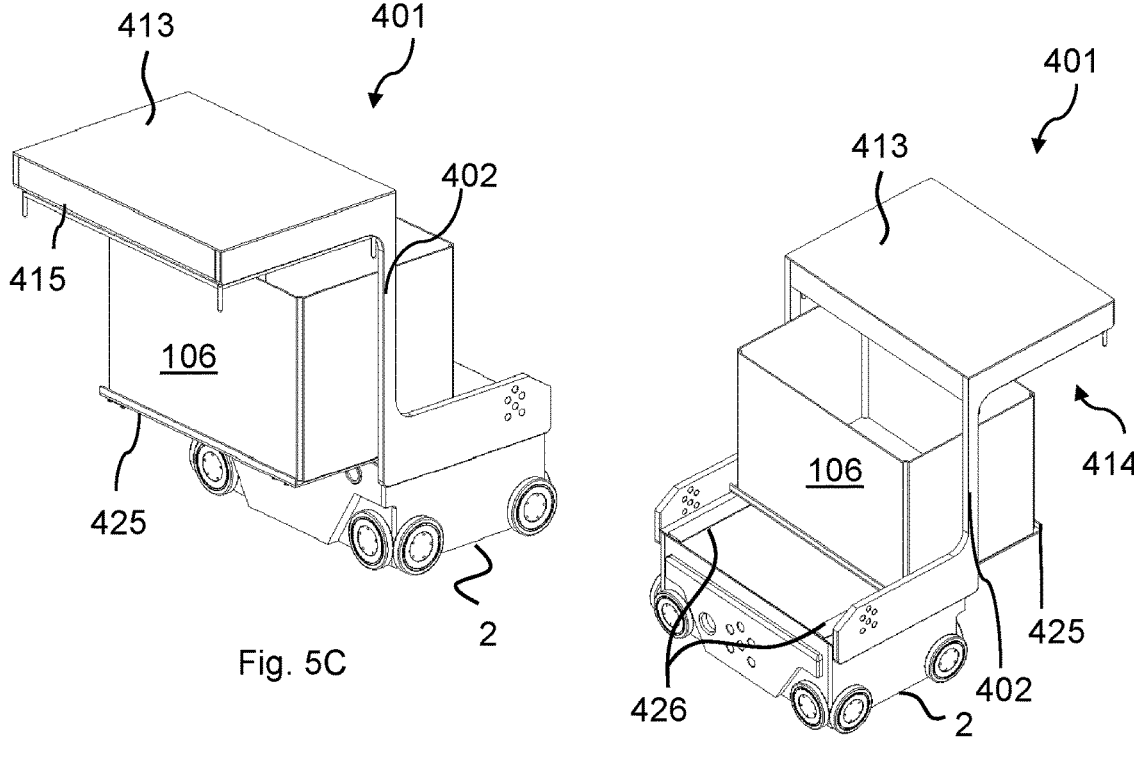
Fig. 5C
Fig. 5D

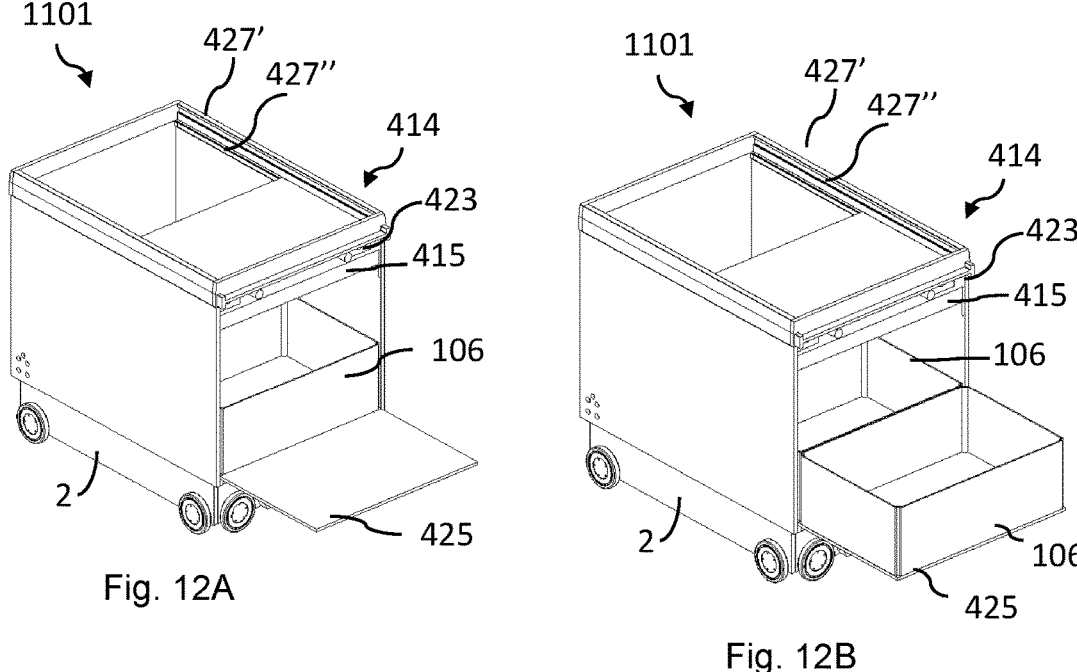
Fig. 12A
Fig. 12B
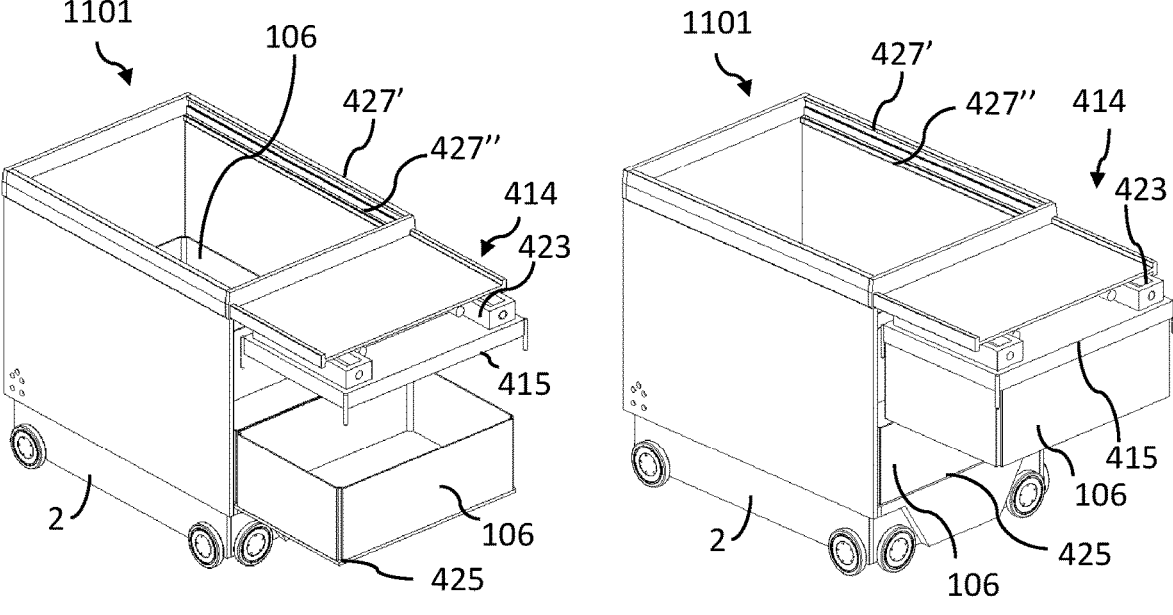
Fig. 12C
Fig. 12D

1401

415

402

106

106

425

106

106

2

1401

415

106

402

106

425

106

106

106

2

CONTAINER HANDLING VEHICLE WHICH CAN LOAD AND/OR UNLOAD ITSELF

FIELD OF THE INVENTION

The present invention relates to an automated storage and retrieval system for storage and retrieval of containers, in particular to a container handling vehicle for use in such a system, as well as method of transferring a storage container from a storage position to a support surface on a container handling vehicle.

BACKGROUND AND PRIOR ART

FIG. 1A discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 115 in the rail system 108. The container handling vehicles 201,301 can move laterally above the storage columns 105, i.e. in a plane which is parallel to the horizontal X-Y plane.

The horizontal extent of one of the grid cells 122 constituting the grid pattern is in FIG. 1A marked by thick lines.

Each grid cell 122 has a width which is typically within the interval of 30 to 150 cm, and a length which is typically within the interval of 50 to 200 cm. Each access opening 115 has a width and a length which is typically 2 to 10 cm less than the width and the length of the grid cell 122 respectively due to the horizontal extent of the rails 110,111.

The rail system 108 may be a single rail system, as is shown in FIG. 1B. Alternatively, the rail system 108 may be a double rail system, as is shown in FIG. 1C, thus allowing a container handling vehicle 201 having a footprint generally corresponding to the lateral area defined by a storage column 105 to travel along a row of grid columns even if another container handling vehicle 201 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 1D, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space therebetween.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1A, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1A is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 201,301 that is subsequently used for transporting the target storage container 106 to the drop-off port column 119, or with one or a plurality of other cooperating container handling vehicles 201,301. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

An objective of the invention is to provide a container handling vehicle that can carry multiple storage containers.

Another objective of the invention is to provide a container handling vehicle which can load storage container(s) onto itself, as well as unloading storage containers from itself.

SUMMARY OF THE INVENTION

The present invention is set forth and characterized in the independent claims, while the dependent claims describe other characteristics of the invention.

According to the present invention, it is provided a container handling vehicle that can load and unload itself. The container handling vehicle comprises a base, such as a wheeled base or a belted base, a lifting frame and a support surface. In order for the lifting frame to be able to move a storage container from a storage position in the frame structure (i.e. a storage position below the rail system) and onto the support surface, and vice versa, at least one of the lifting frame and the support surface are movable relative to the base. Thus, the movement of the storage container between the stack and the support surface can be achieved either by:

1) the lifting frame being movable between a position where it can access a storage position below the rail system and at least one support surface on the container handling vehicle, from which support surface the lifting frame can load and/or unload a storage container, or
2) the at least one support surface being movable relative the base between at least one position where it is situated directly below the lifting frame and a position where it is arranged beyond the lifting frame such that the lifting frame can access a storage position below the rail system.

There is described a container handling vehicle for operation on a two-dimensional rail system comprising a first set of parallel rails arranged to guide movement of container handling vehicles in a first direction X across the top of a frame structure, and a second set of parallel rails arranged perpendicular to the first set of rails to guide movement of the container handling vehicles in a second direction Y which is perpendicular to the first direction, the first and second sets of parallel rails forming a grid which divides the rail system into a plurality of grid cells, wherein the container handling vehicle comprises:

a base comprising moving means for guiding the container handling vehicle along the rail system in the first direction X and second direction respectively;

a support structure provided on the base, the support structure extending from a lower section at the base to an upper section;

a container lifting device comprising a lifting frame for lifting a storage container up from a storage position below the rail system, the lifting frame being suspended from a set of suspension points of the upper section of the support structure;

a support surface for supporting the storage container, the support surface providing a first holding position arranged at a lower elevation than the lifting frame when the lifting frame is in a docked state adjacent the upper section of the support structure, wherein the container handling vehicle comprises a movement mechanism to translate horizontally the set of suspension points or the support surface with respect to the base, such that a lifted storage container can be placed on the support surface and the lifting frame disconnected from it.

The base is preferably a wheeled base comprising a first set of wheels and a second set of wheels for guiding the container handling vehicle along the rail system in the first direction X and second direction respectively.

Alternatively, the base can be a belt base comprising a first belt and a second belt for guiding the container handling vehicle along the rail system in the first direction X and second direction respectively.

The term "translate horizontally" the set of suspension points or the support surface with respect to the base may be a movement with only a horizontal component (i.e. only in the horizontal direction), or it may be a movement with a horizontal component and a vertical component (i.e. in the horizontal direction and the vertical direction). The latter may be a rotational movement in the vertical plane.

The container handling vehicle comprises a set of suspension points for suspending the lifting frame. The set of suspension points can be pulleys or spools. The set of suspension points can move, e.g. they could be part of a frame that runs along guides of a fixed cantilever or other horizontal surface, or it could be the whole of the cantilever that slides across.

The support surface can be provided by any device or surface that provides the function of a shelf, such as a plate, a couple of arms forming a forklift, a carrier, etc.

The base, hereinafter referred to as the wheeled base, is used as a reference for the movement of the set of suspension points (and thus the lifting frame) and the support surface. The support surface will normally be a position that is above or flush with an upper part of the wheeled base.

The movement mechanism is configured for horizontal translational movement, either linear (such as along the X and Y directions) or by rotation.

The container lifting device, in addition to a lifting frame and suspension points, may further comprise one or more lifting shafts, lifting bands, guiding sheave(s) for the lifting bands etc.

The container handling vehicle is operable on a two-dimensional rail system comprising a first set of parallel rails arranged to guide movement of container handling vehicles in a first direction X across the top of a frame structure, and a second set of parallel rails arranged perpendicular to the first set of rails to guide movement of the container handling vehicles in a second direction Y which is perpendicular to the first direction X.

In an aspect, at least one of the lifting frame and the support surface may be configured for linear translational movement in a horizontal direction. The horizontal direction may be in a direction which is parallel to one set of the rails.

The suspension points may be linearly movable such that in a first position the lifting frame is arranged to retrieve a storage container from a storage position below the rail system and in a second position the lifting frame is arranged above the first holding position.

In a first position, the lifting frame may be arranged to retrieve a storage container from a storage position below a rail system on which the container handling vehicle operate, and in a second position the lifting frame may be arranged above the support surface.

The lifting frame and the first holding position may be arranged such that:

in a first position, a vertical projection of the lifting frame is arranged over the first holding position, and in a second position, the vertical projection of the lifting frame avoids the first holding position.

The support surface may be linearly movable relative the wheeled base by actuation of the movement mechanism such that in a first position the support surface is arranged within a vertical projection of the wheeled base and in a second position the support surface is arranged outside a vertical projection of the wheeled base. Thus, in a first position the lifting device may be arranged to retrieve a storage container from a storage position below the container handling vehicle. The support surface may receive the storage container in a first position below the lifting device e.g., a container receiving position and then transfer the storage container to a second position which is a first holding position.

The first and second positions of the support surface may correspond to the grid layout of the first and second sets of rails, such that the lifting device lifts a container in a first position corresponding to a grid space to a side of the wheeled base, lowers the container onto the support surface and then the support surface transfers the storage container to a first holding position by moving to a second position corresponding to a grid space under the wheeled base.

The movement mechanism may be arranged in the wheeled base such that the support surface can be translated horizontally relative the wheeled base.

The movement mechanism may be arranged in the upper section such that the lifting frame surface can be translated horizontally relative to the wheeled base.

The container handling vehicle may comprise a second movement mechanism to translate the other of the set of suspension points or the support surface horizontally with respect to the wheeled base. Thus, in this embodiment, both the set of suspension points and the support surface(s) can move relative to the wheeled base.

The container handling vehicle may comprise a second support surface providing a second holding position arranged next to or above the first holding position.

The movement mechanism may comprise a linear guide system supporting the set of suspension points or the support surface.

The linear guide system may be horizontally extendable.

The linear guide system may comprise at least two movement mechanisms, including:

a first movement mechanism for horizontal translational movement the lifting frame or the support surface within an area defined by the vertical projection of the wheeled base, and a second movement mechanism for horizontal translational movement of the lifting frame or the support surface outside an area defined by the vertical projection of the wheeled base.

The first movement mechanism may comprise a linear bearing, rack and pinion, a linear actuator and/or ball screw.

The second movement mechanism may comprise a linear bearing, rack and pinion, a linear actuator and/or ball screw.

In an aspect, at least one lifting device motor and a movement mechanism for moving the lifting frame horizontally may be arranged at or above the lifting frame, preferably next to or above the lifting frame in order not to be within operational area necessary for vertical/and or horizontal movement of the lifting frame. In addition, possibly also one or more batteries may be arranged at or above the lifting frame, however, the battery/batteries can be arranged in the wheeled base and a cable may extend to the lifting device motor.

When a storage container is positioned on the first holding position, an uppermost part of the storage container may represent a first height; and the lifting frame, when in a docked state, may have a lowermost part at a second height; and the second height is above the first height, such that the lowermost part of a docked lifting frame can pass over the uppermost part of a storage container positioned on the first holding position.

The container handling vehicle may comprise:

the wheeled base in the form of a wheel base unit where the first and second sets of wheels form outer peripheries of a footprint of the wheel base unit;

a lower section which is provided on the wheel base unit, the lower section having a footprint with a horizontal extent which is equal to or less than the footprint of the wheel base unit, the lower section having an upper surface, wherein the upper surface provides the support surface;

a support section forming the support structure and extending vertically from the lower section, the support section having a footprint with a horizontal extent which is smaller than the footprint of the lower section; and a cantilever section forming the upper section and extending horizontally from the support section beyond the footprint of the lower section; wherein the support section comprises a through-going opening for moving the support surface or the lifting frame therethrough.

The through-going opening may be sized for a storage container to pass through. Thus, it may have a width dimension which is larger than a width dimension of a storage container (optionally the larger of the storage container's width dimensions) and a height dimension which is larger than a height dimension of the storage container. The through-going opening may be sufficiently large to accommodate the lifting device and/or the support structure. The through-going opening may comprise a substantially rectangular opening.

The footprint of the wheel base unit may correspond in size to a single grid cell of the underlying grid that is provided by the two sets of rails (i.e., corresponding to the area of an opening in the grid plus a region around the opening corresponding to the width of a track of the rails). In other embodiments, the wheel base unit may correspond to an integer number of grid cells where the integer is greater than one.

The container handling vehicle may comprise a second support surface providing a second holding position arranged above the support surface forming the first holding position and a cross-section area of the through-going opening may be configured for passing of the support surfaces therethrough, both when any of the support surfaces hold a storage container and when not holding a storage container. The second support surface may be arranged within vertical projection of the (first) support surface when the support surface is arranged directly above the wheel base unit.

The container handling vehicle may comprise two lifting frames and at least two support surfaces, and the two lifting frames may be arranged on opposite sides of the wheeled base and outside a vertical projection of the wheeled base, and the at least two support surfaces may be arranged within a vertical projection of the wheeled base, and where each of the support surfaces may be movable relative the wheeled base to a position outside the wheeled base and below one of the lifting frames, respectively.

The container handling vehicle may comprise two wheeled bases and at least two support surfaces, where the wheeled bases may be provided on each side of the support structure, and where one lifting frame may be suspended from the upper section of the support structure, and each of the support surfaces may be movable relative the wheeled bases to a position below the lifting frame. When a support surface is not provided below the lifting frame, the lifting frame may be arranged to retrieve a storage container from a storage position below the rail system.

The container handling vehicle may comprise a second movement mechanism to translate horizontally the set of suspension points with respect to the wheeled base in the other of the first or second direction (X, Y) such that lifting frame can move in the X and Y directions. The second movement mechanism can be a separate movement mechanism from the (first) movement mechanism or form part of the (first) movement mechanism.

The container handling vehicle may further comprise:

the wheeled base in the form of a wheel base unit where the first second sets of wheels form outer peripheries of a footprint of the wheel base unit;

a lower section which may be provided on the wheel base unit, the lower section having a footprint with a horizontal extent which may be equal to or less than the footprint of the wheel base unit, the lower section having an upper surface, wherein the upper surface provides the support surface;

a support section forming the support structure and extending vertically from the lower section, the support section having a footprint with a horizontal extent which is smaller than the footprint of the lower section; and a cantilever section forming the upper section and extending horizontally from the support section beyond the footprint of the lower section;

wherein the movement mechanism may comprise a rotation device adapted to rotate the support section and thus the cantilever section relative the wheeled base such that in a first state the lifting frame can lift a container up from a storage position below the rail system and in a second state the lifting frame can place a storage container on the support surface.

When in the second state, the support section and the cantilever section may be within the footprint of the wheel base unit. In the first state the container handling vehicle may occupy two grid cells while in the second state the container handling vehicle can occupy only one grid cell.

A centre of gravity of the support surface may be positioned over the wheeled base.

The container handling vehicle may further comprise a weight distribution system comprising a movable load and a load moving device for changing a center of gravity of the container handling vehicle dependent on the load of one or more storage containers carried by the container handling vehicle. The load moving device can be an actuator, a ball screw etc. The movable load can be arranged relatively high or relatively low in the container handling vehicle. In one aspect it can be arranged above the lifting device. In another aspect it can be arranged within the wheeled base.

The weight distribution system may comprise:

a set of sensors for measuring weight of any storage container(s) supported by the support surface(s) and by the lifting frame, and a control system connected to both the set of sensors and the load moving device, wherein the control system, based on the measured data from the set of sensors, senses a change in mass of at least two opposite sides of the container handling vehicle and calculates a travel distance for the movable load corresponding to the change in mass, and instructs the load moving device to move the movable load the calculated travel distance in an opposite direction of the relatively heavier side of the container handling vehicle. The control system may perform live, i.e. real-time, calculations of the dynamic centre of gravity of the container handling vehicle during movement, such as acceleration and deceleration, and instruct the load moving device to move the movable load in a direction such that the centre of gravity is forced to a more advantageous point with reduced risk of e.g. tilting of the container handling vehicle.

There is further described a method of loading a storage container between a stacked position in an automated storage and retrieval system and a storage position on a container handling vehicle as described above, wherein the method comprises the steps of:

picking up a storage container from the stacked position that is located below the rail system using the lifting frame of the lifting device, placing the storage container onto the support surface of the container handling vehicle and disconnecting the lifting frame from the storage container.

The method may further comprises a step of:

moving the picked storage container by using a movement mechanism to translate horizontally the set of suspension points or the support surface with respect to the wheeled base.

It is further described an automated storage and retrieval system comprising a two-dimensional rail system comprising a first set of parallel rails arranged to guide movement of container handling vehicles in a first direction X across the top of a frame structure, and a second set of parallel rails arranged perpendicular to the first set of rails to guide movement of the container handling vehicles in a second direction which is perpendicular to the first direction, the first and second sets of parallel rails forming a grid which divides the rail system into a plurality of grid cells, wherein the automated storage and retrieval system further comprises at least one container handling vehicle as described above.

The system may further comprise a plurality of stacks of storage containers below the grid cells.

The system may further comprise a control system configured to receive information concerning the footprint of the container handling vehicle(s) and use said information for controlling the system.

The invention can be used in concepts relating to storage container system, as well as in vertical farming and e-grocery applications.

The relative terms "upper", "lower", "below", "above", "higher" etc. shall be understood in their normal sense and as seen in a cartesian coordinate system. When mentioned in relation to a well, "upper" or "above" shall be understood as a position closer to the surface of the well (relative to another component), contrary to the terms "lower" or "below" which shall be understood as a position further away from the surface of the well (relative another component).

Summarized, the invention provides a container handling vehicle that can load and unload itself.

BRIEF DESCRIPTION OF THE DRAWINGS

Following drawings are appended to facilitate the understanding of the invention. The drawings show embodiments of the invention, which will now be described by way of example only, where:

FIGS. 1A-1D illustrate aspects of prior art storage and retrieval systems, where:

FIG. 1A is a perspective view of a framework structure of a prior art automated storage and retrieval system;

FIG. 1B is a plan view of two sets of single track rails;

FIG. 1C is a plan view of two sets of double track rails;

FIG. 1D is a plan view showing dimensions of a single grid cell;

FIGS. 5A-5H show different examples of a container handling vehicle with a through-going opening in the support section and where the support surface is linearly movable relative the wheeled base between a position directly above the wheeled base and a position directly below the lifting frame, where:

FIG. 5A is a front perspective view of a storage container arranged on a support surface positioned directly below the lifting frame;

FIG. 5B is a rear perspective view of FIG. 5A;

In FIG. 5C, a storage container is arranged on the support surface and the support surface with the storage container arranged thereon is mid-transition between the position directly below the lifting frame to a position directly above the wheeled base;

FIG. 5D is a rear perspective view of FIG. 5C;

FIG. 5E is a front perspective view of a storage container arranged on a support surface directly above the wheeled base;

FIG. 5F is a rear side view of FIG. 5E;

FIG. 5G is a front perspective view of a container handling vehicle holding two storage containers, where one storage container is lifted by the lifting frame while the other storage container is arranged on the support surface positioned directly above the wheeled base;

FIG. 5H is a rear perspective view of FIG. 5G;

FIG. 6A is a side view of a container handling vehicle holding one storage container by the lifting frame whereas the support surfaces are empty;

FIG. 6B is a side view of a container handling vehicle holding one storage container by the lifting frame whereas

Figures 6A, 6B, 6C, 6D, 6E, 6F:
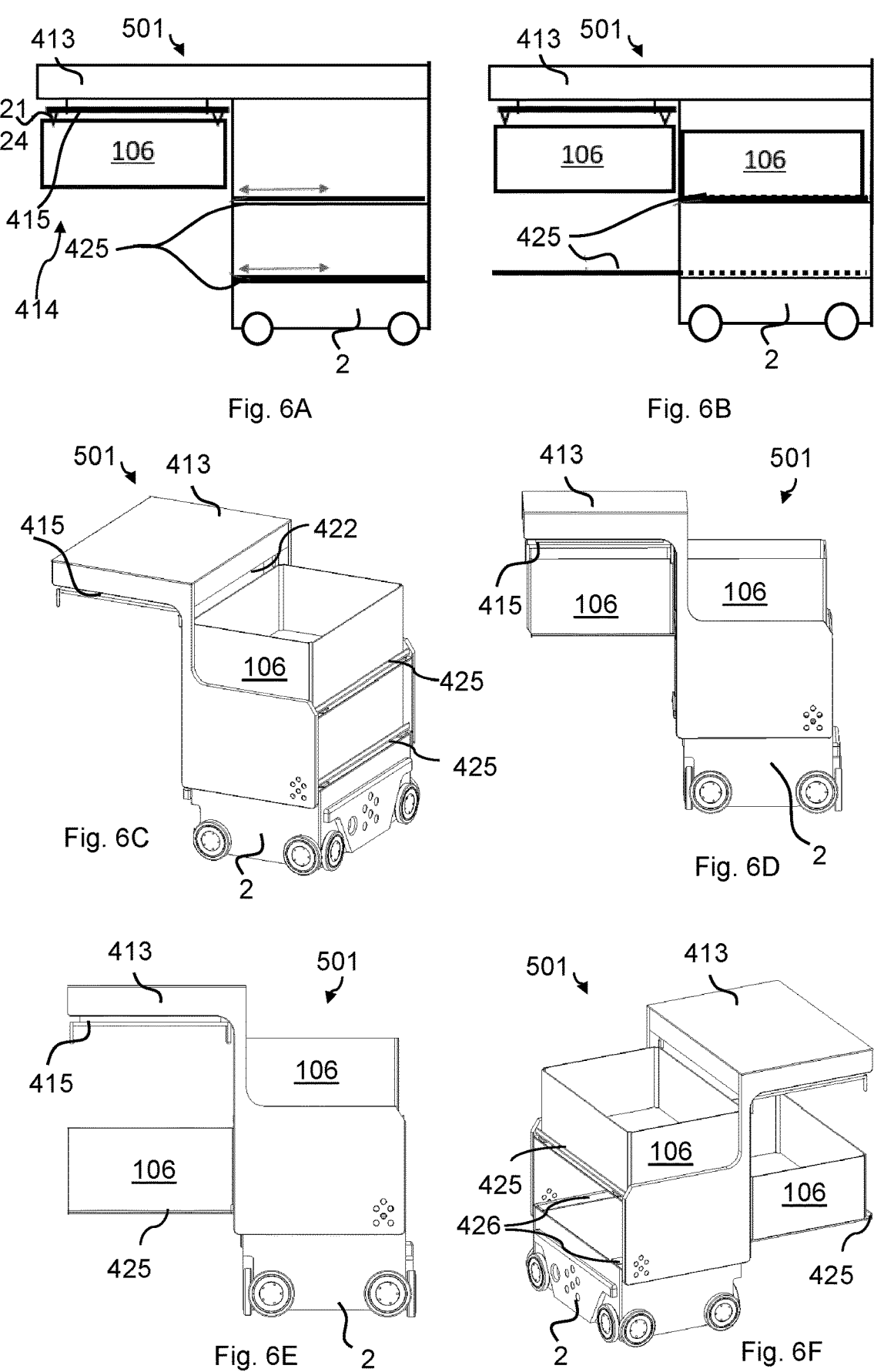
FIGS. 6A-6F are examples of a container handling vehicle with a through-going opening in the support section and where there are arranged two support surfaces which are linearly movable relative the wheeled base between a position directly above the wheeled base and a position directly below the lifting frame, and where.
Figures 7A, 7B, 7C:
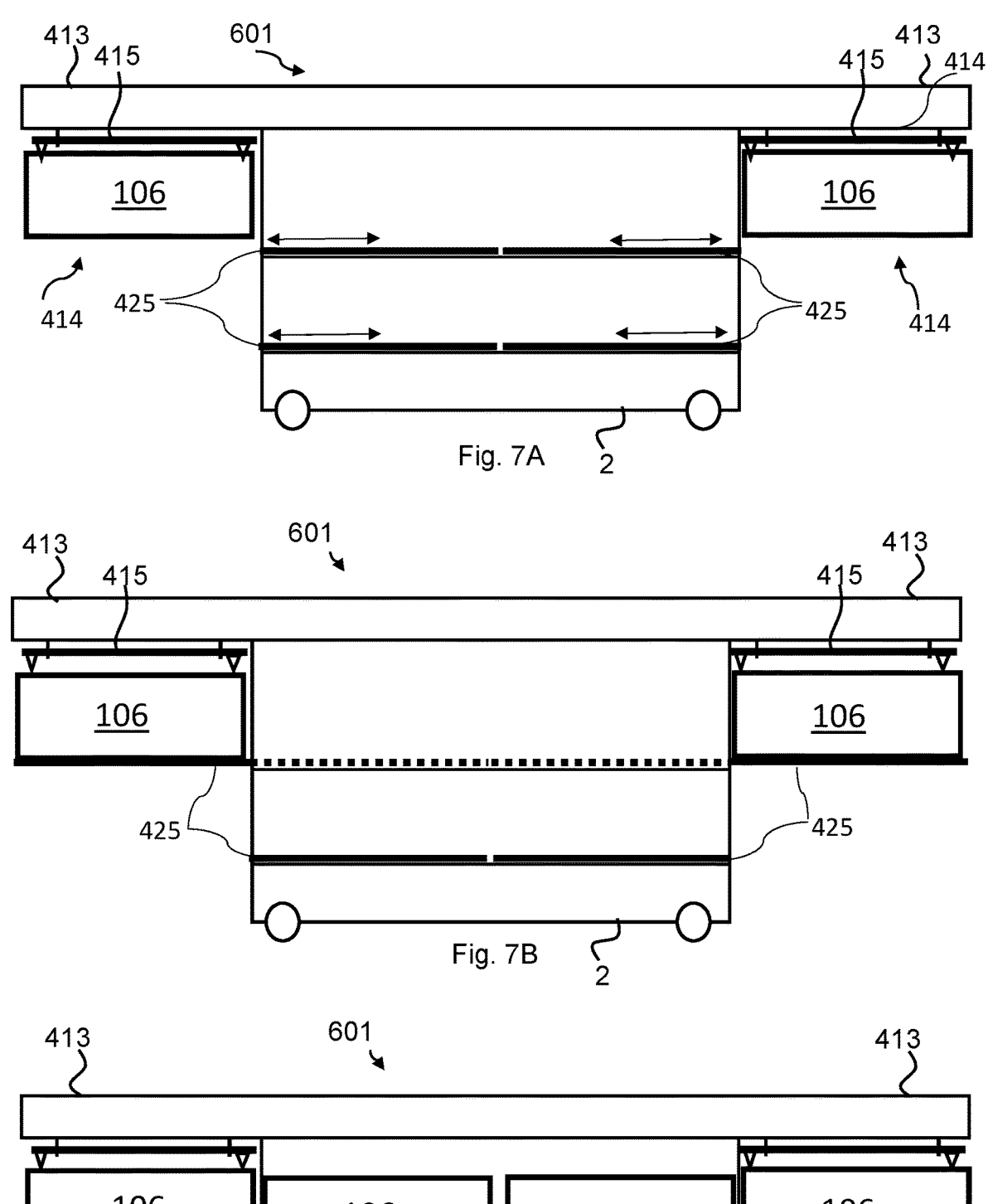
Figure 7D:
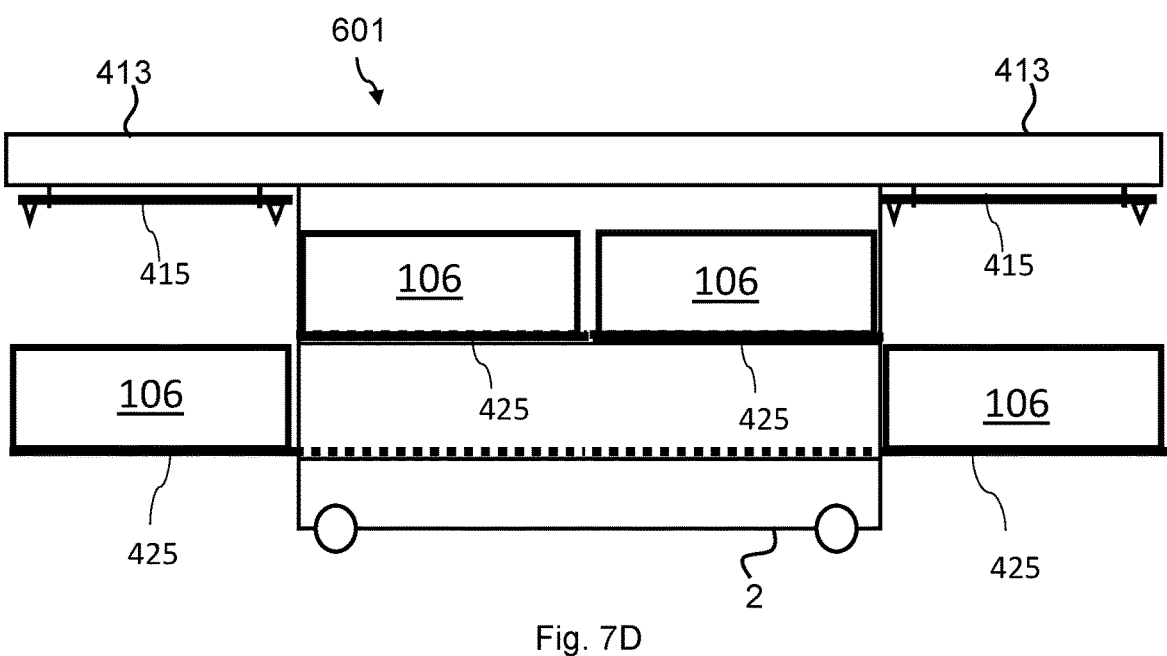
Figure 7E:
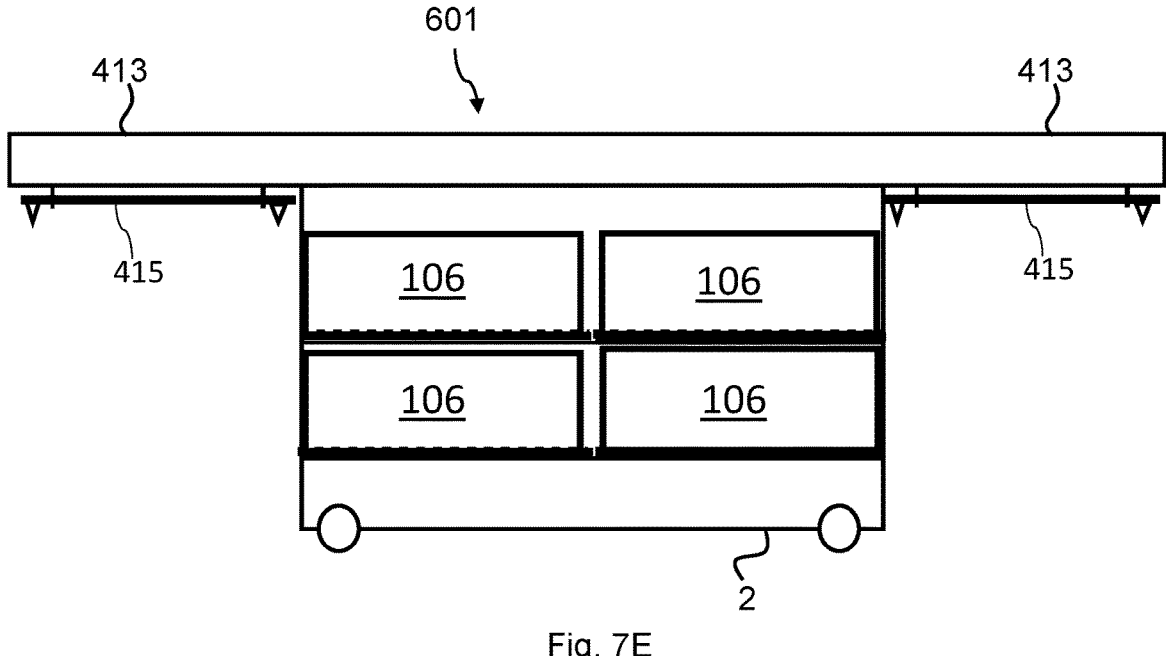
Figure 8A:
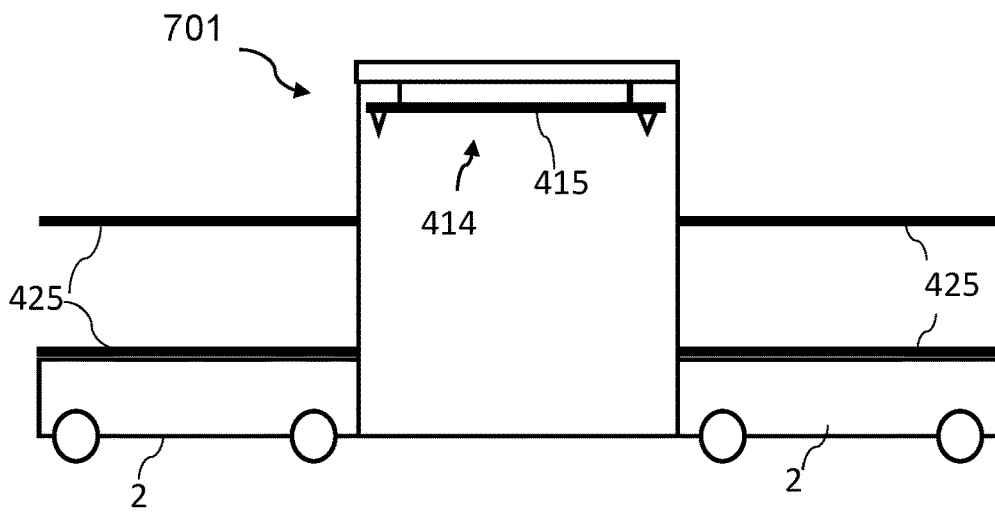
Figure 8B:
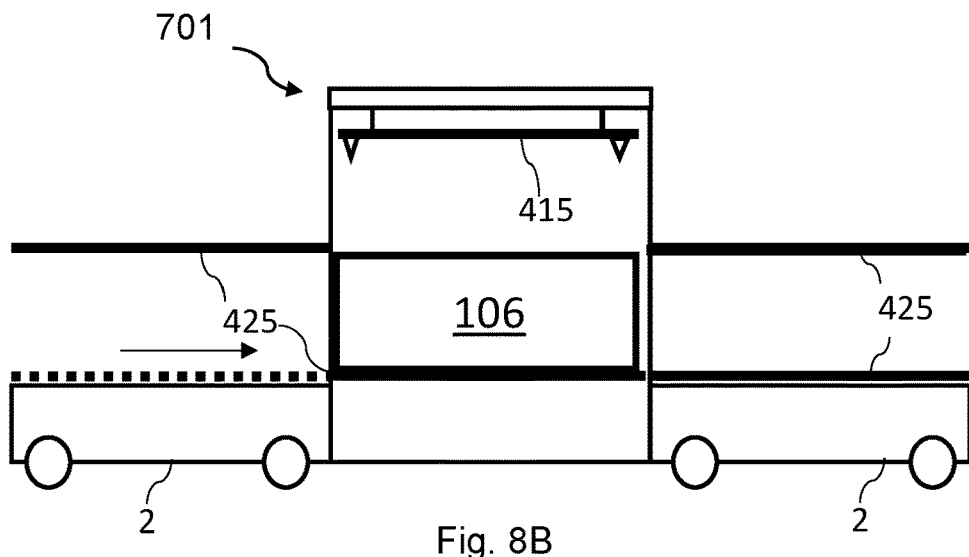
Figure 8C:
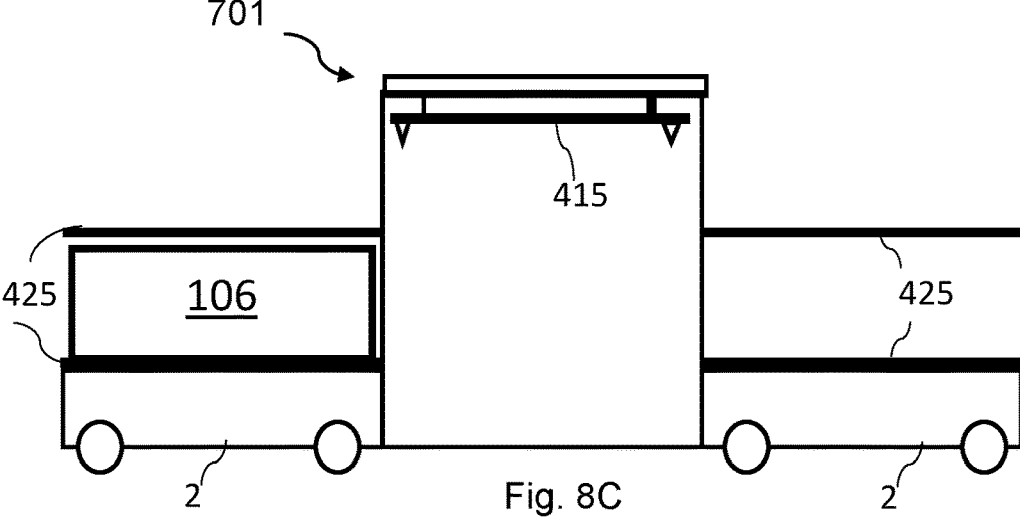
Figures 8D, 8E, 8F, 8G:
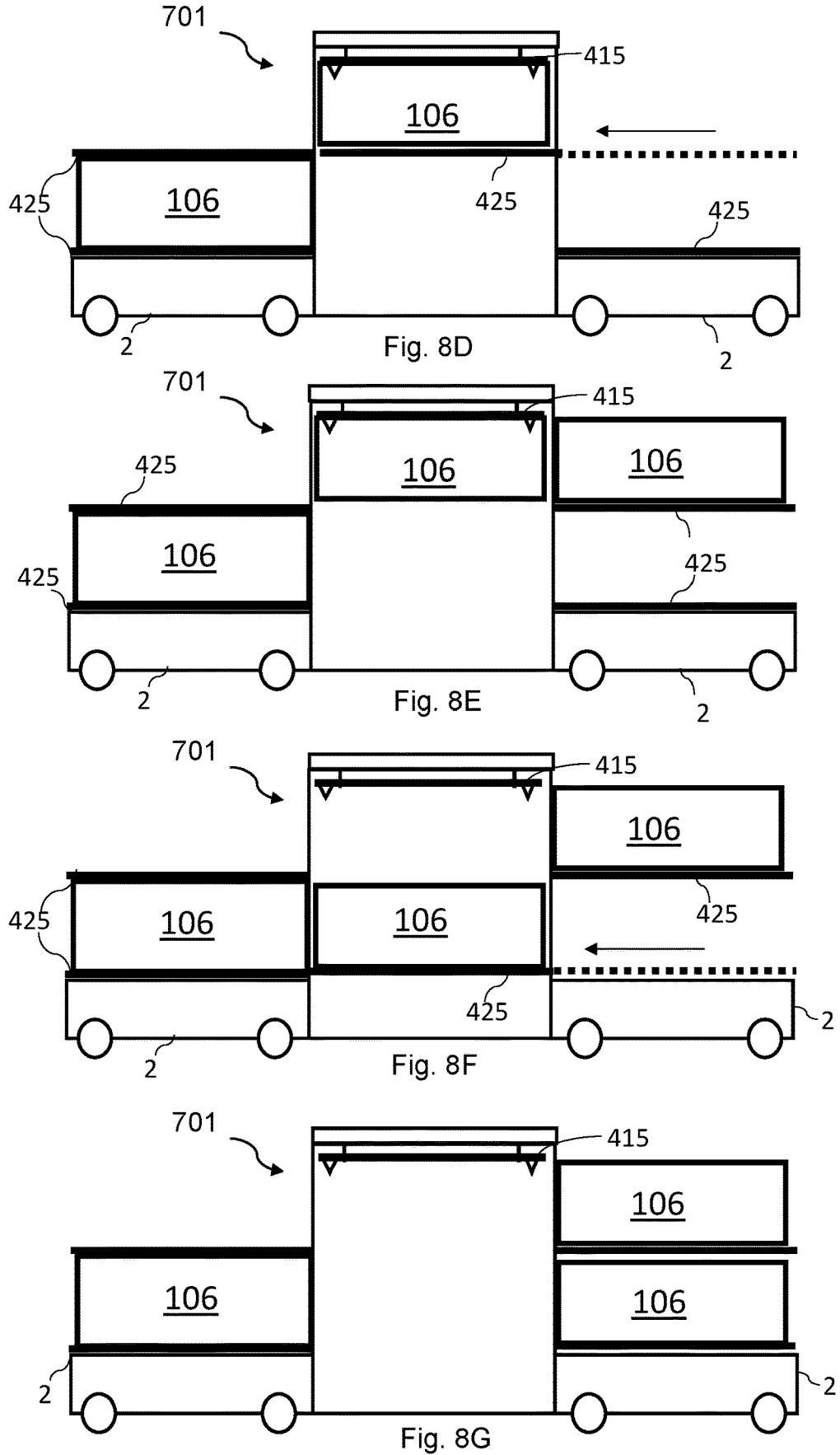
Figures 9A, 9B, 9C:
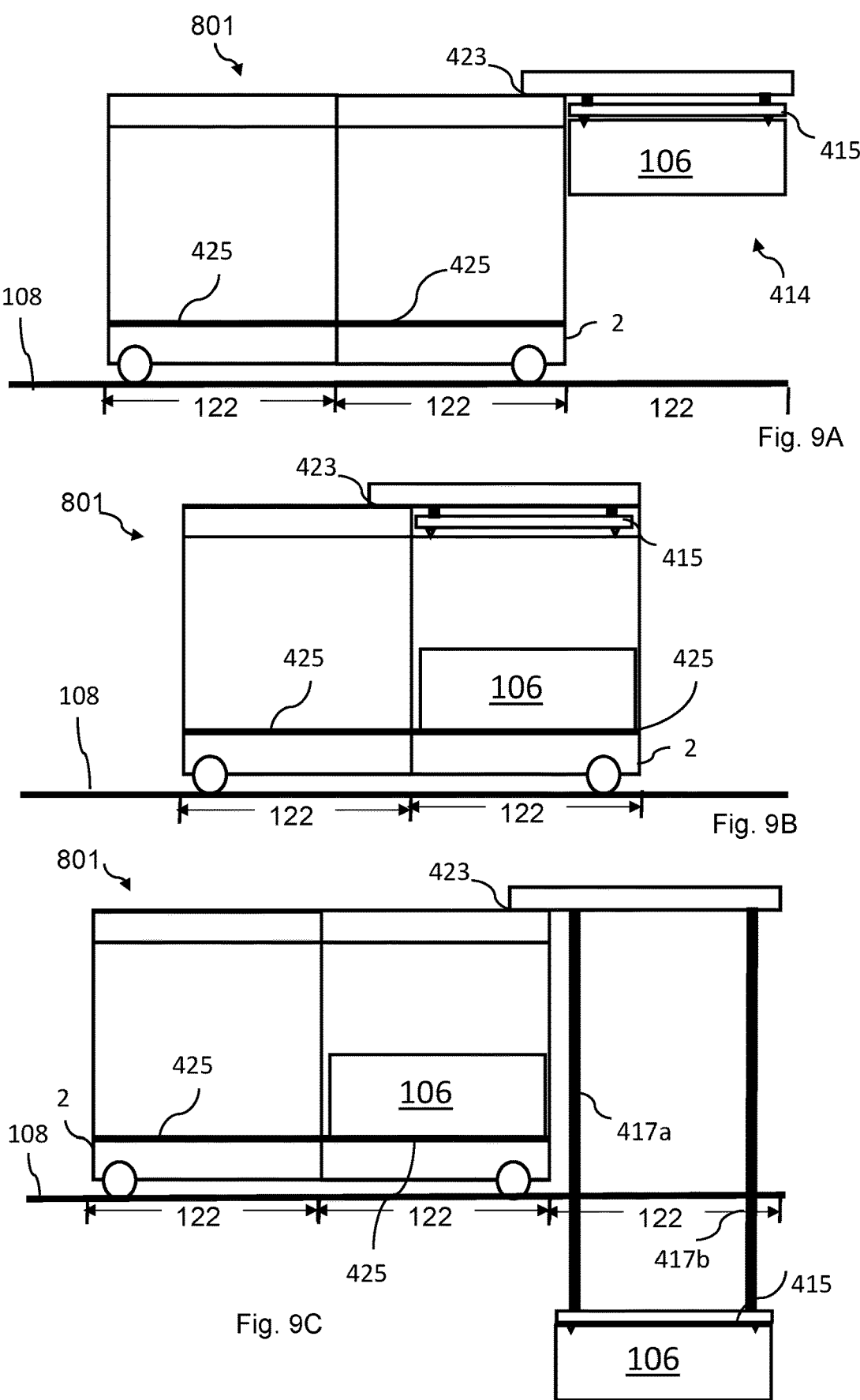
Figure 9D:
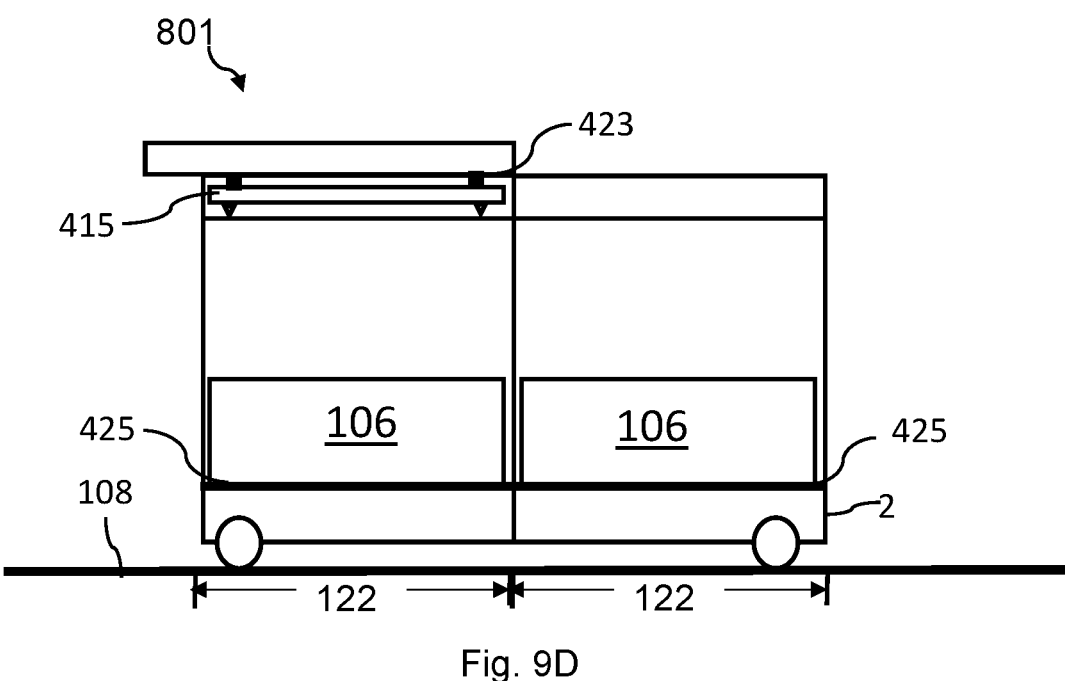
Figure 9E:
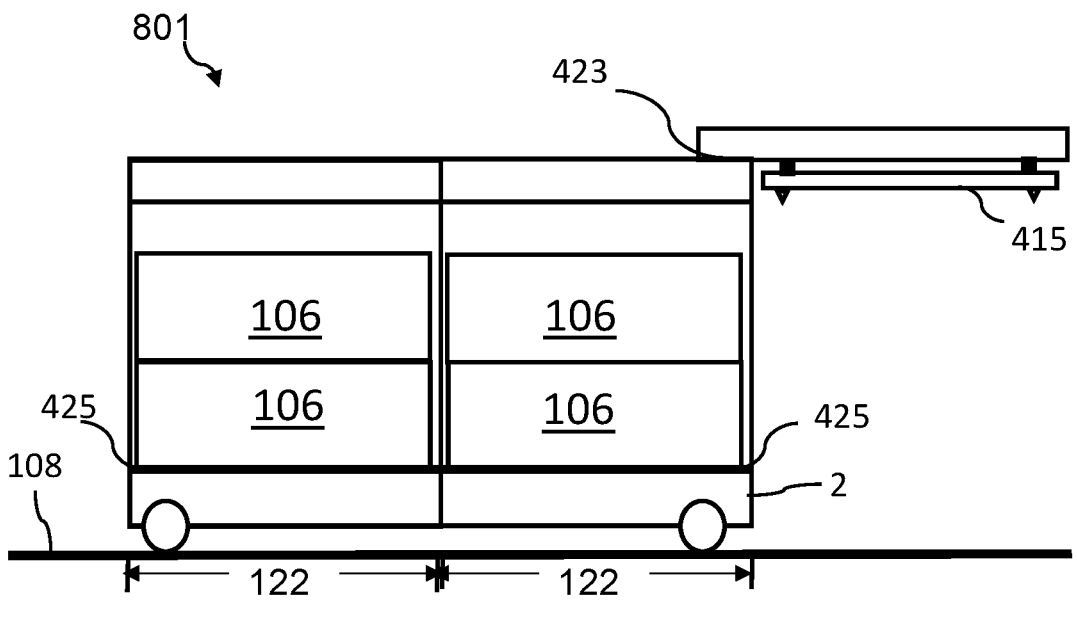
Figure 10A:
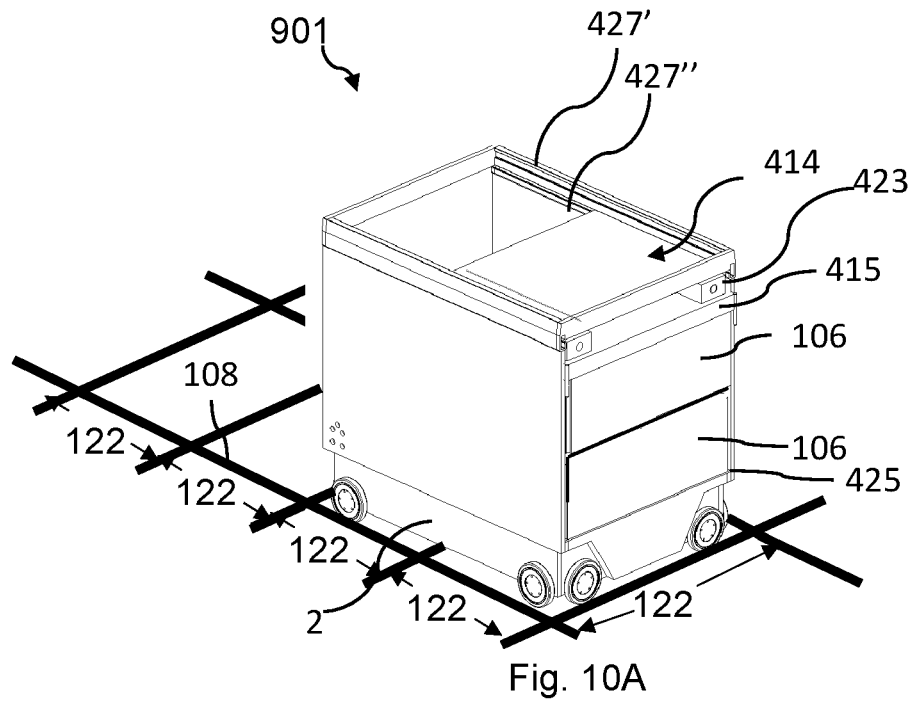
Figure 10B:
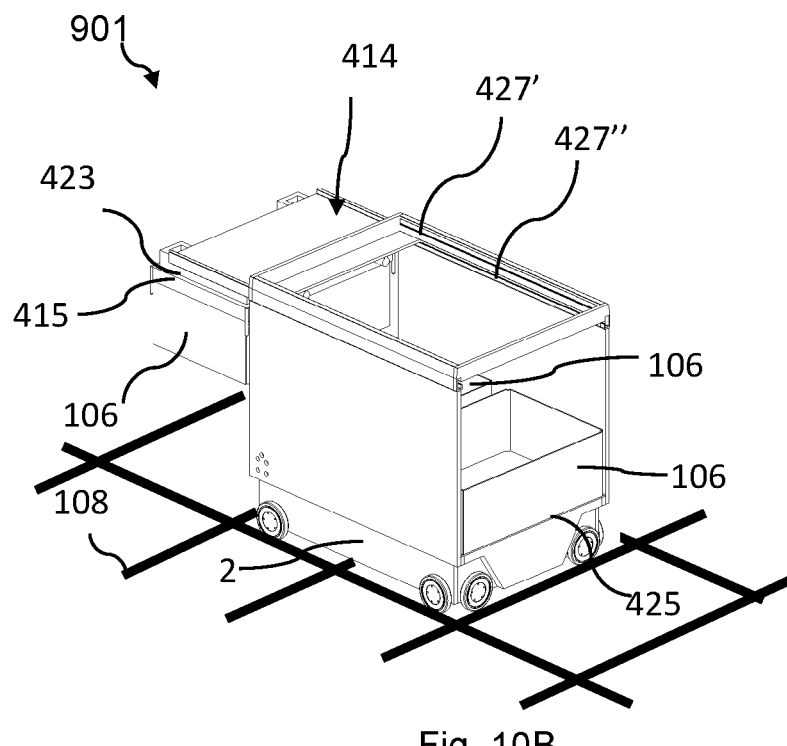
Figure 11C:
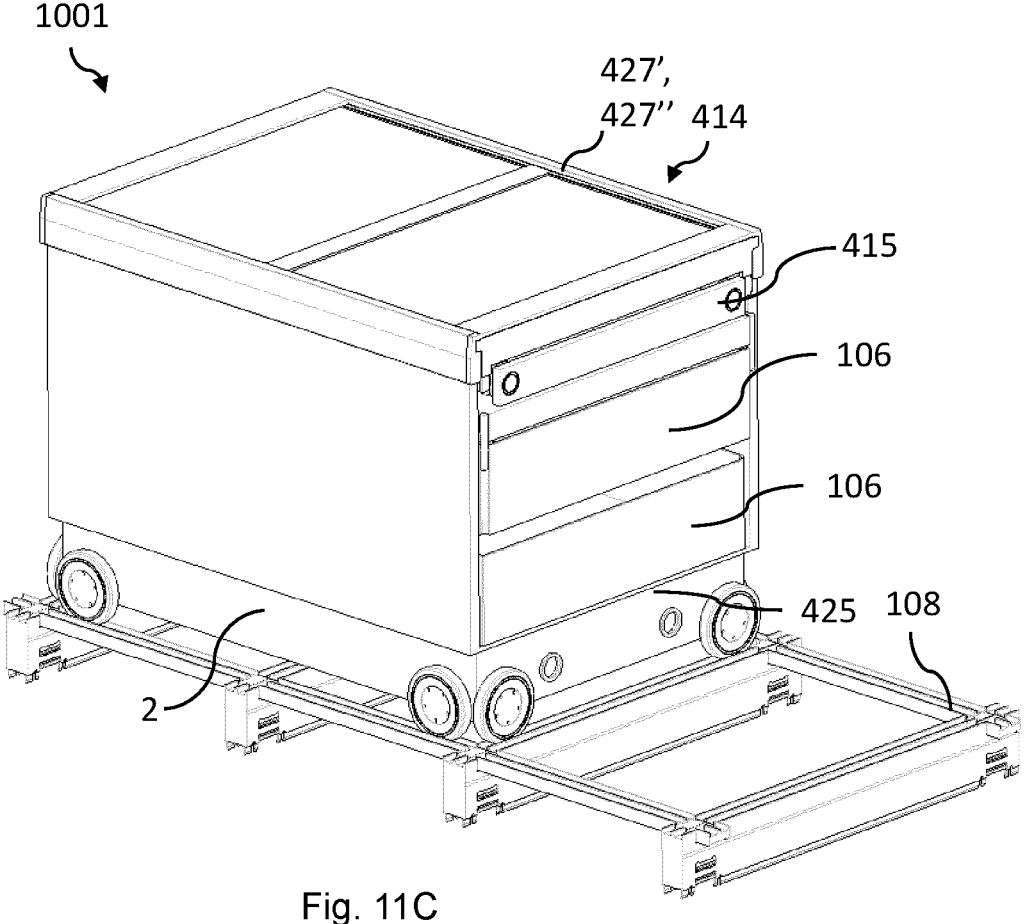
Figure 13A:
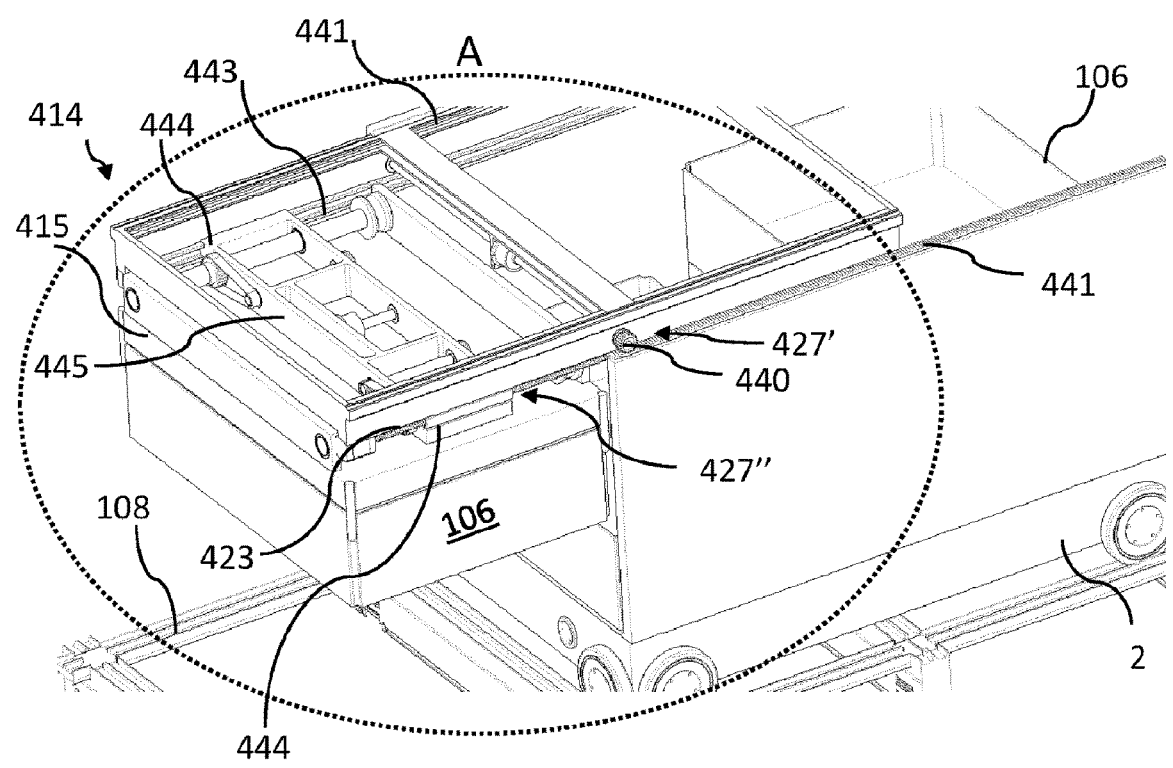
Figure 13B:
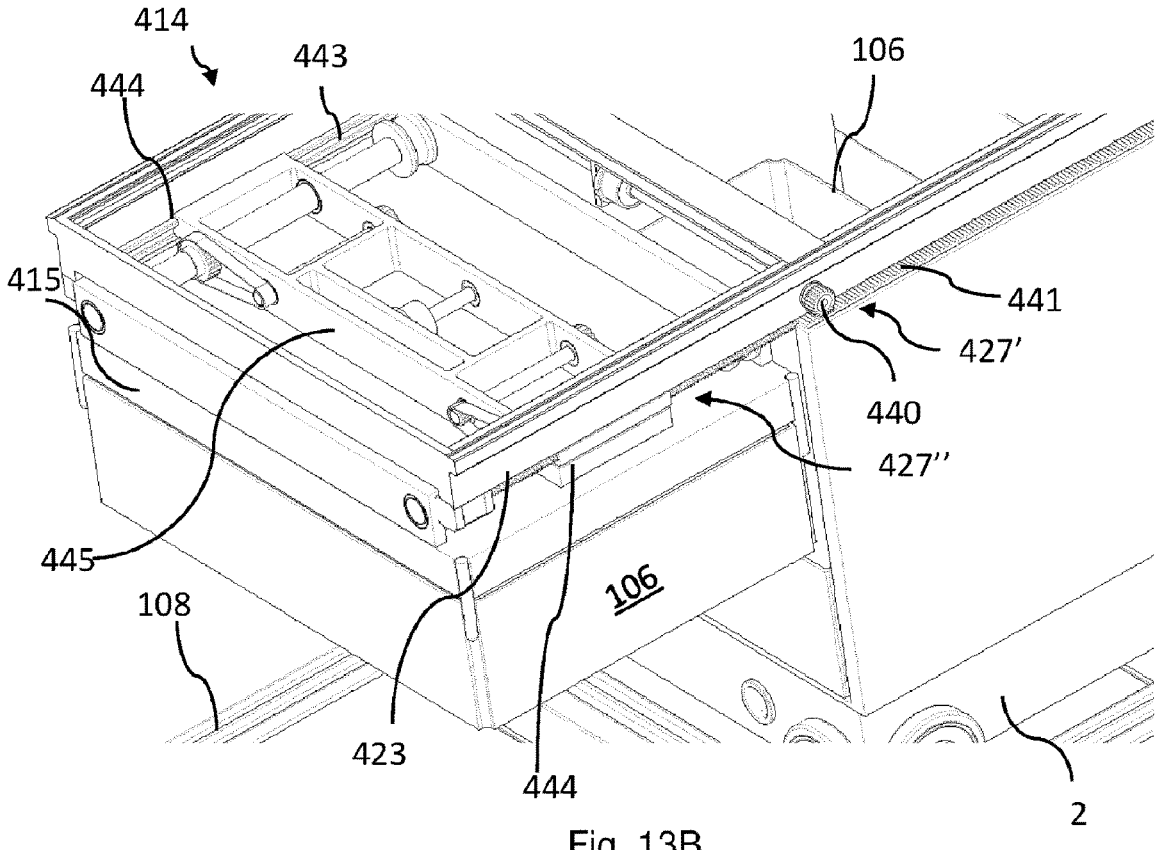
Figure 13C:
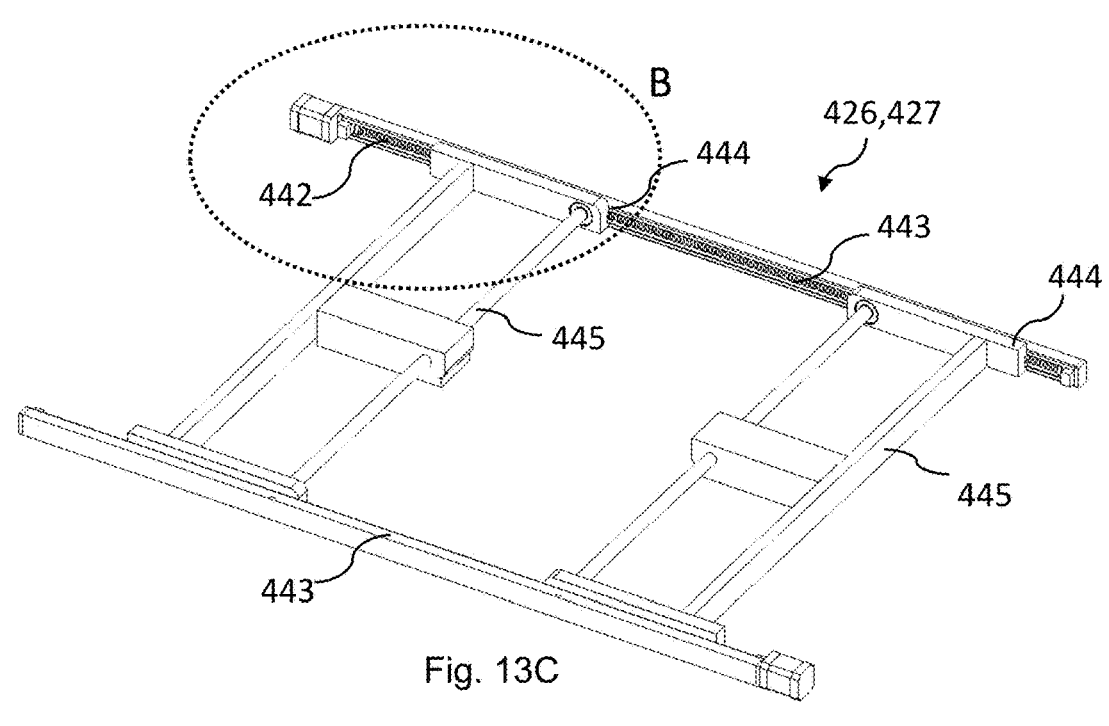
Figure 13D:
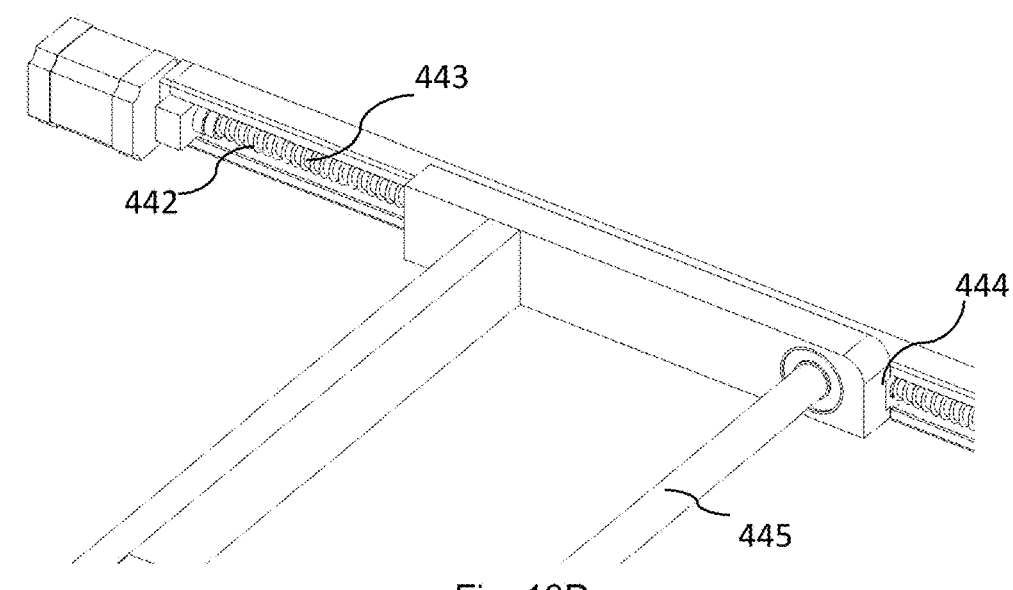
Figure 13E:
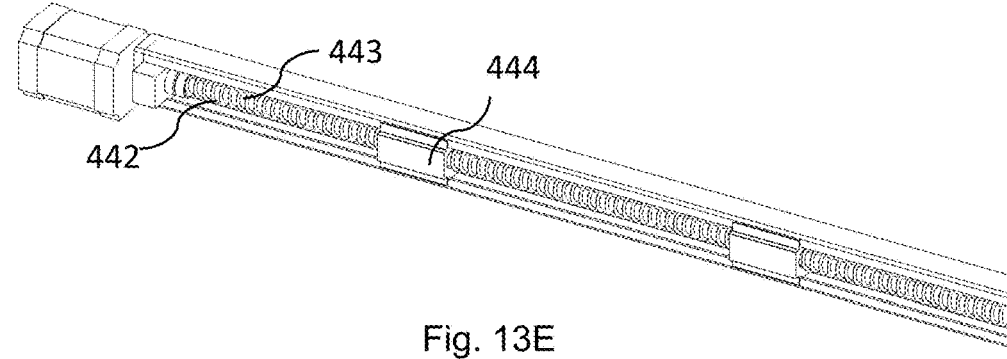
Figures 14A, 14B:
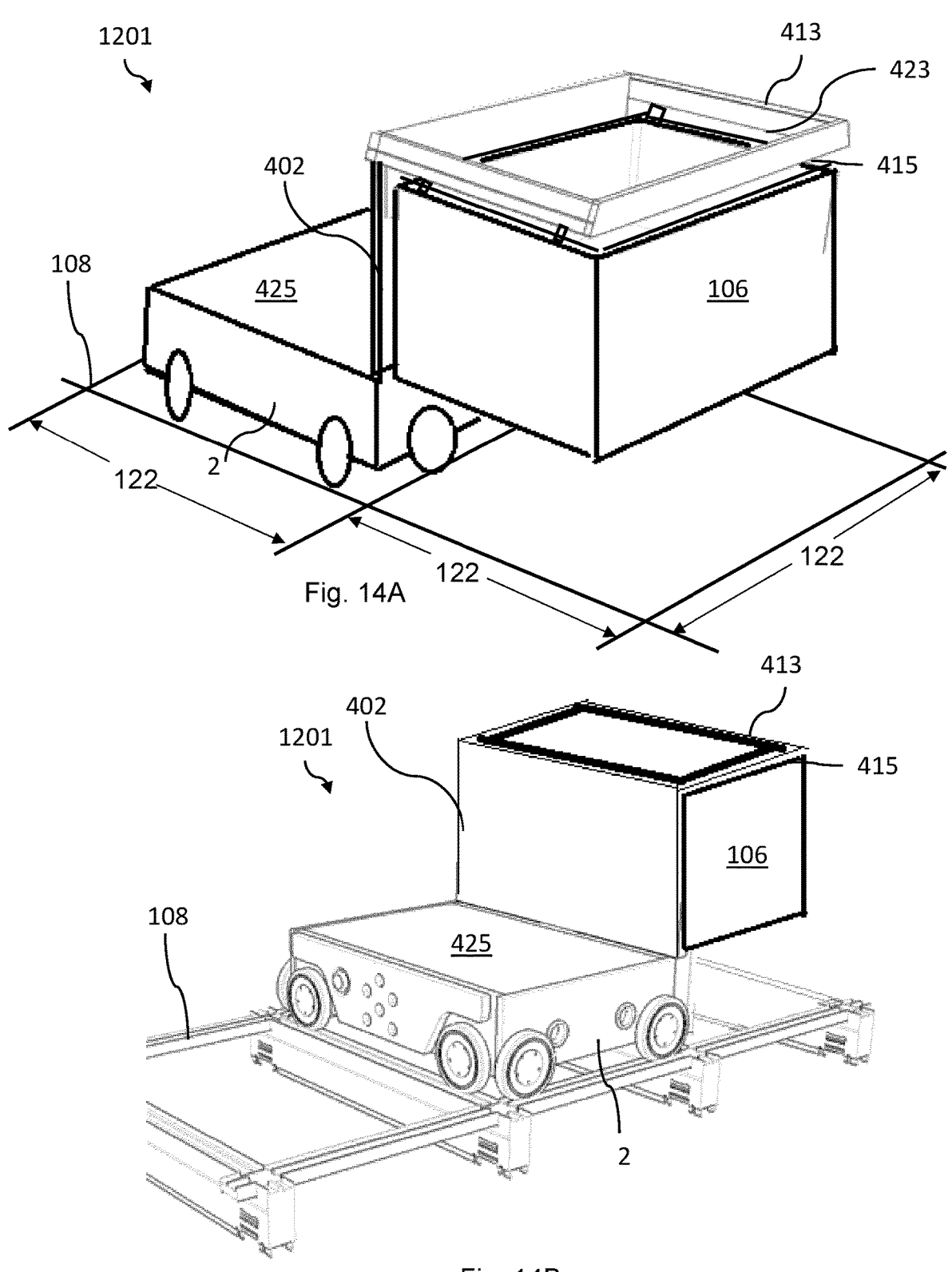
Figure 14C:
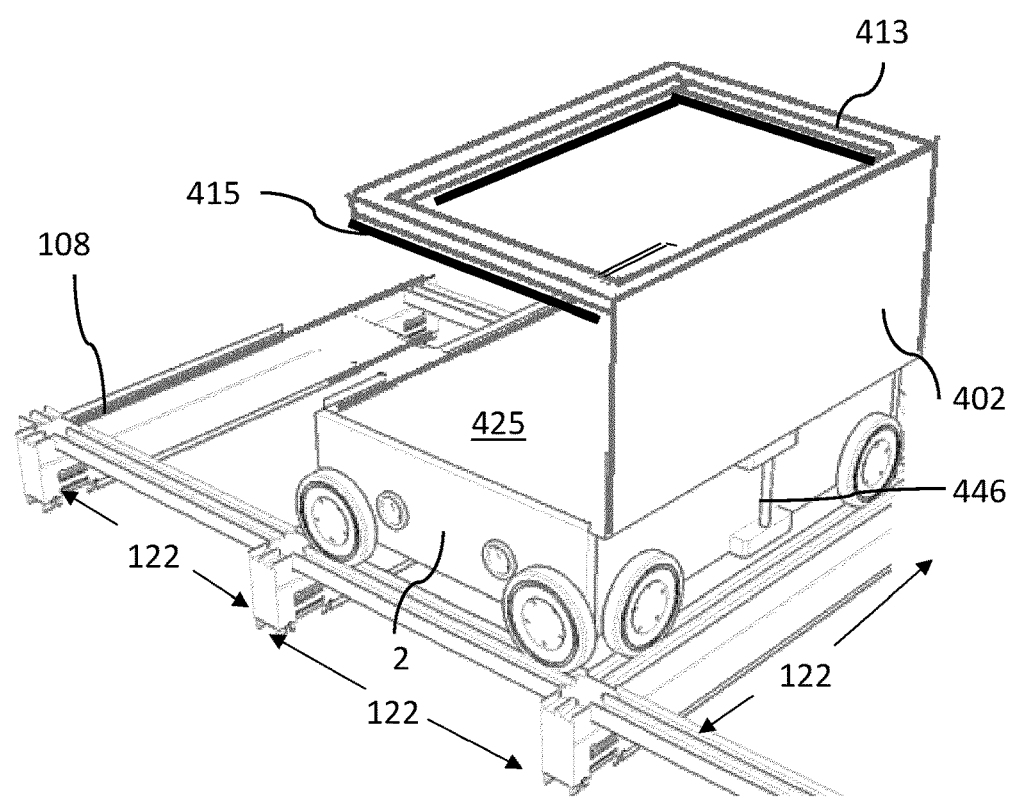
Figure 14D:
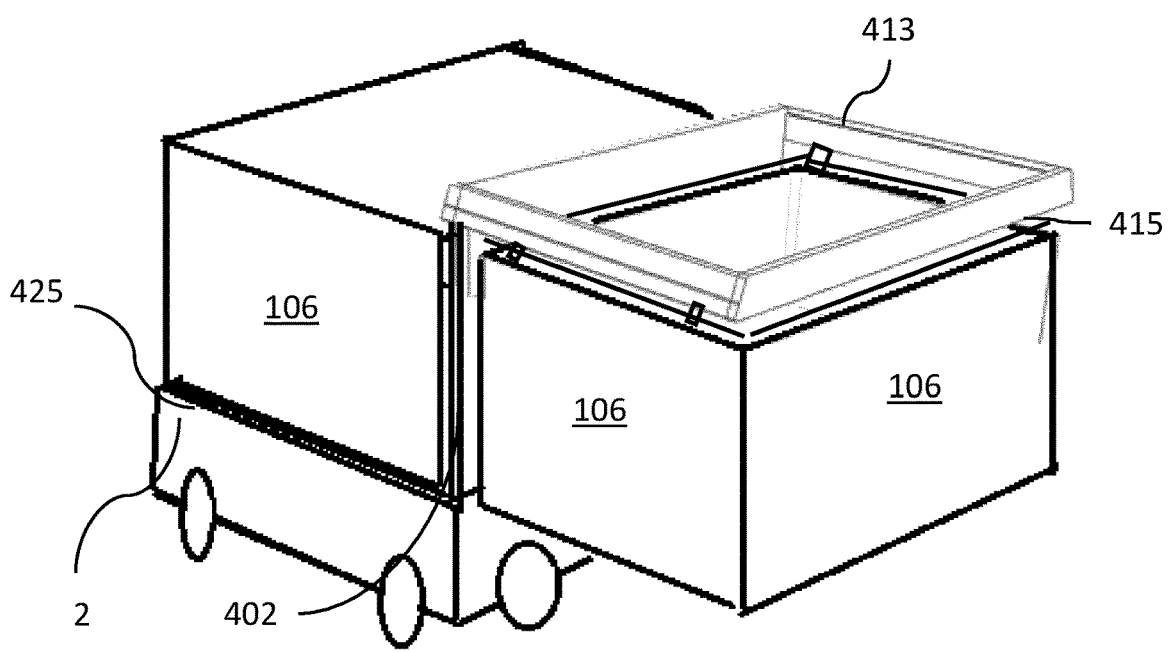
Figure 15:
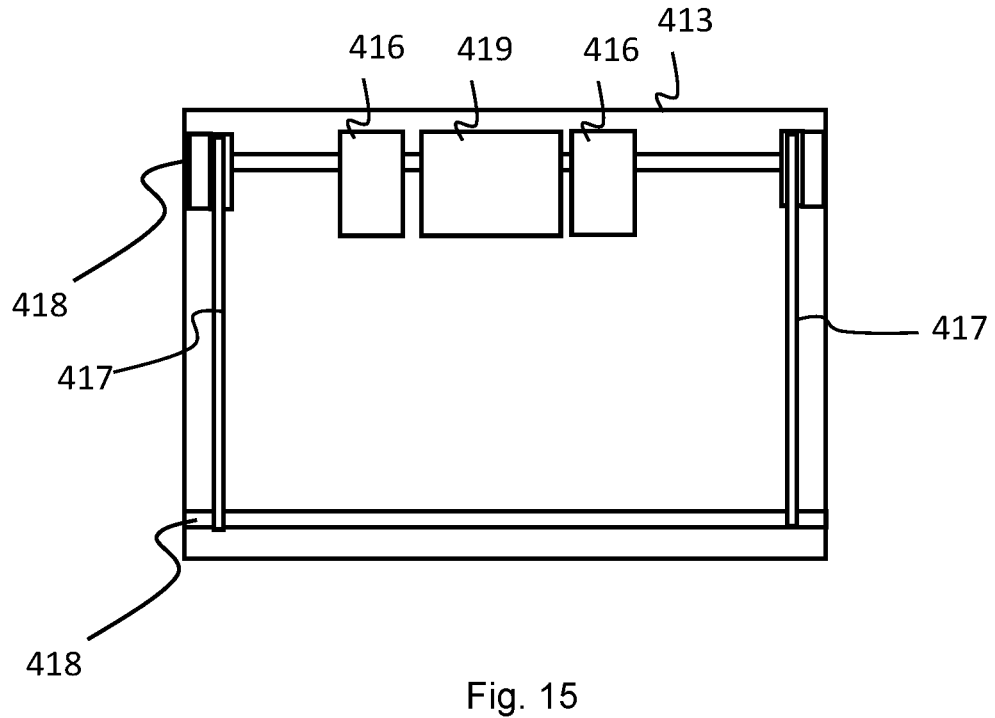
Figure 16A:
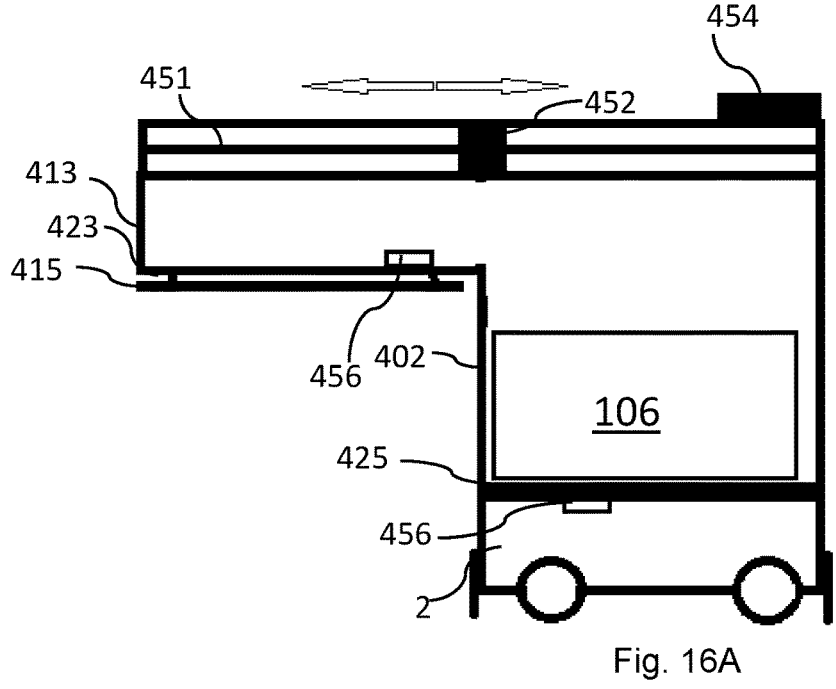
Figure 16B:
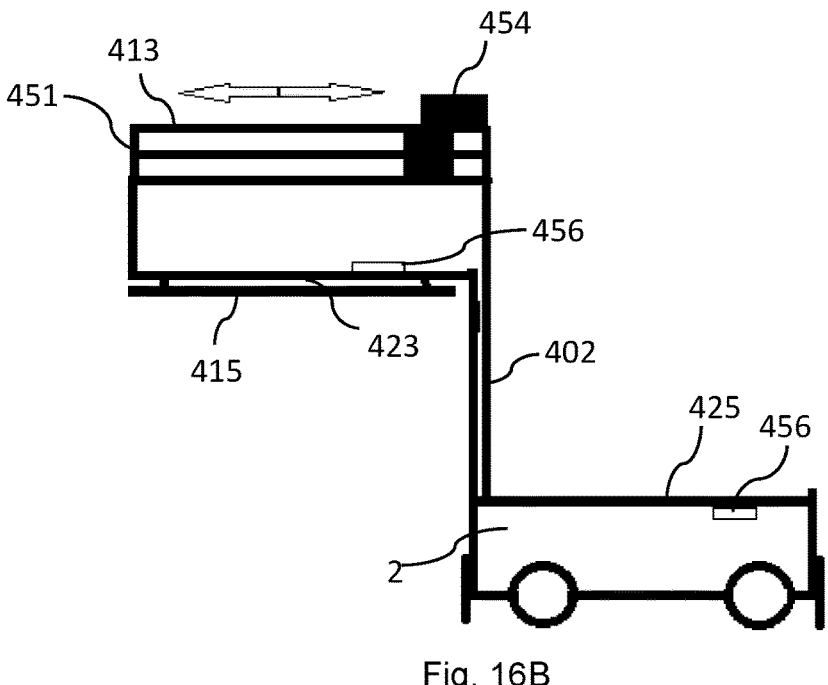
Figures 17A, 17B, 17C:
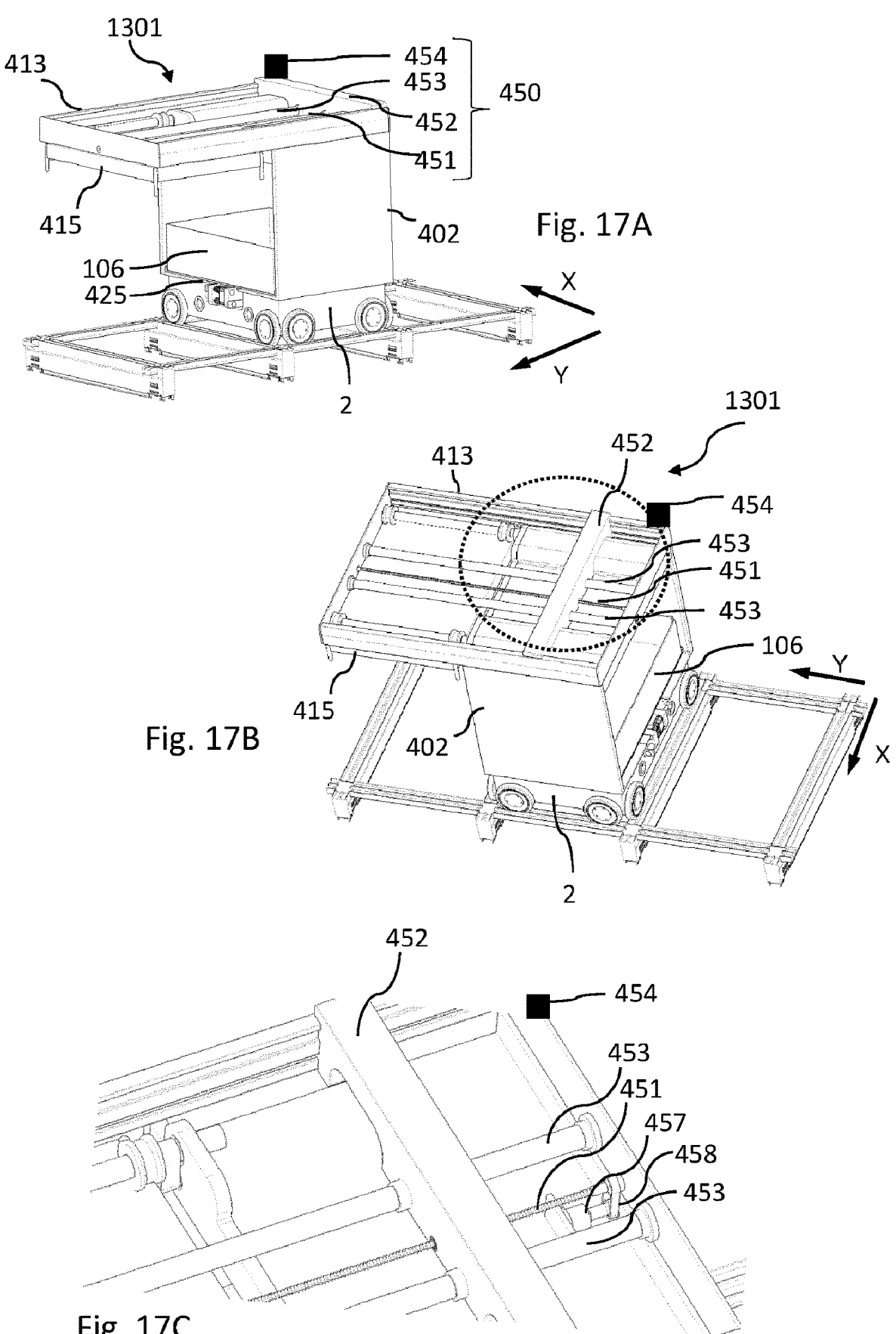
Figure 18A:
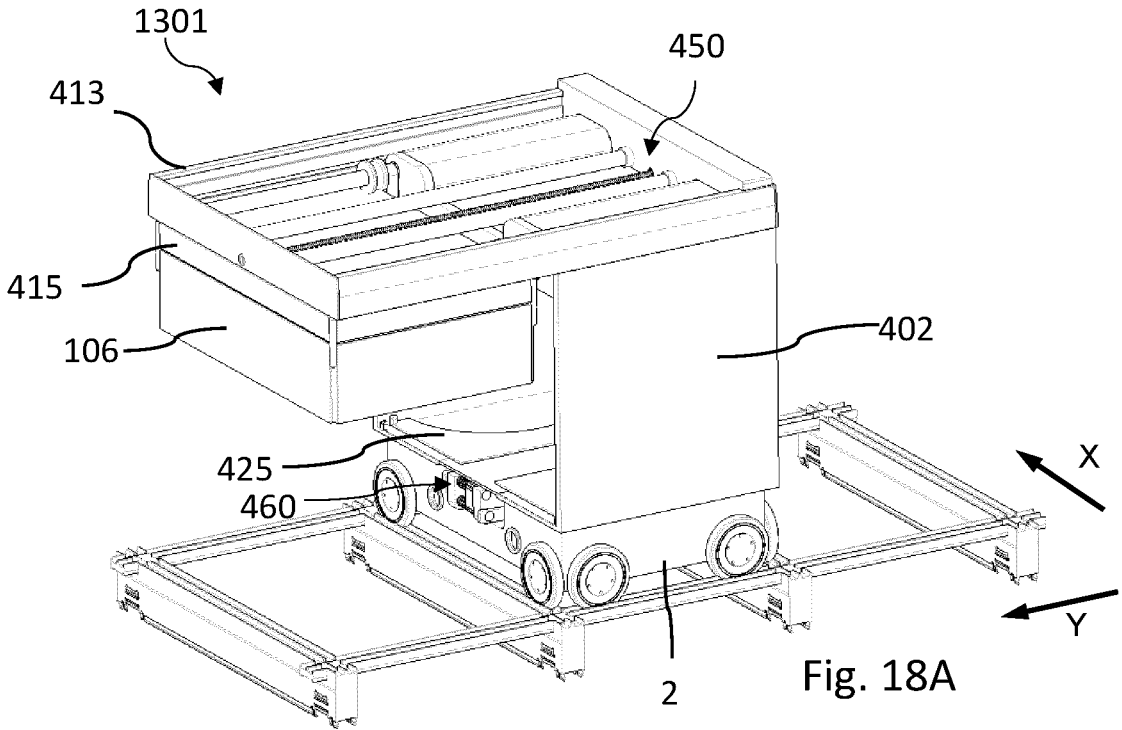
Figure 18B:
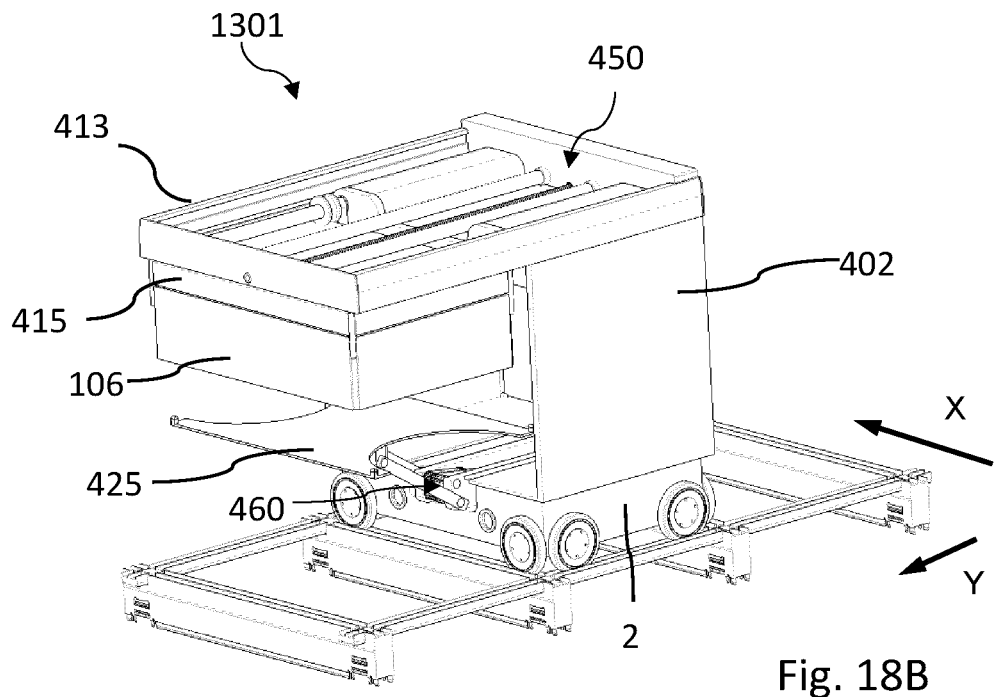
Figures 18C, 18D, 18E:
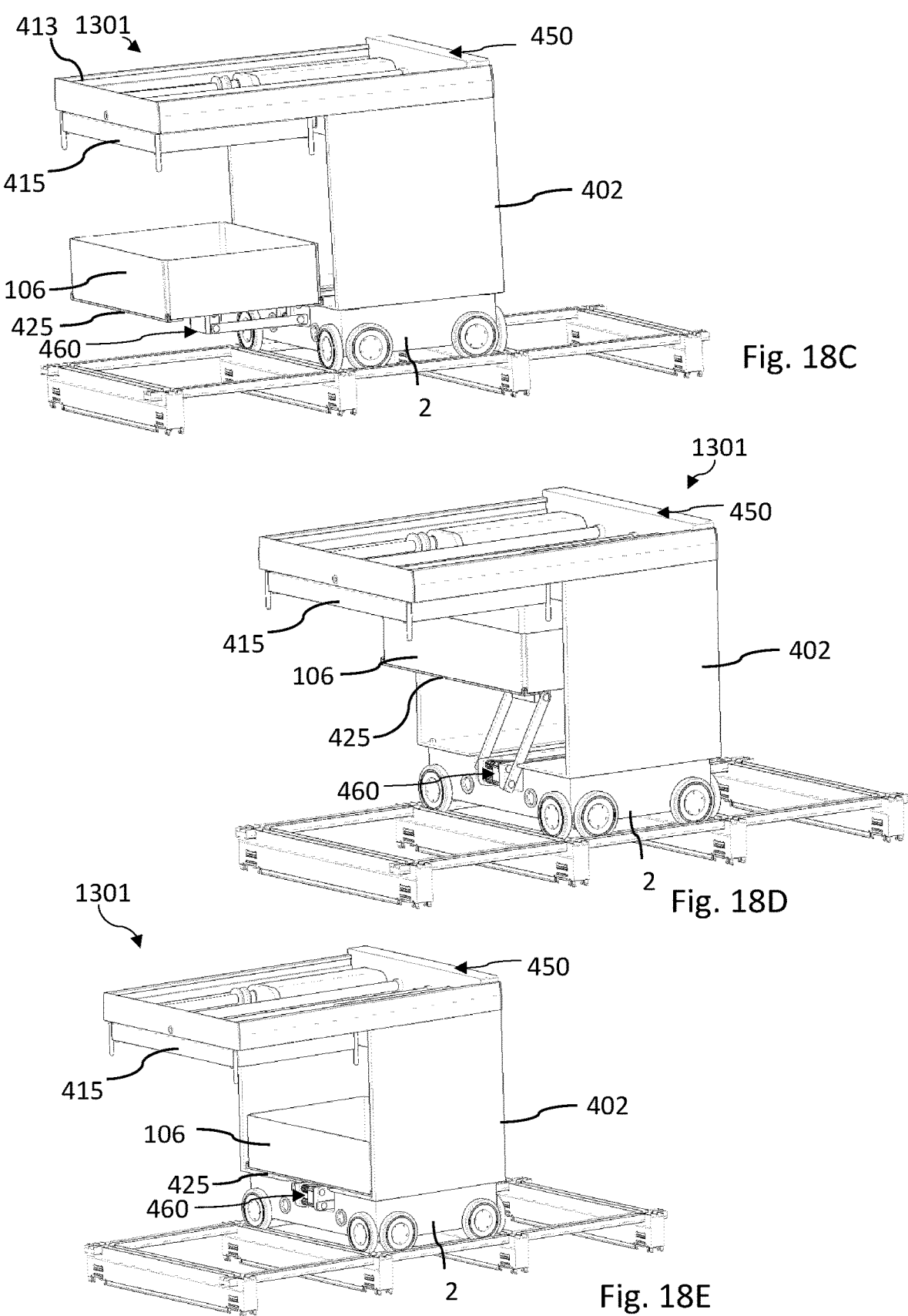
Figure 19A:
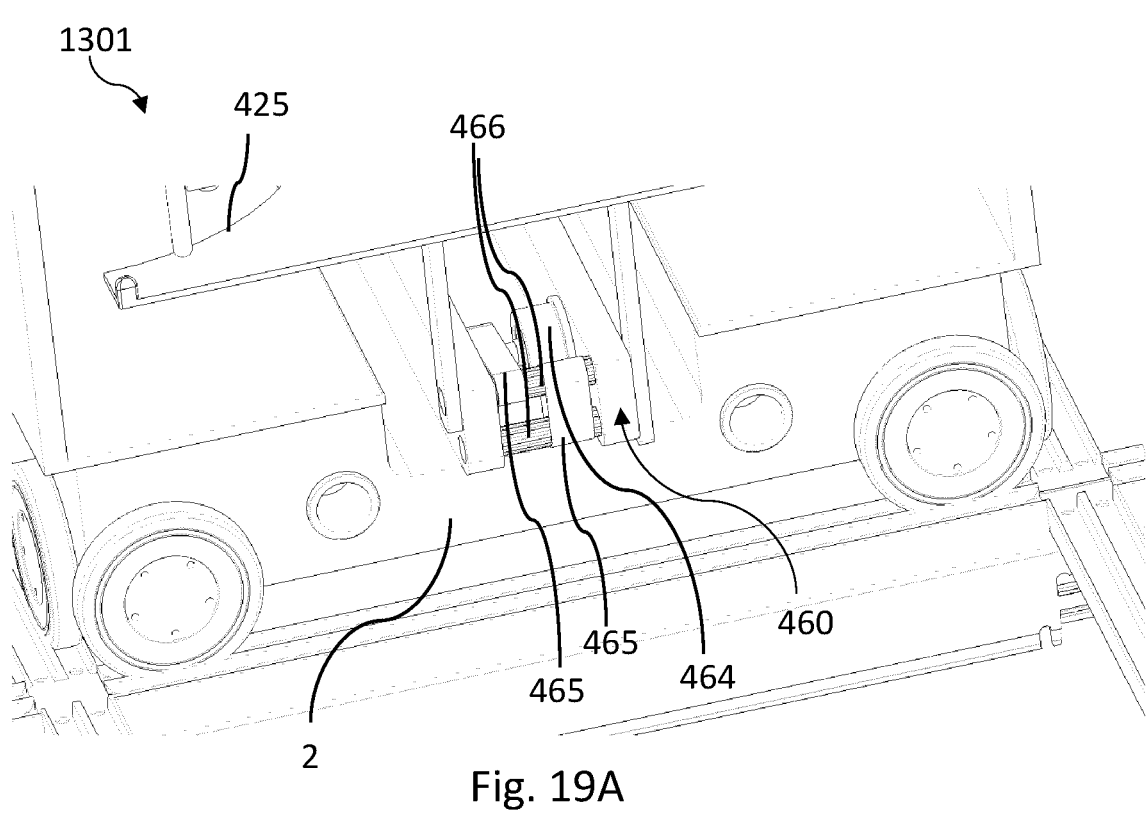
Figure 19B:
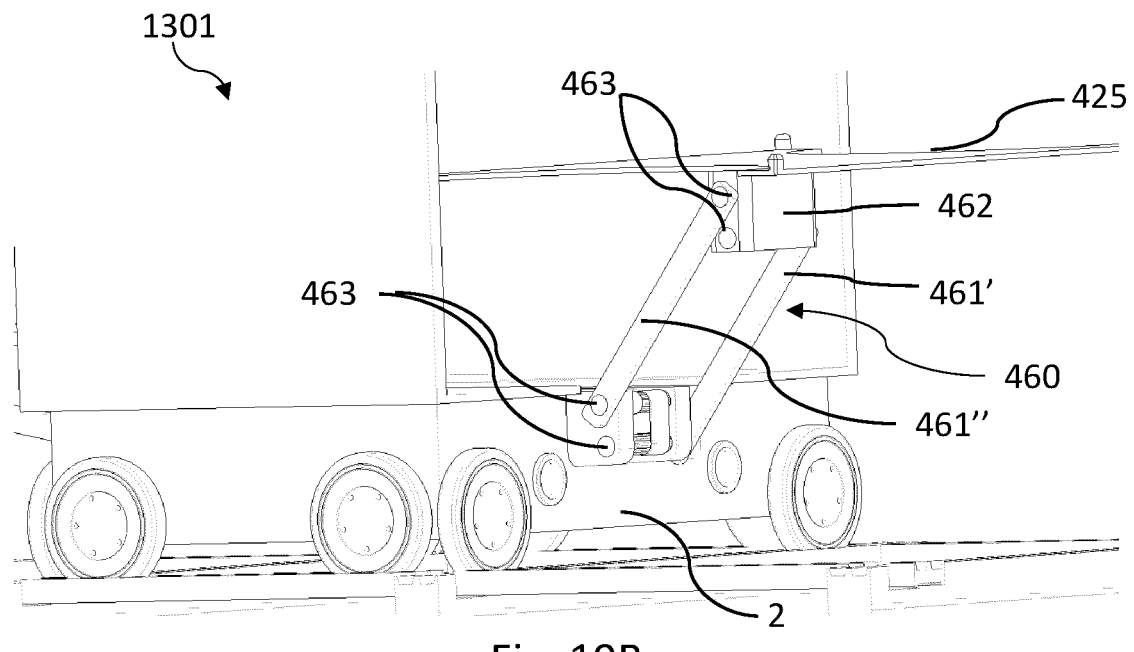
Figure 20A:
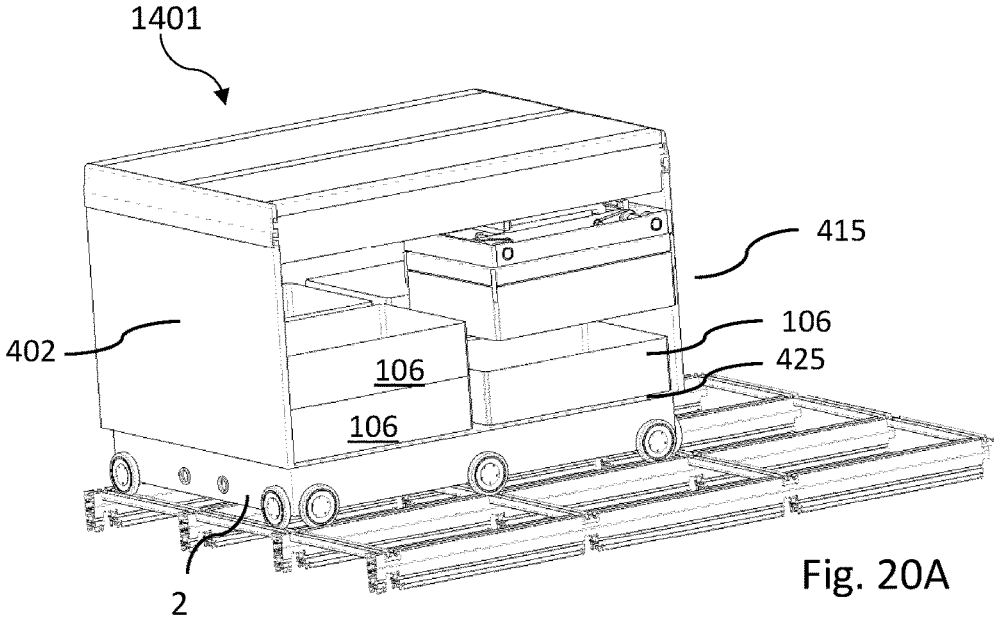
Figure 20B:
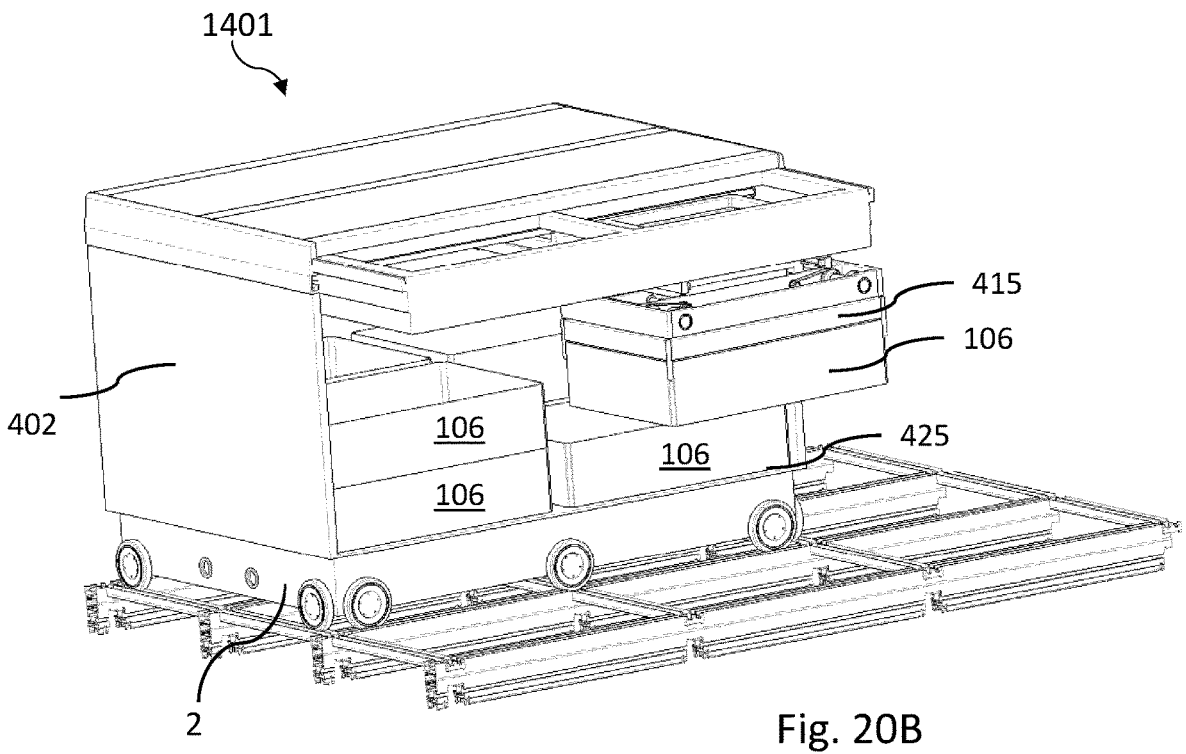
Figure 21A:
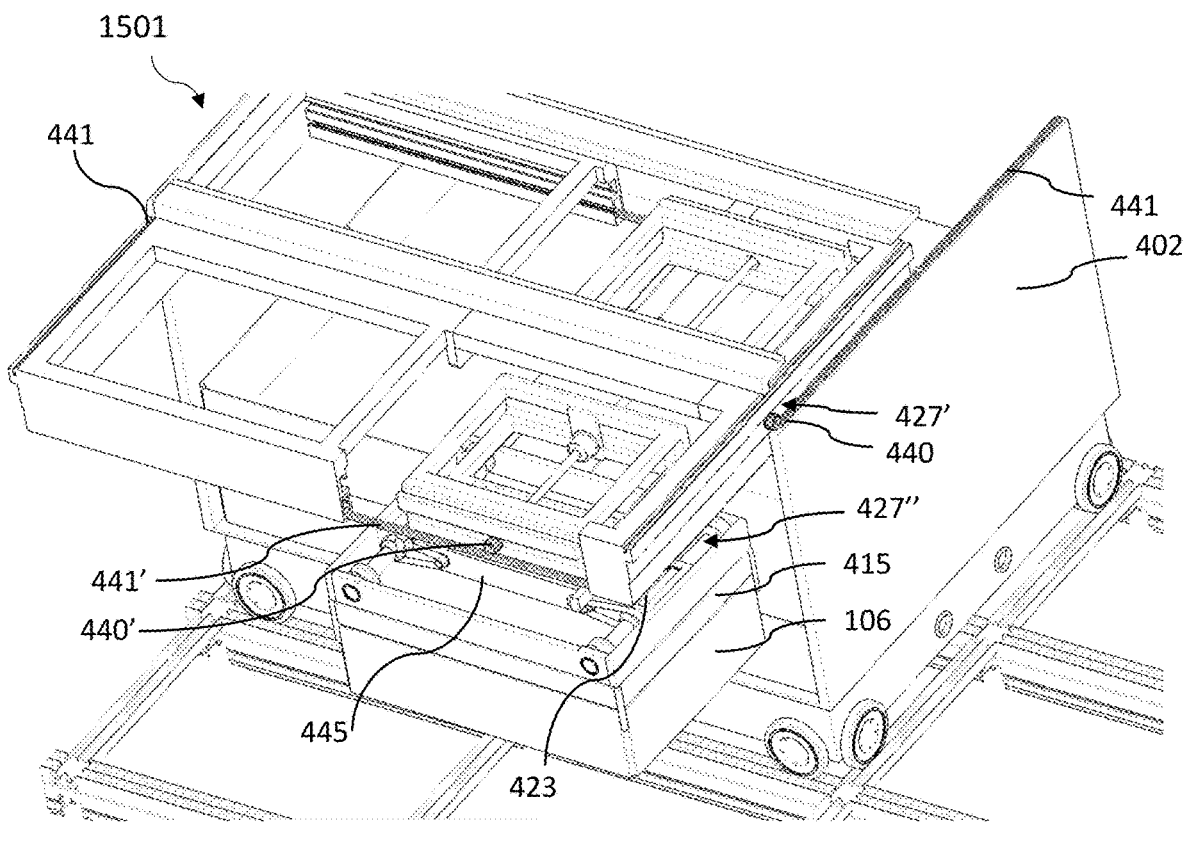
Figure 21B:
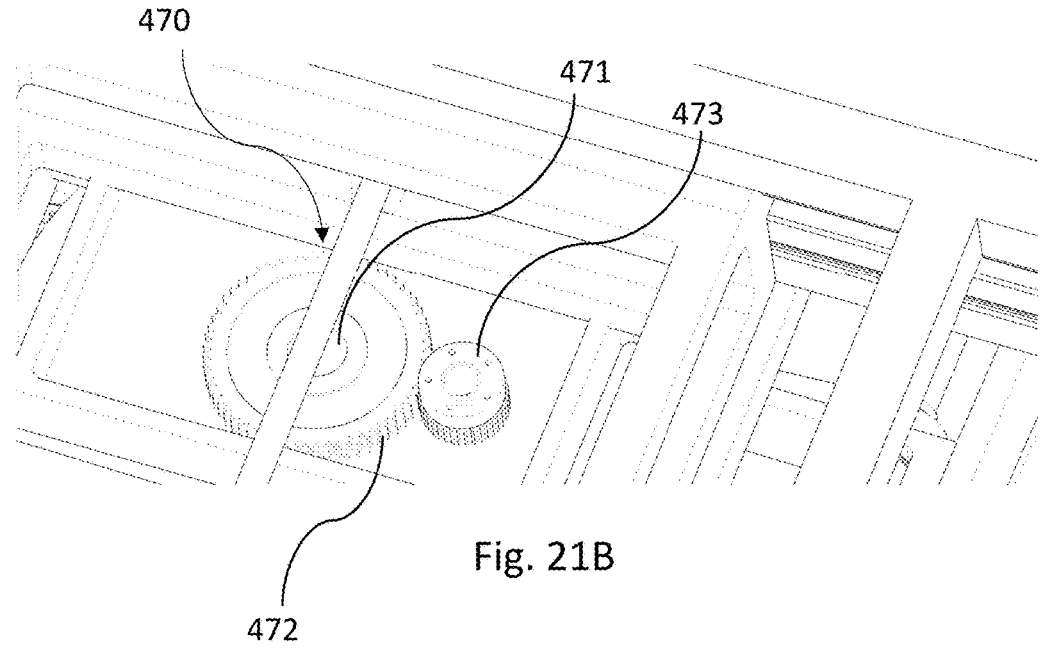
Figure 21C:
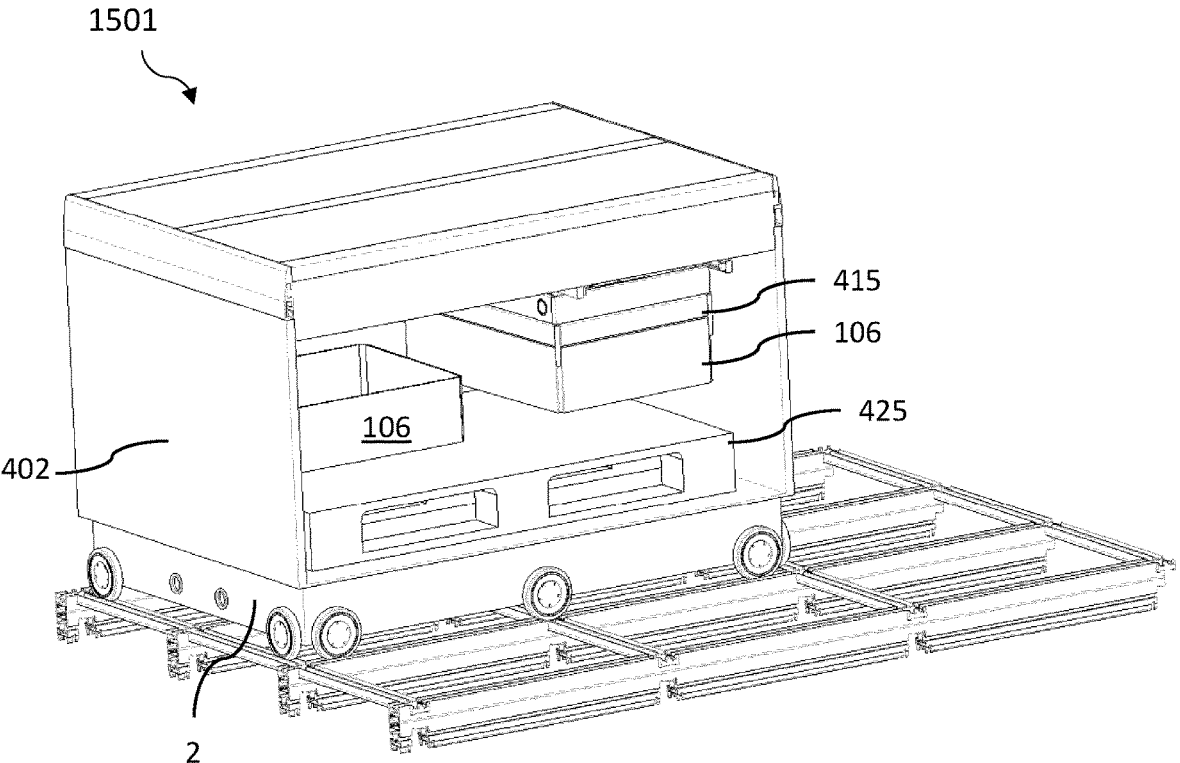

12 the upper support surface holds a storage container while lower support surface is empty;

FIG. 6C is a rear side view of a container handling vehicle holding one storage container on the upper and lower support surfaces, respectively, while the lifting frame is not holding a storage container;

FIG. 6D is a side view of a container handling vehicle holding one storage container by the lifting frame whereas the upper support surface holds a storage container;

FIG. 6E is a side view of a container handling vehicle where one storage container is carried by the upper support surface arranged directly above the wheeled base and one storage container carried by the lower support surface arranged directly below the lifting frame;

FIG. 6F is a rear side view of FIG. 6E;

FIGS. 7A-7E are examples of a container handling vehicle with two lifting frames arranged on opposite sides of a wheeled base, openings are provided in the support section and there are arranged a total of four support surfaces arranged two side by side in two heights, where all of the support surfaces are linearly movable relative the wheeled base between a position directly above the wheeled base and a position directly below the lifting frame, and where:

FIG. 7A is a side view of a container handling vehicle where storage containers are carried by both of the lifting frames, and where all of the support surfaces are in a position directly above the wheeled base and all of them are empty;

FIG. 7B is a side view of a container handling vehicle where storage containers are carried by both of the lifting frames, and where the two upper support surfaces are moved to respective positions directly below each of the lifting frames, while the two lower support surfaces are in a position directly above the wheeled base;

FIG. 7C is a side view of a container handling vehicle where storage containers are carried by both of the lifting frames, and where the two upper support surfaces are arranged directly above the wheeled base, both of them holding a storage container, while the two lower support surfaces are arranged directly below the lifting frame which is shown not holding a storage container;

FIG. 7D is a side view of a container handling vehicle where the lifting frames are not holding storage containers, and where the two upper support surfaces are arranged directly above the wheeled base, both of them holding a storage container, while the two lower support surfaces are arranged directly below the lifting frame holding storage containers;

FIG. 7E is a side view of a container handling vehicle where the lifting frames are not holding storage containers, and where all of the support surfaces are arranged directly above the wheeled base, all of them are holding a storage container;

FIGS. 8A-8G are examples of a container handling vehicle with one lifting frame arranged in center between two wheeled bases, openings are provided in the support section and there are arranged a total of four support surfaces arranged two on each side of the lifting frame, the support surfaces are linearly movable relative the respective wheeled bases between a position directly above the wheeled base and a position directly below the lifting frame, and where:

FIG. 8A is a side view of a container handling vehicle where the lifting frame is not holding a storage container, while the remaining three support surfaces are arranged directly above the respective wheeled bases, all of them are empty;

FIG. 8B is a is a side view of a container handling vehicle where the lifting frame is not holding a storage container, and where three of the support surfaces are arranged directly above the respective wheeled bases, and one of them is positioned directly below the lifting frame and is holding a storage container while the remaining three are empty;

FIG. 8C is a side view of a container handling vehicle where the lifting frame does not hold a storage container, and where all of the support surfaces are arranged directly above its respective wheeled base, one of them holding a storage container while the remaining three are empty;

FIG. 8D is a side view of a container handling vehicle where the lifting frame holds a storage container, and where one support surface is arranged directly below the lifting frame while the remaining three support surfaces are arranged directly above the wheeled bases, one of them holding a storage container while the remaining two are empty;

FIG. 8E is a side view of a container handling vehicle where the lifting frame holds a storage container, and where all of the support surfaces are arranged directly above the wheeled bases, two of them holding a storage container while two are empty;

FIG. 8F is a side view of a container handling vehicle where the lifting frame is not holding a storage container, and where one support surface is arranged directly below the lifting frame, while the remaining three support surfaces are arranged directly above the wheeled bases, two of them holding a storage container while one is empty;

FIG. 8G is a side view of a container handling vehicle where the lifting frame is not holding a storage container, and where all of the support surfaces are arranged directly above the wheeled bases, three of them holding a storage container while one is empty;

FIGS. 9A-9E are examples of a container handling vehicle with one lifting frame suspended from a set of suspension points, where the set of suspension points and thus the lifting frame are configured for translational movement from a position directly above fixed support surfaces arranged on a wheeled base of the container handling vehicle and a position directly above a storage position below a rail system, and where the Figures show sequential movement of storage containers from their respective storage positions below the rail system and onto the support surfaces in the container handling vehicle, and where:

FIG. 9A is a side view of the container handling vehicle where the lifting frame is in a position directly above a storage position below a rail system;

FIG. 9B is a side view of the container handling vehicle where the lifting frame has moved a distance equal to one grid cell relative its position in FIG. 9A and is in a position directly above one of the support surfaces and has dropped off the storage container on the support surface;

FIG. 9C is a side view of the container handling vehicle where the lifting frame is lowered down below the rail system and has picked up a storage container from a storage position below the rail system;

FIG. 9D is a side view of the container handling vehicle where the lifting frame has moved a distance equal to two grid cells relative its position in FIG. 9C and is in a position directly above the other of the support surfaces compared to FIG. 9B and has dropped off the storage container on the support surface;

FIG. 9E is a side view of the container handling vehicle after a total of four storage containers have been positioned on the support surfaces, two stacks of storage containers with two storage containers in each stack;

FIG. 10A shows a container handling vehicle with one lifting frame suspended from a set of suspension points, where the set of suspension points and thus the lifting frame are configured for translational movement from a position directly above fixed support surfaces arranged on a wheeled base of the container handling vehicle and two positions directly above a storage position below a rail system, where said two positions are on opposite sides of the wheeled base, and where the container handling vehicle in FIG. 10A occupies two grid cells because the lifting frame is directly above one of the fixed support surfaces;

FIG. 10B shows the container handling vehicle 901 of FIG. 10A where the lifting frame 415 has been moved to a position above a storage position below a rail system 108;

Figures 11A, 11B:
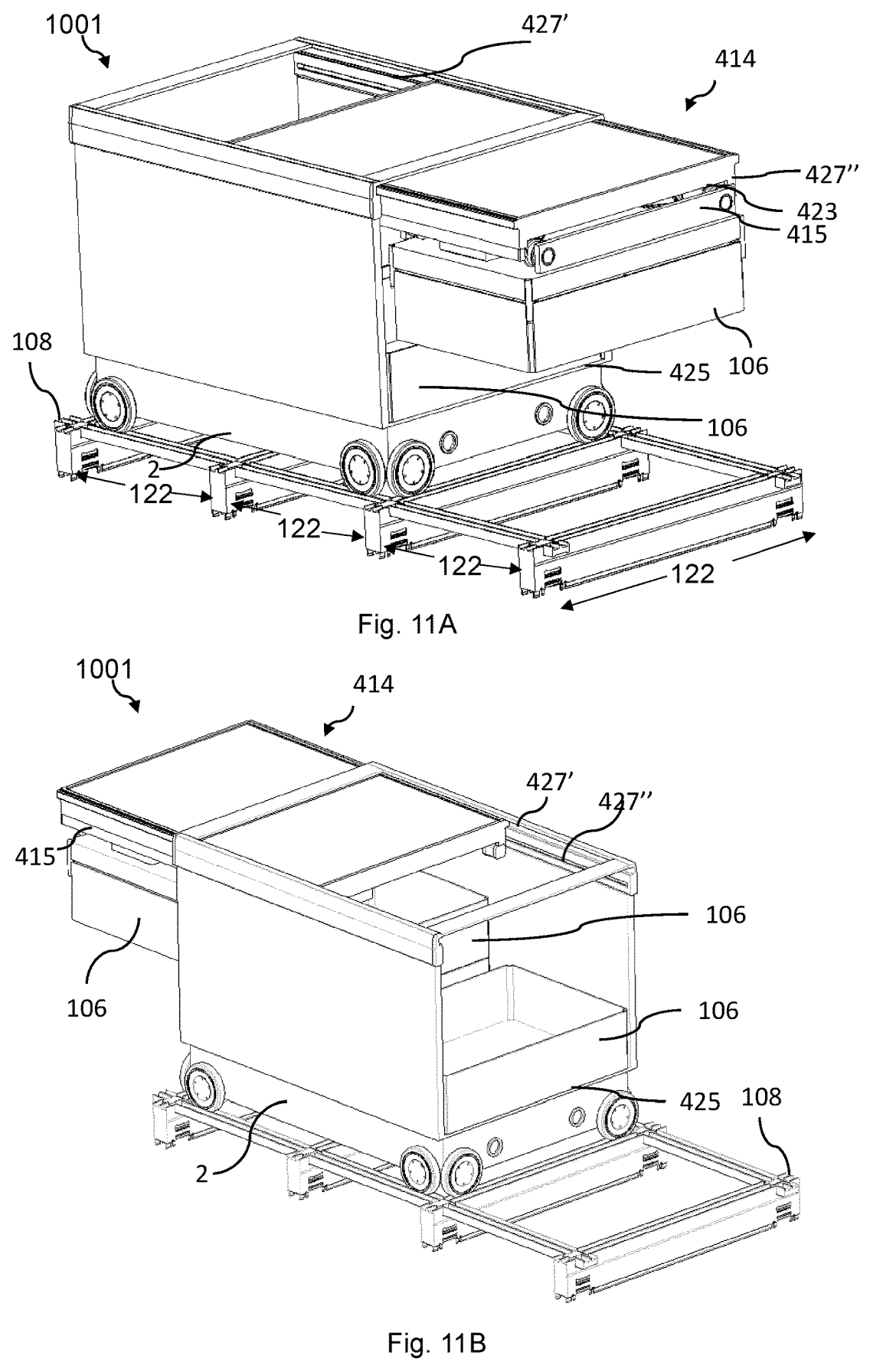

FIGS. 11A-11C are examples of a container handling vehicle arranged on a rail system, the container handling vehicle comprises one lifting frame suspended from a set of suspension points, where the set of suspension points and thus the lifting frame are configured for translational movement from a position directly above fixed support surfaces arranged on a wheeled base of the container handling vehicle and two positions directly above a storage position below a rail system, where said two positions are on opposite sides of the wheeled base, and where:

FIG. 11A shows a container handling vehicle where the lifting frame is arranged directly above a storage position below a rail system and holds a storage container, the container handing vehicle occupying three grid cells in this configuration;

FIG. 11B shows a container handling vehicle where the lifting frame is arranged on an opposite side of the wheeled base compared to FIG. 11A and is arranged directly above a storage position below a rail system and holds a storage container, the container handling vehicle occupying three grid cells in this configuration;

FIG. 11C shows a container handling vehicle where the lifting frame is arranged directly above one of the support surfaces, the container handling vehicle occupying two grid cells in this configuration;

FIGS. 12A-12D are examples of a container handling vehicle with one lifting frame suspended from a set of suspension points, where the set of suspension points and thus the lifting frame is configured for translational movement from a position directly above movable support surfaces arranged on a wheeled base of the container handling vehicle and a position directly above a storage position below a rail system, and where the Figures show different relative positions of the lifting frame and the movable support surfaces(s), and where:

FIG. 12A shows a container handling vehicle where the lifting frame is in a position directly above the wheeled base and an empty support surface is in a position outside (beyond) the wheeled base;

FIG. 12B shows a container handling vehicle where the lifting frame is in a position directly above the wheeled base and a support surface holding a storage container is in a position outside (beyond) the wheeled base;

FIG. 12C shows a container handling vehicle where the lifting frame is in a position outside (beyond) the wheeled base, a support surface holding a storage container is in a position outside (beyond) the wheeled base directly below the lifting frame;

FIG. 12D shows a container handling vehicle where the lifting frame is in a position outside (beyond) the wheeled base and holds a storage container, the support surfaces are arranged directly above the wheeled base;

FIG. 13A is a top view of a container handling vehicle with two linear movement mechanisms for the suspension points and thus the lifting frame, the movement mechanism comprising a linear guide system which is extendable, wherein the first movement mechanism is for horizontal translational movement of the lifting frame or the support surface within an area defined by the vertical projection of the wheeled base, and a second movement mechanism for horizontal translational movement of the lifting frame or the support surface outside (beyond) an area defined by the vertical projection of the wheeled base;

FIG. 13B is an enlarged view of section A in FIG. 13A;

FIG. 13C shows detail of a linear movement mechanism in the form ball screw for moving the suspension points or the movable support surface;

FIG. 13D is an enlarged view of section B in FIG. 13C;

In FIG. 13E the transverse support elements have been removed to better illustrate the threaded shaft part and the nuts comprising ball bearings engaging the transverse support element for interaction with the threaded shaft part;

FIGS. 14A-14D are examples of a container handling vehicle with a wheeled base, a support section and a cantilever section, wherein the lifting frame suspended from a set of suspension points in the cantilever section, and wherein the movement mechanism comprises a rotation device adapted to rotate the support section and thus the cantilever section relative the wheeled base such that in a first state the lifting frame can lift a container up from a storage position below the rail system and in a second state the lifting frame can place a storage container on the support surface, where:

FIG. 14A shows a container handling vehicle where the lifting frame is arranged directly above a storage position below the rail system, the support surface is empty;

FIG. 14B is a rear view of FIG. 14A;

FIG. 14C shows a container handling vehicle where the lifting frame has been rotated 180 degrees compared to FIGS. 14A and 14B, both the lifting frame and the support surface are empty, i.e. not holding a storage container;

FIG. 14D a container handling vehicle where the lifting frame is arranged directly above a storage position below the rail system, both the lifting frame and the support surface holding a storage container;

FIG. 15 is a top view of an example of which components of the container handling vehicle that can be arranged in the lifting device;

FIGS. 16A-16B show different examples of container handling vehicles with a weight distribution system comprising a movable load and a load moving device for changing a center of gravity of the container handling vehicle dependent on the load of one or more storage containers carried by the container handling vehicle; where:

FIG. 16A shows an example of a container handling vehicle with a cantilever design and a movable support surface;

FIG. 16B is an example of the container handling vehicle of FIGS. 5A-5H with a weight distribution system;

FIGS. 17A-17C show different examples of a container handling vehicle with a through-going opening in the support section and where the support surface is linearly movable relative the wheeled base between a position directly above the wheeled base and a position directly below the lifting frame, the container handing vehicle further comprises a weight distribution system, and where:

FIG. 17A is a front perspective view of a storage container arranged on a support surface positioned directly above the wheeled base;

FIG. 17B is a top perspective view of FIG. 17A;

FIG. 17C is a detailed view of the dotted area in FIG. 17B;

FIGS. 18A-18E show details of the container handling vehicle in FIGS. 17A-17C, the container handling vehicle having a wheeled base, a support section and a cantilever section, wherein the lifting frame suspended from a set of suspension points in the cantilever section, and where the support surface is movable relative the wheeled base between a position directly above the wheeled base and a position directly below the lifting frame through a rotational movement in the vertical plane, where:

FIG. 18A is a side perspective view of the container handling vehicle where the lifting frame holds a storage container, and an empty support surface is directly above the wheeled base;

In FIG. 18B, the lifting frame still holds a storage container and the support surface is about to move from its initial position directly above the wheeled base to a position directly below the lifting frame;

In FIG. 18C the support surface has moved to a position directly below the lifting frame and the lifting frame does not hold the storage container as it has been dropped off onto the support surface;

In FIG. 18D the lifting frame does not hold a storage container, and the support surface and the storage container provided thereupon is about to move from the position directly below the lifting frame to the position directly above the wheeled base;

In FIG. 18E the lifting frame does not hold a storage container, and the support surface and the storage container provided thereupon has moved to the position directly above the wheeled base;

FIGS. 19A and 19B show details of a vertical plane movement mechanism for moving the support surface between a position directly above the wheeled base and a position directly below the lifting frame;

FIGS. 20A-20B show an example of a container handling vehicle with three linear movement mechanisms for the suspension points and thus the lifting frame, the movement mechanism comprising a linear guide system which is extendable, wherein the first movement mechanism is for horizontal translational movement of the lifting frame in a first direction within an area defined by the vertical projection of the wheeled base, the second movement mechanism is for horizontal translational movement of the lifting frame outside (beyond) an area defined by the vertical projection of the wheeled base, and the third movement mechanism is for movement in a direction perpendicular to the first direction; where:

In FIG. 20A the lifting frame is arranged within an area defined by the vertical projection of the wheeled base;

In FIG. 20B the lifting frame has been moved to a position outside an area defined by the vertical projection of the wheeled base;

FIGS. 21A-21C show an example of a container handling vehicle with three linear movement mechanisms for the suspension points and thus the lifting frame and rotation mechanism for rotating the suspension points and thus the lifting frame:

In FIG. 21A the lifting frame is in a position outside an area defined by the vertical projection of the wheeled base;

In FIG. 21B an example of the rotation mechanism for rotating the suspension points and thus the lifting frame is shown;

In FIG. 21C the lifting frame is in a position within an area defined by the vertical projection of the wheeled base and the lifting frame has been rotated 90 degrees compared to the lifting device in FIG. 21A;

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

Figure 1A:
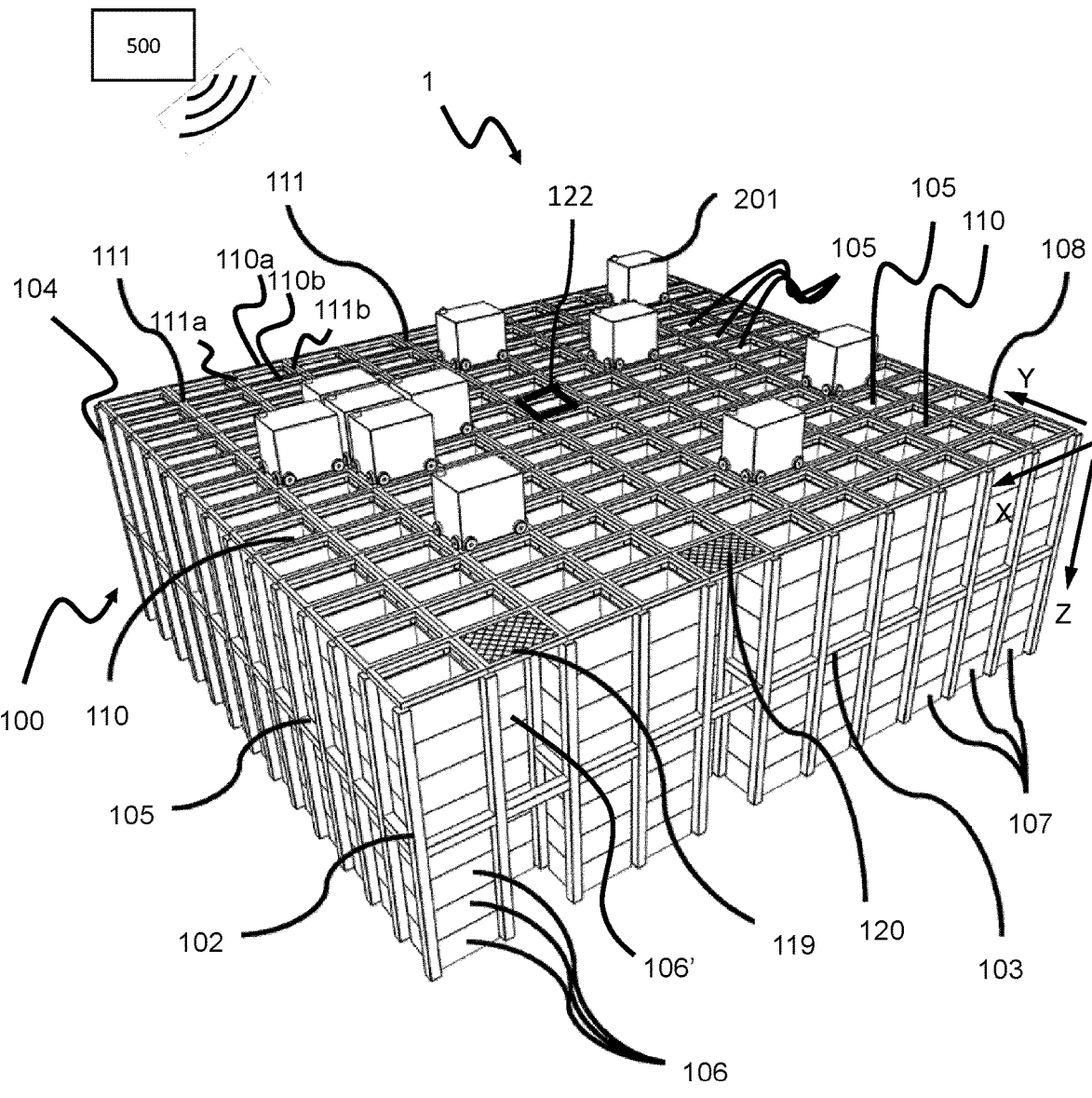
Figure 2:
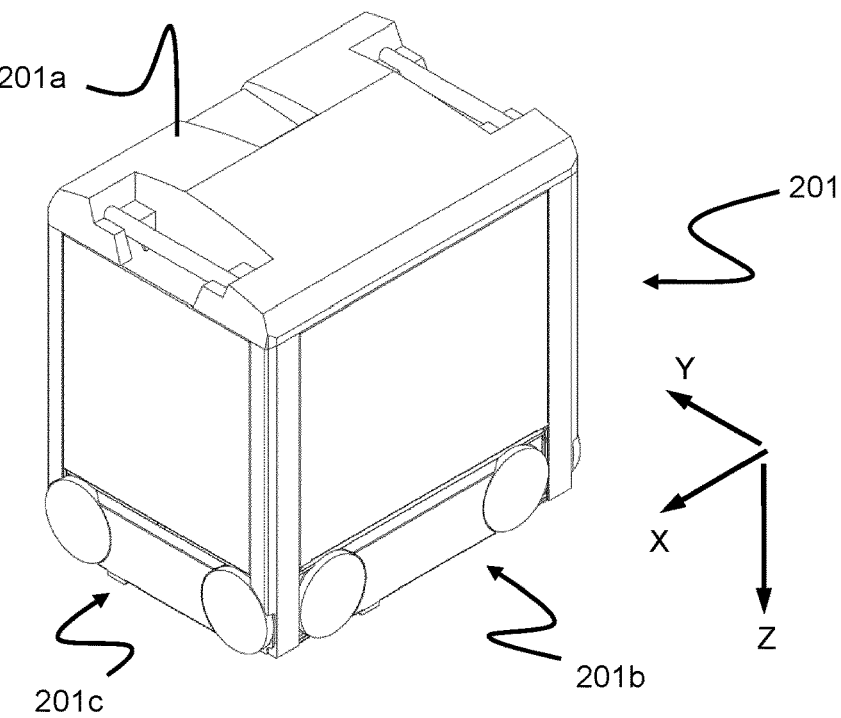
FIG. 2 is a perspective view of a prior art container handling vehicle having a centrally arranged cavity for carrying storage containers therein.
Figure 3:
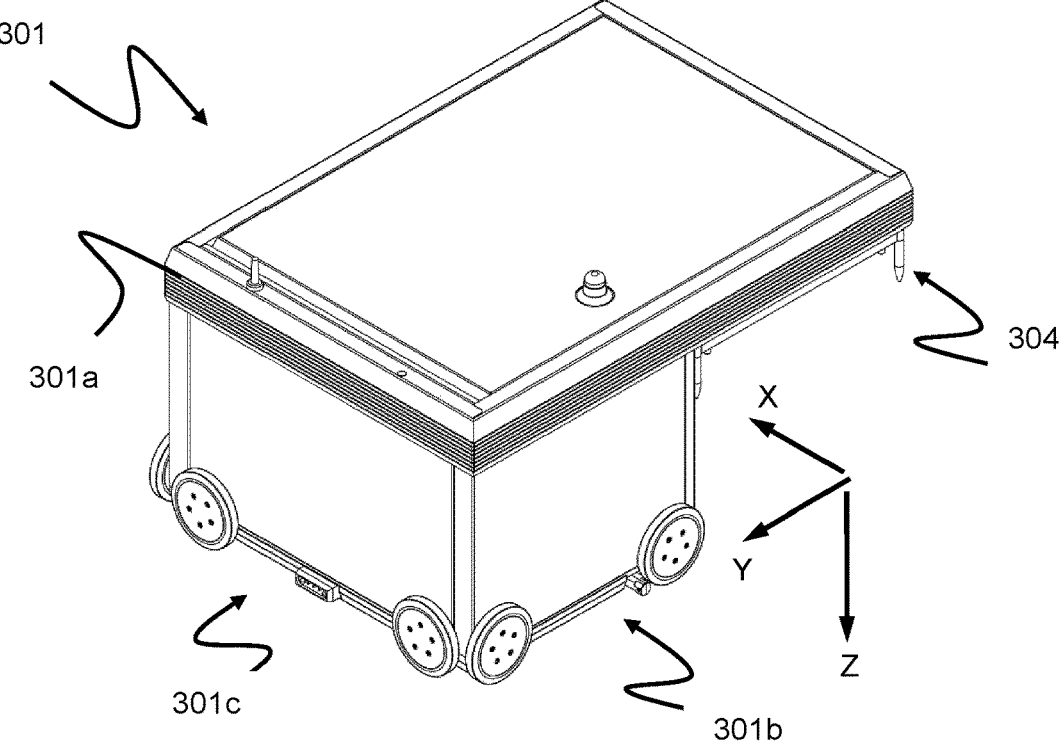
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1A. For example, the framework structure 100 may have a horizontal extent of more than 700×700 columns and a storage depth of more than twelve containers.

Figure 4A:
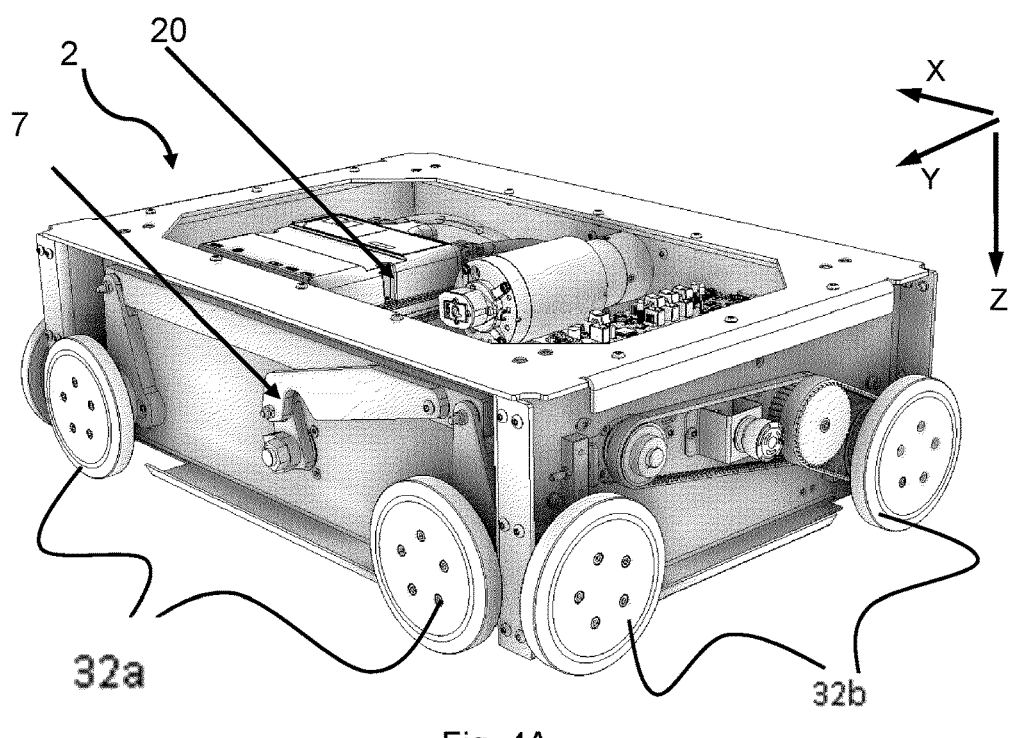
FIGS. 4A and 4B show an exemplary wheeled base in the form of a wheel base unit for the container handling vehicle.
Figure 4B:
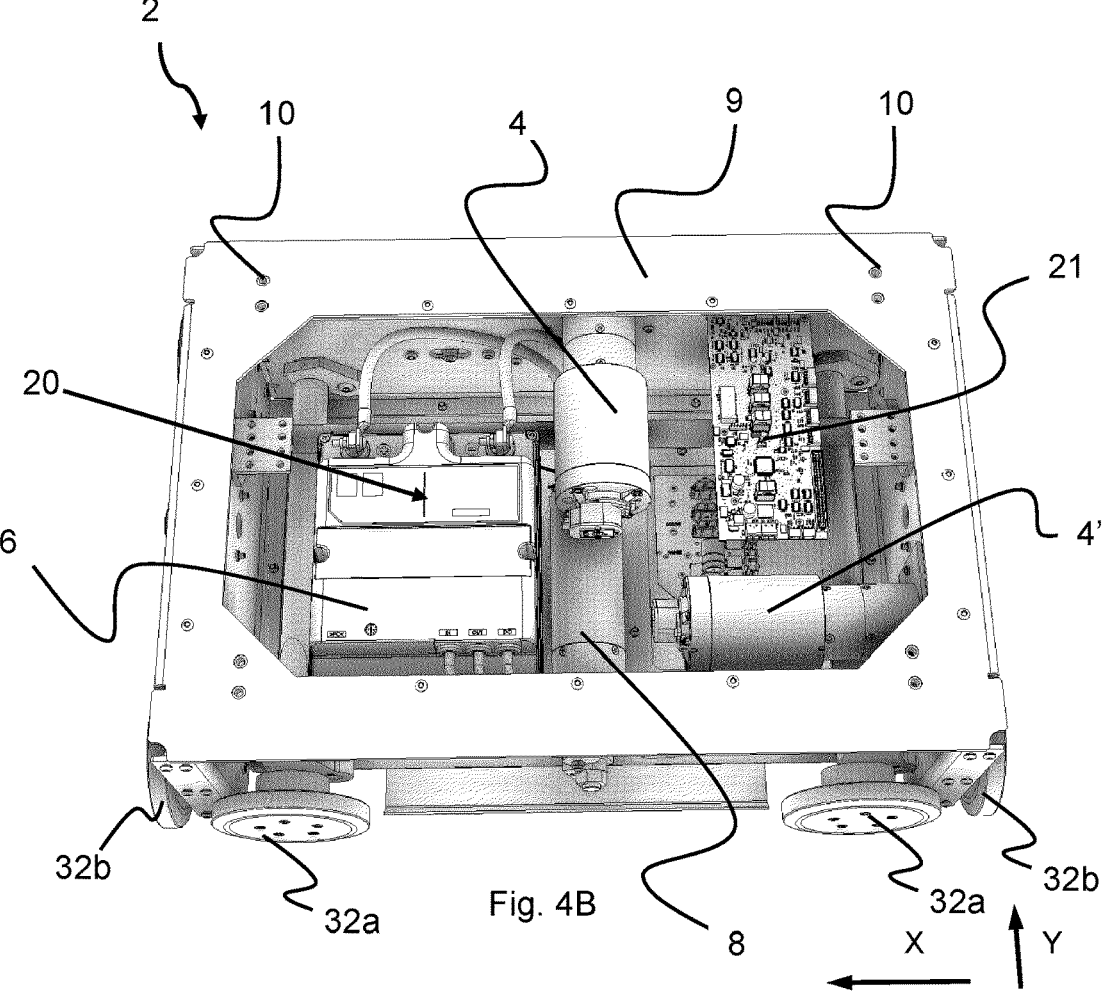

An exemplary wheeled base in the form of a wheel base unit for a remotely operated vehicle according to the invention is shown in FIGS. 4A and 4B. The wheel base unit 2 features a wheel arrangement 32*a*, 32*b* having a first set of wheels 32*a* for movement in a first direction upon a rail system and a second set of wheels 32*b* for movement in a second direction perpendicular to the first direction. Each set of wheels comprises two pairs of wheels arranged on opposite sides of the wheel base unit 2. To change the direction in which the wheel base unit may travel upon the rail system, one of the sets of wheels 32*b* is connected to a wheel displacement assembly 7. The wheel displacement assembly is able to lift and lower the connected set of wheels 32*b* relative to the other set of wheels 32*a* such that only the set of wheels travelling in a desired direction is in contact with the rail system. The wheel displacement assembly 7 is driven by an electric motor 8. Further, two electric motors 4,4', powered by a rechargeable battery 6, are connected to the set of wheels 32*a*,32*b* to move the wheel base unit in the desired direction.

Further referring to FIGS. 4A and 4B, the horizontal periphery of the wheel base unit 2 is dimensioned to fit within the horizontal area defined by a grid cell, such that two wheel base units 2 may pass each other on any adjacent grid cells of the rail system 108, 308. In other words, the wheel base unit 2 may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference.

Referring to FIG. 4B, the wheel base unit 2 has a top panel/flange 9 (i.e. an upper surface) configured as a connecting interface for the container carrier. The top panel 9 has a centre opening 20 and features multiple through-holes 10 (i.e. connecting elements) suitable for a bolt connection via corresponding through-holes in a lower section of the container carrier. In other embodiments, the connecting elements of the top panel 9 may for instance be threaded pins for interaction with the through-holes of the lower section. The presence of a centre opening 20 is advantageous as it provides access to internal components of the wheel base unit 2, such as the rechargeable battery 6 and an electronic control system 21.

FIGS. 5A-5H show different examples of a container handling vehicle 401 with a through-going opening 422 in the support section 402 and where the support surface 425 is linearly movable relative the wheeled base 2 between a position directly above the wheeled base 2 and a position directly below the lifting frame 415 through the through-going opening 422. The container handling vehicle 401 is disclosed with a wheeled base 2 comprising a first and second sets of wheels 32*a*, 32*b* for guiding the container handling vehicle 401 along a rail system 108 in first and second perpendicular directions X, Y, respectively. The container handling vehicle further comprises a support structure 402 provided on the wheeled base 2, the support structure 402 extending from a lower section at the wheeled base 2 to an upper section where a cantilever section 413 is connected. The container handling vehicle 401 further comprises a container lifting device 414 comprising a lifting frame 415 for lifting a storage container 106 up from a storage position below an underlying rail system (rail system not shown in FIGS. 5A-5H). The lifting frame 415 is suspended from a set of suspension points (not shown in FIGS. 5A-5H) of the cantilever section 413 via lifting bands (also not shown in FIGS. 5A-5H) and comprises bin guides 424 in each corner for assisting in guiding the lifting frame 415 relative the storage container 106 when approaching a storage container 106 from above. The lifting frame 415 further comprises a releasable connection or gripper 421 for connection with corresponding holes in the storage container. The container handling vehicle 401 further comprises a support surface 425 for supporting a storage container 106, the support surface 425 providing a first holding position arranged at a lower elevation than the lifting frame 415 when the lifting frame 415 is in a docked state adjacent the cantilever section 413. The container handling vehicle 401 comprises a linear movement mechanism 426 to translate horizontally the support surface 425 with respect to the wheeled base 2, such that a lifted storage container 106 can be placed on the support surface 425 and the lifting frame 415 disconnected from it. A footprint of the wheeled base 2 is one grid cell, whereas a footprint of the container handling vehicle is two grid cells.

FIG. 5A is a front perspective view of a storage container 106 arranged on a support surface 425 positioned directly below the lifting frame 415 of the container handling vehicle 401.

FIG. 5B is a rear perspective view of FIG. 5A.

In FIG. 5C, a storage container 106 is arranged on the support surface 425 and the support surface 425 with the storage container 106 arranged thereon is in mid-transition between the position directly below the lifting frame 415 to a position directly above the wheeled base 2.

FIG. 5D is a rear perspective view of FIG. 5C.

Figure 5E:
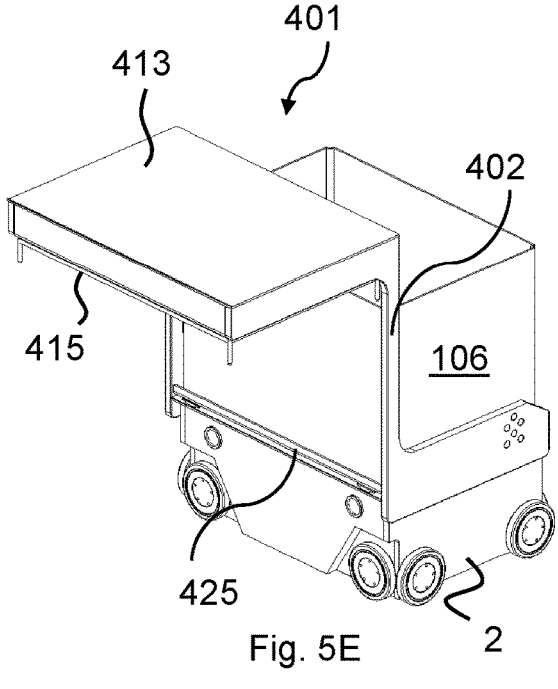

FIG. 5E is a front perspective view of a storage container 106 arranged on a support surface 425 which has moved from a position directly below the lifting frame (as in FIGS. 5A and 5B) to a position directly above the wheeled base 2.

Figure 5F:
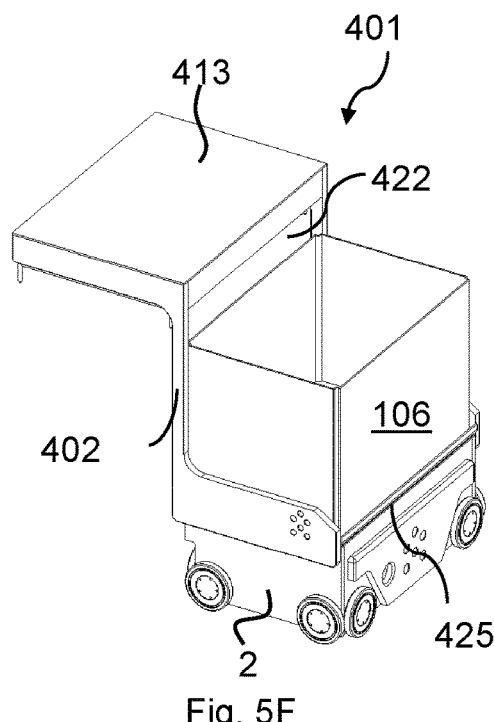

FIG. 5F is a rear perspective side view of FIG. 5E.

Figure 5G:
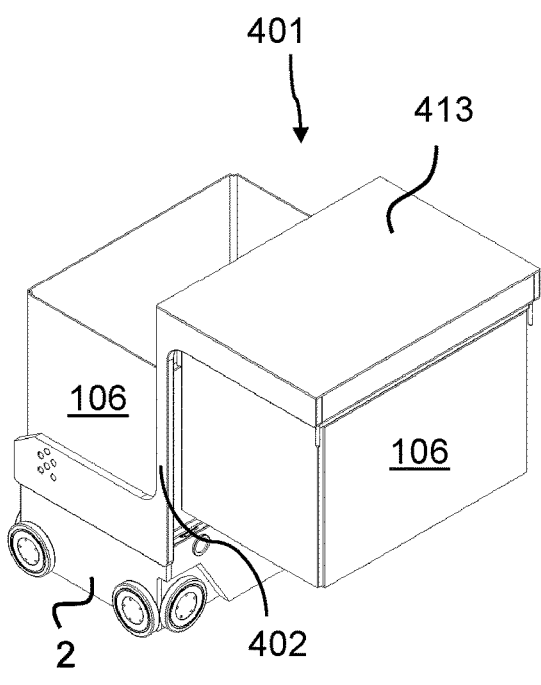
Figure 5G:
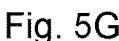

FIG. 5G is a front perspective view of a container handling vehicle 401 holding two storage containers 106, where one storage container 106 is lifted by the lifting frame 106 while the other storage container 401 is arranged on the movable support surface 425 positioned directly above the wheeled base 2.

Figure 5H:
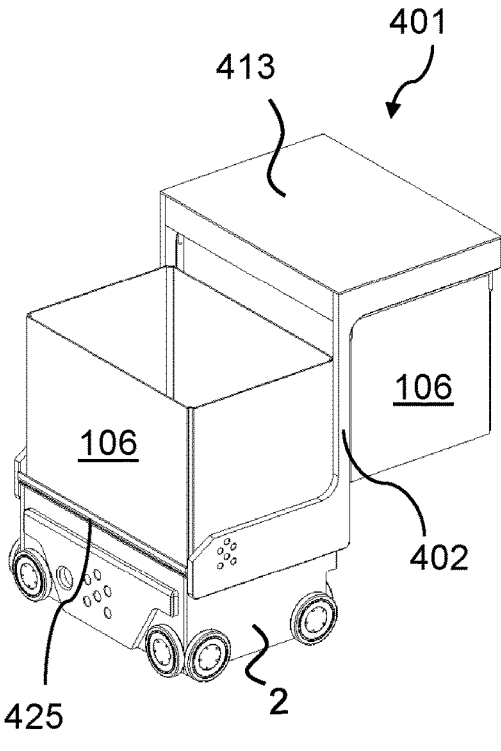

FIG. 5H is a rear perspective view of FIG. 5G.

FIGS. 6A-6F are examples of a container handling vehicle 501 with a through-going opening 422 in the support section 402 and where there are arranged two support surfaces 425 which are linearly movable relative the wheeled base 2 between a position directly above the wheeled base 2 and a position directly below the lifting frame 415. A footprint of the wheeled base 2 is one grid cell, whereas a footprint of the container handling vehicle is two grid cells. Thus, the container handling vehicle 501 in FIGS. 6A-6F may carry three storage containers 106 while occupying only two grid cells. The remaining features of the container handing vehicle 501 are similar to the features of the container handling vehicle 401 described in relation to FIGS. 5A-5H, and will not be repeated herein.

FIG. 6A is a side view of a container handling vehicle 501 holding one storage container 106 by the lifting frame 415 whereas the support surfaces 425 are empty.

FIG. 6B is a side view of a container handling vehicle 501 holding one storage container 106 by the lifting frame 415 whereas the upper support surface 425 holds a storage container 106 while lower support surface 425 is empty. The lower support surface 425 is shown at a position directly below the lifting frame 415 while the upper support surface is arranged directly above the wheeled base 2.

FIG. 6C is a rear side view of a container handling vehicle 501 holding one storage container 106 on each of the upper and lower support surfaces 425, respectively, while the lifting frame 415 is not holding a storage container 106 at that time. Both of the support surfaces 425 are arranged directly above the wheeled base 2.

FIG. 6D is a side view of a container handling vehicle 501 holding one storage container 106 by the lifting frame 415 whereas the upper support surface 425 holds a storage container 106. The lower support surface is not visible in FIG. 6D.

FIG. 6E is a side view of a container handling vehicle 501 where one storage container 106 is carried by the upper support surface 425 arranged directly above the wheeled base 2 and one storage container 106 is carried by the lower support surface 425 arranged directly below the lifting frame 425. The lower support surface 426 is not visible in FIG. 6E but could carry a further storage container 106 as shown in FIG. 6F.

FIG. 6F is a rear side view of FIG. 6E.

FIGS. 7A-7E are examples of a container handling 601 with two lifting frames 415 arranged on opposite sides of a wheeled base 2, openings are provided in the support section and there are arranged a total of four support surfaces 425, arranged two side by side in two heights. The container handling vehicle 601 of FIGS. 7A-7E are of a double cantilever type, i.e. it comprises two cantilevers 413. All of the support surfaces 425 are linearly movable relative the wheeled base 2 between a position directly above the wheeled base 2 and a position directly below the lifting frame 415. A footprint of the wheeled base 2 is two grid cells, whereas a footprint of the container handling vehicle is four grid cells. Thus, the container handling vehicle 601 in FIGS. 7A-7E may carry six storage containers 106 while occupying only four grid cells. The remaining features of the container handing vehicle 601 are similar to the features of the container handling vehicle 401, 501 described in relation to FIGS. 5A-5H and 6A-6F, and will not be repeated herein.

FIG. 7A is a side view of a container handling vehicle 601 where storage containers 106 are carried by both of the lifting frames 415, and where all of the support surfaces 425 are in a position directly above the wheeled base 2 and all of them are empty.

FIG. 7B is a side view of a container handling vehicle 601 where storage containers 106 are carried by both of the lifting frames 415, and where the two upper support surfaces 425 are moved to respective position directly below each of the lifting frames 425, while the two lower support surfaces 425 are in a position directly above the wheeled base 2.

FIG. 7C is a side view of a container handling vehicle 601 where storage containers 106 are carried by both of the lifting frames 415, and where the two upper support surfaces 425 are arranged directly above the wheeled base 2, both of them holding a storage container 106, while the two lower support surfaces 106 are arranged directly below the lifting frame 415 not holding storage containers 106.

FIG. 7D is a side view of a container handling vehicle 601 where the lifting frames 415 are not holding storage containers 415, and where the two upper support surfaces 425 are arranged directly above the wheeled base 2, both of them holding a storage container 106, while the two lower support surfaces 425 are arranged directly below the lifting frames 415 holding storage containers 106.

FIG. 7E is a side view of a container handling vehicle 601 where the lifting frames 415 are not holding storage containers 106, and where all of the support surfaces 425 are arranged directly above the wheeled base 2, all of them holding a storage container 106.

FIGS. 8A-8G are examples of a container handling vehicle 701 with one lifting frame arranged in the center between two wheeled bases 2, openings are provided in the support section and there are arranged a total of four support surfaces 425 arranged two on each side of the lifting frame 415. The body of the container handling vehicle 701 is thus of a central cavity design where a storage container can be lifted into a storage space in the center of the container handling vehicle 701. The body of the container handling vehicle 701 connects the two wheeled bases 2. On each side of the body, openings (not shown) are provided for allowing the respective four support surfaces 425 to move therethrough together with a storage container 106 between the position above one of the wheeled bases 2 and directly below the lifting frame 415. All of the support surfaces 425 are linearly movable relative the respective wheeled bases 2 between a position directly above the wheeled base 2 and a position directly below the lifting frame 415. A footprint of the two wheeled bases 2 are two grid cells, whereas a footprint of the container handling vehicle is three grid cells. Thus, in this arrangement the container handling vehicle 701 in FIGS. 8A-8G may carry five storage containers 106 while occupying only three grid cells. The remaining features of the container handing vehicle 601 are similar to the features of the container handling vehicle 401, 501 described in relation to FIGS. 5A-5H and 6A-F and FIGS. 7A-7E, and will not be repeated herein.

FIG. 8A is a side view of a container handling vehicle 701 where the lifting frame 415 is not holding a storage container 106, while the remaining three support surfaces 425 are arranged directly above the respective wheeled bases 2, all of them are empty.

FIG. 8B is a is a side view of a container handling vehicle 701 where the lifting frame 415 is not holding a storage container 106, and where three of the support surfaces 425 are arranged directly above the respective wheeled bases 2, and one of them is positioned directly below the lifting frame 415 and is holding a storage container 106 while the remaining three are empty.

FIG. 8C is a side view of a container handling vehicle 701 where the lifting frame 415 is not holding a storage container 106, and where all of the support surfaces 425 are arranged directly above its respective wheeled base 2, one of them holding a storage container 106 while the remaining three are empty.

FIG. 8D is a side view of a container handling vehicle 701 where the lifting frame 415 holds a storage container 106, and where one support surface 425 is arranged directly below the lifting frame 415 while the remaining three support surfaces 425 are arranged directly above the wheeled bases 2, one of them holding a storage container 106 while the remaining two are empty.

FIG. 8E is a side view of a container handling vehicle 701 where the lifting frame 415 holds a storage container 106, and where all of the support surfaces 425 are arranged directly above the wheeled bases 2, two of them holding a storage container 106 while two are empty.

FIG. 8F is a side view of a container handling vehicle 701 where the lifting frame 415 is not holding a storage container 106, and where one support surface 425 is arranged directly below the lifting frame 415, while the remaining three support surfaces 425 are arranged directly above the wheeled bases 2, two of them holding a storage container 106 while one is empty.

FIG. 8G is a side view of a container handling vehicle 701 where the lifting frame 451 is not holding a storage container 106, and where all of the support surfaces 425 are arranged directly above the wheeled bases 2, three of them holding a storage container 106 while one is empty.

FIGS. 9A-9E are examples of a container handling vehicle 801 with one lifting frame 415 suspended from a set of suspension points 423 (not shown in detail FIGS. 9A-9E, see FIGS. 10-13), where the set of suspension points and thus the lifting frame 415 are configured for translational movement from a position directly above fixed support surfaces 425 arranged on a wheeled base 2 of the container handling vehicle 801 and a position directly above a storage position that is located below a rail system. The Figures show sequential movement of storage containers 106 from their respective storage positions located below the rail system and onto the support surfaces 425 in the container handling vehicle 801. The container handling vehicle 801 can have two support surfaces 425 as shown in FIGS. 9A-9E. However, although not shown, it is also possible that the container handling vehicle 801 has four or even more support surfaces 425, for example arranged in line or arranged 2×2 forming a cube. In the latter, the set of suspension points need to be able to translate the lifting frame 415 in both X direction and Y direction. The container handling vehicle 801 has a varying footprint dependent on whether the lifting frame 415 is arranged directly above the storage position below the rail system 108 (see e.g. FIG. 9A) or directly above one of the support surfaces 425 within the container handling vehicle 801 (see e.g. FIG. 9B). In order to move the suspension points 423 and thus the lifting frame 415 between the position directly above fixed support surfaces 425 arranged on the wheeled base 2 of the container handling vehicle 801 and the position directly above a storage position below a rail system 108, the container handling vehicle may comprise a first movement mechanism for horizontal translational movement the lifting frame 415 within an area defined by the vertical projection of the wheeled base 2, and a second movement mechanism for horizontal translational movement of the lifting frame 415 or the support surface outside an area defined by the vertical projection of the wheeled base 2.

FIG. 9A is a side view of the container handling vehicle 801 where the lifting frame 415 is in a position directly above a storage position below a rail system 108. The container handling vehicle 801 occupies three grid cells 122 in FIG. 9A.

FIG. 9B is a side view of the container handling vehicle 801 where the lifting frame 415 has moved a distance equal to one grid cell relative its position in FIG. 9A and is in a position directly above one of the support surfaces 425 and has dropped off the storage container 106 on the support surface 425. The container handling vehicle 801 occupies two grid cells 122 in FIG. 9B.

FIG. 9C is a side view of the container handling vehicle 801 where the lifting frame 415 is suspended using the lifting bands 417a,417b down below the rail system 108 and has picked up a storage container 108 from a storage position located below the rail system 108.

FIG. 9D is a side view of the container handling vehicle 801 where the lifting frame 415 has moved a distance equal to two grid cells relative its position in FIG. 9C and is in a position directly above the other of the support surfaces 425 compared to FIG. 9B and has dropped off the storage container 106 on the support surface 425.

FIG. 9E is a side view of the container handling vehicle 801 after a total of four storage containers 106 have been positioned on the support surfaces 425, two stacks of storage containers 106 with two storage containers 106 in each stack.

FIG. 10A shows a container handling vehicle 901 with one lifting frame 415 suspended from a set of suspension points 423. The set of suspension points 423 and thus the lifting frame 415 are configured for translational movement from a position directly above a fixed support surface 425 arranged on a wheeled base 2 of the container handling vehicle 901 into one of two positions located directly above a storage position 425 that is positioned below a rail system 108 by using the linear movement mechanism 427. Said two positions are on opposite sides of the wheeled base 2. The container handling vehicle in FIG. 10A occupies two grid cells 122 because the lifting frame 415 is directly above one of the fixed support surfaces 425. The movement mechanism in FIG. 10A is in the form of a linear guide system where the lifting device 414 with lifting frame 415 is arranged inside an upper portion of the container handling vehicle 901 and are movable along said guide system via a complementary connection such as linear bearings, rack and pinion, a linear actuator and/or ball screw. In order to move the suspension points 423 and thus the lifting frame 415 between the position directly above one of the fixed support surfaces 425 arranged on the wheeled base 2 of the container handling vehicle 801 and the position directly above a storage position that is below a rail system 108, the container handling vehicle 901 may comprise a first movement mechanism 427' for horizontal translational movement the lifting frame 415 within an area defined by the vertical projection of the wheeled base 2, and a second movement mechanism 427" for horizontal translational movement of the lifting frame 415 outside (beyond) an area defined by the vertical projection of the wheeled base 2. Examples and more detailed illustrations of different movement mechanisms 427,427', 427" for the set of suspension points 423 (and the movable support surfaces 425 of the exemplary container handling vehicles above) are shown in FIG. 13.

FIG. 10B shows the container handling vehicle 901 of FIG. 10A where the lifting frame 415 has been moved to a position above a storage position below a rail system 108. The container handling vehicle in FIG. 10B occupies three grid cells 122 because the lifting frame 415 is outside the wheeled base 2 and directly above a storage position below the rail system 108.

FIGS. 11A-11C are examples of a container handling vehicle 1001 arranged on a rail system 1001. The container handling vehicle 1001 comprises one lifting frame 415 suspended from a set of suspension points 423, where the set of suspension points 423 and thus the lifting frame 415 are configured for translational movement from a position directly above fixed support surfaces 425 arranged on a wheeled base 2 of the container handling vehicle 1001 and two positions directly above a storage position located below a rail system 108, where said two positions are on opposite sides of the wheeled base 2. The container handling vehicle 1001 has many similar features with the container handling vehicle 901 in FIGS. 10A and 10B, and these features will not be repeated herein. Similar to the example container handling vehicles 801,901 in FIGS. 9 and 10, the container handling vehicle in FIGS. 11A-11C may comprise a first movement mechanism 427' (illustrated as a rack and pinion system) and a second movement mechanism 427" (illustrated as a ball screw system).

FIG. 11A shows a container handling vehicle 1001 where the lifting frame 415 is arranged directly above a storage position 425 that is located below a rail system 108 and holds a storage container 108. The container handing vehicle 1001 in FIG. 11A occupies three grid cells in this configuration.

FIG. 11B shows a container handling vehicle 1001 where the lifting frame 415 is arranged on an opposite side of the wheeled base 2 compared to FIG. 11A and is arranged directly above a storage position that is located below a rail system 108 and holds a storage container 108. The container handling vehicle 1001 occupies three grid cells 122 in this configuration.

FIG. 11C shows a container handling vehicle 1001 where the lifting frame 415 is arranged directly above one of the support surfaces 425. The container handling vehicle 1001 occupies two grid cells 122.

FIGS. 12A-12D are examples of a container handling vehicle 1101 with one lifting frame 415 suspended from a set of suspension points 423, where the set of suspension points 423 and thus the lifting frame 415 are configured for translational movement from a position directly above movable support surfaces 425 arranged on a wheeled base 2 of the container handling vehicle 1101 and a position directly above a storage position that is located below a rail system. The Figures show different relative positions of the lifting frame 415 and the movable support surfaces(s) 425. The container handling vehicle 1101 of FIGS. 12A-12D is similar to the one described in relation to FIGS. 10A and 10B, except that the container handling vehicle 1101 in FIGS. 12A-12D has a movable support surface 425 compared to the fixed support surfaces 425 of FIGS. 10A and 10B, and will not be described in greater detail herein. In order to move the support surfaces 425 between the position directly above the wheeled base 2 and the position outside the wheeled base 2, the container handling vehicle 901 may comprise a first movement mechanism 426' for horizontal translational movement the support surface 425 within an area defined by the vertical projection of the wheeled base 2, and a second movement mechanism 426" for horizontal translational movement of the support surface 425 outside (i.e., beyond) an area defined by the vertical projection of the wheeled base 2. Examples and more detailed illustrations of different movement mechanisms 426,426',426''',427,427',427" for the set of suspension points 423 and the movable support surfaces 425 of the exemplary container handling vehicles above) are shown in FIG. 13A-E.

FIG. 12A shows a container handling vehicle 1101 where the lifting frame 415 is in a position directly above the wheeled base 2 and an empty support surface 425 is in a position outside the wheeled base 2.

FIG. 12B shows a container handling vehicle 1101 where the lifting frame 415 is in a position directly above the wheeled base 2 and a movable support surface 415 holding a storage container 106 is in a position outside the wheeled base 2.

FIG. 12C shows a container handling vehicle 1101 where the lifting frame 415 is in a position outside the wheeled base 2, a support surface 425 holding a storage container 106 is in a position outside the wheeled base 2 directly below the lifting frame 415.

FIG. 12D shows a container handling vehicle 1101 where the lifting frame 415 is in a position outside the wheeled base 2 and holds a storage container 106, the support surfaces 425 are arranged directly above the wheeled base 2.

FIG. 13A is a top view of a container handling vehicle with two linear movement mechanisms 427',427" for the suspension points 423 and thus the lifting frame 415. The first movement mechanism 427' comprising a linear guide system which is extendable, wherein the first movement mechanism 427' is in the form of a rack and pinion system for horizontal translational movement of the lifting frame (or the support surface 425 if supporting the support surface) within an area defined by the vertical projection of the wheeled base 2. A second movement mechanism 427" is for horizontal translational movement of the lifting frame 415 (or the support surface 425 if supporting the support surface) outside an area defined by the vertical projection of the wheeled base 2. The second movement mechanism 427" is in the form of a ball screw. The rack and pinion system comprises one or more rollers 440 movable along tracks 441 provided on opposites sides of the container handling vehicle. The ball screw 442 mechanism which translates rotational movement of the threaded shaft part 443 arranged on the container handling vehicle to a linear movement of ball bearings 444 on a transverse support 445 for the suspension points 423. The transverse support 445 extends between threaded shaft parts 443 on opposite sides of the container handling vehicle. The principle of a ball screw 442, i.e. that a rotational motion is translated to linear motion, is known to the person skilled in the art and will not be further described herein.

Drive of the movement mechanisms 426, 427 may be provided by appropriate drive motor or actuation mechanisms known to the skilled person, and will not be described in greater detail herein.

FIG. 13B is an enlarged view of section A in FIG. 13A.

FIG. 13C shows detail of a linear movement mechanism 426,427 in the form ball screw 442 arrangement for moving the suspension points 423 or the movable support surface 425. The exemplified ball screw 442 arrangement in FIGS. 13C-13E may be used both as the first movement mechanism 426',427' and the second movement mechanism 426", 427' both for the movable suspension points 423 and the movable support surfaces 425. In the exemplified embodiment of FIG. 13C, it is disclosed two parallel threaded shaft parts 443. Two transverse support elements 445 extends between the parallel threaded shaft parts 443. The transverse support elements 445 are provided with ball bearings 444 for linear movement when the threaded shaft parts 443 are rotated.

FIG. 13D is an enlarged view of section B in FIG. 13C.

In FIG. 13E the transverse support elements 445 have been removed to better illustrate the threaded shaft part 443 and the ball bearing on the transverse support element 445 for interaction with the threaded shaft part 443.

FIGS. 14A-14D are examples of a container handling vehicle 1201 with a wheeled base 2, a support section 402 and a cantilever section 413. The lifting frame 415 is suspended from a set of suspension points 423 in the cantilever section 413. The movement mechanism 427 comprises a rotation device 446 (see FIG. 14C) adapted to rotate the support section 402 and thus the cantilever section 413 relative the wheeled base 2 such that in a first state (FIGS. 14A and 14B) the lifting frame 413 can lift a container up from a storage position below the rail system 108 and in a second state (FIG. 14C) the lifting frame 415 can place a storage container 106 on the support surface 425. As illustrated in FIGS. 14A-14D, in the first state the container handling vehicle 1201 occupies two grid cells 122 while in the second state the container handling vehicle 1201 occupies only one grid cell 122.

FIG. 14A shows a container handling vehicle 1201 where the lifting frame 415 is arranged directly above a storage position that is located below the rail system 108, the support surface 425 is empty.

FIG. 14B is a rear view of FIG. 14A.

FIG. 14C shows a container handling vehicle 1201 where the support section 402, and consequently the cantilever section 413 and the lifting frame 415, has been rotated 180 degrees compared to FIGS. 14A and 14B by the rotation device 446. Both the lifting frame 415 and the support surface 425 are empty, i.e. not holding a storage container 106 in the illustration.

FIG. 14D a container handling vehicle 1201 where the lifting frame 415 is arranged directly above a storage position that is located below the rail system 108. Both the lifting frame 415 and the support surface 425 are shown holding a storage container 106.

FIG. 15 is a top view of an example of which components of the container handling vehicle that can be arranged in the lifting device. It is thus disclosed a possible setup of the lifting device 414, where, in addition to the lifting shafts 418 and the lifting bands 417 that are spoolable onto and off a common or separate lifting shafts 418, there is also a lifting device motor 416. The lifting device motor(s) 416 in FIG. 15 can be a brushless DC motor encircling one of the lifting shafts 418 as shown in the figure. In the example in FIG. 15, two lifting device motors 416 are shown, one on each side of the lifting device controls 419. Instead of spooling the lifting bands 417 onto the same lifting shaft 418, synchronous operation of the lifting shafts 418 can be obtained by a synchronization element such as a force transferring element as disclosed in FIGS. 5A-5E and 6A-6H in WO 2019/137870 A1 (Applicant: Autostore Technology AS), the contents of which are incorporated herein by reference.

FIGS. 16A-16B show different examples of different container handling vehicles with a weight distribution system 450. The weight distribution system 450 comprising a movable load 452 and a load moving device 451 for changing a center of gravity of the container handling vehicle dependent on the load of one or more storage containers 106 carried by the container handling vehicle, for example, in the event there is an uneven load or it is preferable to provide more of a counterbalance. The weight distribution system

450 may further comprise a control system 454 for instructing the load moving device 451 to move the movable load 452 (as indicated by the arrows in the figures) in a direction counteracting the weight of a storage container 106 held by the support surface 425 or by the lifting frame 415.

FIG. 16A shows an example of a container handling vehicle with a cantilever design and a linearly movable support surface 425. The movable load 452 in FIG. 16A is arranged in an upper portion of the container handling vehicle and is movable along the whole length of the container handling vehicle, corresponding to a total length of the wheeled base 2 and the cantilever section 413. The container handling vehicle of FIG. 16A is further disclosed with a set of sensors 456 for measuring weight of any storage container(s) 106 supported by the support surface 425 and by the lifting frame 415. A control system 454 may be connected to both the set of sensors 456 and the load moving device 452, and may, based on the measured data from the set of sensors 456, sense a change in mass of at least two opposite sides of the container handling vehicle and calculate a travel distance for the movable load 452 corresponding to the change in mass and instruct the load moving device 451 to move the movable load 452 the calculated travel distance in an opposite direction of the relatively heavier side of the container handling vehicle.

FIG. 16B is an example of the container handling vehicle of FIGS. 5A-5H with a weight distribution system 450 as described in relation to FIG. 16A above. The movable load 452 in FIG. 16B is arranged in an upper portion of the cantilever section 413 and is movable along an extent equal to the length of the cantilever section 413. The container handling vehicle of FIG. 16B has a Z-shape and a linearly movable support surface 425. The function of the weight distribution system 450 with the set of sensors 456 and control system 454 for load moving device 453 is similar to the function already described in relation to FIG. 16A and will not be repeated herein.

FIGS. 17A-17C show different examples of a container handling vehicle 1301 with a through-going opening in the support section and where the support surface is linearly movable relative the wheeled base between a position directly above the wheeled base and a position directly below the lifting frame, the container handing vehicle further comprises a weight distribution system. The container handling vehicle in FIGS. 17A-17C has similar features as the container handling vehicle 401 shown and described in relation to FIGS. 5A-5H above with the exception that the container handling vehicle in FIGS. 17A-17C has a walls and a cover encircling the support surface 425 when the support surface 425 is directly above the wheeled base 2. Furthermore, the system for moving the support surface 425 relative the wheeled base 2 is different. This will be described in greater detail with reference to FIGS. 18A-18E, 19A and 19B.

FIG. 17A is a front perspective view of a storage container 106 arranged on a support surface 425 positioned directly above the wheeled base 2. In the cantilever section 413, a weight distribution system 450 is disclosed. The movable load 452 in FIG. 17A is arranged in an upper portion of the container handling vehicle and is movable along the whole length of the container handling vehicle, corresponding to a total length of the wheeled base 2 and the cantilever section 413. A control system for the load moving device 454 as described in relation to FIG. 16B above is also disclosed and will not be described in greater detail herein.

FIG. 17B is a top perspective view of FIG. 17A. As disclosed in FIG. 17B, the load moving device 451 is guidable in the cantilever section 413 along load guides 453. The load moving device 451 is in the form of a ball screw, where rotation of the ball screw is transferred to a linear movement of the movable load 452 along the load guides 453.

FIG. 17C is a detailed view of the dotted area in FIG. 17B and shows more details of the weight distribution system 450. In addition to the features described in relation to FIGS. 17A and 17C, a load moving device motor 457 driven by a battery or similar (not shown) is disclosed with a rotational arrangement 458 in the form of a belt for transferring rotational movement from the load moving device motor 457 to the load moving device 451. Although a rotational arrangement 458 in the form of a belt which transfers movement to a load moving device 451 in the form of a ball screw 451 are disclosed, other arrangements for moving the load moving device are possible provided they perform the required function.

FIGS. 18A-18E show details of the container handling vehicle 1301 in FIGS. 17A-17C, the container handling vehicle 1301 having a wheeled base 2, a support section 402 and a cantilever section 413, wherein the lifting frame 415 is suspended from a set of suspension points in the cantilever section 413. The support surface 425 is movable relative the wheeled base 2 between a position directly above the wheeled base 2 and a position directly below the lifting frame 425 through a vertical plane movement mechanism 460. The vertical plane movement mechanism 460 has a horizontal component and a vertical component (i.e. in the horizontal direction and in the vertical direction). This means that the movement of the support surface 425 between the positions directly above the wheeled base 2 and directly below the lifting frame 425 is through rotation in the vertical plane. In order to be able to allow this movement, a vertical distance from the support surface 425 relative the rail system 108 is not constant during movement between said positions. The vertical distance is largest when the support surface 425 is in the middle of the movement and the vertical distance is smallest when the support surface 425 is in the two end positions (directly above the wheeled base and directly below the lifting frame 415). The function and components forming part of the vertical plane movement mechanism 460 are described in greater detail with reference to FIGS. 19A and 19B.

FIG. 18A is a side perspective view of the container handling vehicle 1301 where the lifting frame 415 holds a storage container 106, and an empty support surface 425 is directly above the wheeled base 2. The container handling vehicle 1301 is shown with a weight distribution system 450. This weight distribution system 450 may be similar to the weight distribution system 450 described and shown in relation to FIGS. 17A-17C above and will not be described in further detail herein.

In FIG. 18B, the lifting frame 415 still holds a storage container 106 and the support surface 425 is about to move from its initial position directly above the wheeled base 2 to a position directly below the lifting frame 425.

In FIG. 18C the vertical plane movement mechanism 460 has moved the support surface 425 to a position directly below the lifting frame 415. As can be seen from the Figure, the lifting frame 415 does not hold the storage container 106 anymore because the storage container 106 has been dropped off onto the support surface 425.

In FIG. 18D the lifting frame 415 does not hold a storage container 106. The support surface 425 and the storage container 106 provided thereupon is about to move from the position directly below the lifting frame 425 to the position directly above the wheeled base 2.

In FIG. 18E the lifting frame 415 does not hold a storage container 106. The support surface 425 and the storage container 106 provided thereupon has moved to the position directly above the wheeled base 2. The lifting frame 415 may now pick up a new storage container from a storage position below the rail system 108.

FIGS. 19A and 19B show details of a vertical plane movement mechanism 460 for moving the support surface 425 between a position directly above the wheeled base 2 and a position directly below the lifting frame 415. As described above, the vertical plane movement mechanism 460 has a horizontal component and a vertical component (i.e. in the horizontal direction and in the vertical direction). This means that the movement of the support surface 425 between the positions directly above the wheeled base 2 and directly below the lifting frame 425 is through rotation in the vertical plane. In order to be able to allow this movement, a vertical distance from the support surface 425 relative the rail system 108 is not constant during movement between said positions. The vertical distance is largest when the support surface 425 is in the middle of the movement and the vertical distance is smallest when the support surface 425 is in the two end positions (directly above the wheeled base and directly below the lifting frame 415). The support surface 425 is connected to the wheeled base 2 via two bars 461',461". The respective bars 461',461" are rotatably connected to the wheeled base 2 in one end thereof and a bracket 462 connected to an underside of the support surface 425 in an opposite end thereof through fastening means 463 such as pins, bolts or similar. A rotational movement motor 464 driven by a battery or similar (not shown) provides rotation of a belt arrangement connected to the bars 461',461" such that the motor 464, via the belts 465 and shafts 466, can rotate the bars 461',461" and thus the support surface 425 in the vertical plane between the position directly above the wheeled base 2 and the position directly below the lifting frame 415. The belts 465 and shafts 466 setup provides for synchronous movement of the bars 461',461".

In order for the support surface 425 to have a horizontal orientation during the whole movement, the two rotatable bars 461',461' are off-set relative each other in the vertical plane. As seen in FIGS. 19A and 19B, the respective bars 461',461" are connected at different heights to the shafts 465 in the wheeled base 2. Similarly, as best shown in FIG. 19B, the respective shafts 461',461" are connected at different heights to the bracket 462 on the underside of the support surface 425. The bars 461',461" are, however, of equal length such that they have the same arc length (i.e. the same semi-circular movement path) when moving the same number of degrees. However, because they are connected to the shafts and bracket at different heights, the semi-circular movement paths are off-set relative each other.

FIGS. 20A and 20B show an example of a container handling vehicle 1401 with three linear movement mechanisms for the suspension points 423 and thus the lifting frame 415, the movement mechanism comprising a linear guide system which is extendable, wherein the first movement mechanism is for horizontal translational movement of the lifting frame 415 in a first direction within an area defined by the vertical projection of the wheeled base 2, the second movement mechanism is for horizontal translational movement of the lifting frame 415 outside (beyond) an area defined by the vertical projection of the wheeled base 2, and the third movement mechanism is for movement in a direction perpendicular to the first direction. The functional setup of the first movement mechanism and the second movement mechanism are similar to the two linear movement mechanisms 427'427" for the suspension points and thus the lifting frame 415 as described in relation to FIGS. 13A-13E above and will not be described detail herein. However, see FIG. 21A for description of the movement mechanism in the third direction relative the directions explained with reference to FIGS. 13A-13E above.

In FIG. 20A the lifting frame 415 is arranged within an area defined by the vertical projection of the wheeled base 2. The support surface 425 in FIGS. 20A and 20B may support a total of four storage containers 106 thereon. Each of the storage containers 106 supported by the support surface 425 may support at least one storage container 106 on top. Although not shown, the container handling vehicle 1401 may have covers or walls ensuring that the storage containers 106 remains in dedicated positions on the support surface 425. This may be done both to prevent that the storage containers 106 slides off the support surface 425, and also to ensure that the bin guides on the lifting frame 425 are aligned with the corners of each of the storage containers 106 if the storage container 106 is to be retrieved by the lifting frame 415 while positioned on the support surface 425.

In FIG. 20B the lifting frame 415 has been moved to a position outside an area defined by the vertical projection of the wheeled base 2.

FIGS. 21A-21C show an example of a container handling vehicle 1501 with three linear movement mechanisms for the suspension points 423 and thus the lifting frame 415 and rotation mechanism 470 for rotating the suspension points and thus the lifting frame 415.

In FIG. 21A the lifting frame is in a position outside an area defined by the vertical projection of the wheeled base 2. The functional setup of the first movement mechanism and the second movement mechanism are similar to the two linear movement mechanisms 427',427" for the suspension points 423 and thus the lifting frame 415 as described in relation to FIGS. 13A-13E above. The third linear movement mechanism which is in a direction perpendicular to the first linear movement mechanism, may be provided by a rack and pinion 440' in combination with roller 441' as described above in relation to FIG. 13A, i.e. the rack and pinion system comprises one or more rollers 440' movable along tracks 441' provided on opposites sides of the container handling vehicle 1501.

In FIG. 21B an example of the rotation mechanism 470 for rotating the suspension points 423 and thus the lifting frame 415 is shown. The rotation mechanism 470 comprises a rotation motor 471 driven by a battery or similar (not shown) with external cogs 472 for interaction with a cog wheel 473 connected to the lifting frame 415. This setup ensures that when the rotation motor 471 rotates, the lifting frame 415 rotates such that storage containers 106 can be arranged in any direction on the support surface 425 (i.e. pallet as shown in FIG. 21C) of the container handling vehicle 1501.

In FIG. 21C the lifting frame 415 is in a position within an area defined by the vertical projection of the wheeled base 2 and the lifting frame 415 has been rotated 90 degrees compared to the lifting device in FIG. 21A using the rotation mechanism 470 in FIG. 21B. The support surface 425 is in the form of a pallet. The pallet can be of standard industry size such as a EURO pallet (120 cm×80 cm).

In the preceding description, various aspects of the container handling vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. For example, although the term wheeled base with first and second sets of wheels has been used as example throughout the description, a belt base with first and second belts for guiding along the rail system may be used instead. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
2 Wheeled base/wheel base unit
4, 4' Electric motor
6 Rechargeable battery
7 Wheel displacement assembly
8 Electric motor for wheel displacement assembly
9 Top panel/flange
10 Through-holes
20 Centre opening
21 Electronic control system
29 Switch module
32a Wheel arrangement, first set of wheels
32a'-32a"" First, second, third, fourth wheel in first set of wheels
39 Bracket
41 Lifting band clamp
68 Spring-loaded pins
69 Control module
70 controls gripper motors
70b Gripper bar
71 Wires
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
115 Access opening
119 First port column
120 Second port column
122 Grid cell
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Part of gripping device

401 Container handling vehicle with cantilever and one linearly movable support surface

402 Support section

413 Cantilever section

414 Container lifting device

415 Lifting frame

416 Lifting device motor

417a,b Lifting bands

418 Lifting shaft

419 lifting device controls

421 Releasable connection, gripper

422 Through-going opening

423 Set of suspension points

424 Bin guides

425 Support surface/holding position

426,426',426" Linear movement mechanism for support surface

427,427',427" Linear movement mechanism for suspension points

440,440' roller in rack and pinion system

441,441' track in rack and pinion system

442 Ball screw

443 threaded shaft part

444 ball bearing on transverse support element

445 transverse support element

446 Rotation device

450 weight distribution system

451 load moving device

452 movable load

453 load guide

454 Control system load moving device

455 Pivot connection support surface

456 Set of sensor for measuring weight

457 load moving device motor

458 Rotational arrangement/belt

460 Vertical plane movement mechanism

461',461" Bar

462 Bracket

463',463" Fastening means

464 Rotational movement motor

465 belt

470 Rotation mechanism

471 Rotation motor

472 External cogs

500 Control system

501 Container handing handling with two cantilevers and two movable support surfaces

601 Container handing handling with cantilever and four movable support platforms

701 Container handing handling with two wheel bases, a central cavity and four movable support surfaces

801 Container handing handling with movable lifting frame, and two support surfaces

901 Container handing handling with movable lifting frame, and two support surfaces

1001 Container handing handling with movable lifting frame, and two support surfaces

1101 Container handing handling with movable lifting frame and movable support surfaces

1201 Container handling vehicle with rotatable support section

1301 Container handling vehicle with stationary lifting frame and movable support surface in vertical and horizontal direction

1401 Container handling vehicle with three linear movement mechanisms for the lifting frame

1501 Container handling vehicle with three linear movement mechanisms for the lifting frame and rotation device for rotating lifting frame X First direction Y Second direction Z Third direction

The invention claimed is:

1. A container handling vehicle for operation on a two-dimensional rail system comprising a first set of parallel rails arranged to guide movement of container handling vehicles in a first direction across a top of a frame structure, and a second set of parallel rails arranged perpendicular to the first set of rails to guide movement of the container handling vehicles in a second direction which is perpendicular to the first direction, the first and second sets of parallel rails forming a grid which divides the rail system into a plurality of grid cells, wherein the container handling vehicle comprises:

a base comprising moving means for guiding the container handling vehicle along the rail system in the first direction and the second direction respectively;

a support structure provided on the base, the support structure extending from a lower section at the base to an upper section;

a container lifting device comprising a lifting frame for lifting a storage container up from a storage position below the rail system, the lifting frame being suspended from a set of suspension points of the upper section of the support structure;

a support surface for supporting the storage container, the support surface providing a first holding position arranged at a lower elevation than the lifting frame when the lifting frame is in a docked state adjacent the upper section of the support structure;

and a movement mechanism configured to move the set of suspension points with respect to the base, wherein the set of suspension points and the lifting frame are configured to place a lifted storage container on the support surface, and the lifting frame is configured to disconnect from the lifted storage container once it is placed on the support surface, wherein the base is in the form of a wheel base unit where the moving means comprise a first set and a second set of wheels which form outer peripheries of a footprint of the wheel base unit;

a lower section which is provided on the wheel base unit, the lower section having a footprint with a horizontal extent which is equal to or less than the footprint of the wheel base unit, the lower section having an upper surface, wherein the upper surface provides the support surface;

a support section forming the support structure and extending vertically from the lower section, the support section having a footprint with a horizontal extent which is smaller than the footprint of the lower section; and a cantilever section forming the upper section and extending horizontally from the support section beyond the footprint of the lower section; and wherein the support section comprises a through-going opening for moving the support surface or the lifting frame therethrough.

2. The container handling vehicle according to claim 1, wherein at least one of the lifting frame and the support surface is configured for linear translational movement in a horizontal direction, and optionally linear translational movement parallel to one of the first or second directions.

3. The container handling vehicle according to claim 1, wherein the through-going opening is sized for the storage container to pass through.

4. The container handling vehicle according to claim 1, wherein the suspension points are linearly movable such that in a first position the lifting frame is arranged to retrieve the storage container from a storage position below the rail system and in a second position the lifting frame is arranged above the first holding position.

5. The container handling vehicle according to claim 1, wherein the lifting frame and the first holding position are arranged such that:

in a first position, a vertical projection of the lifting frame is arranged over the first holding position, and in a second position, the vertical projection of the lifting frame avoids the first holding position.

6. The container handling vehicle according to claim 1, wherein the support surface is linearly movable relative to the base by actuation of a second movement mechanism such that in a first position the support surface is arranged within a vertical projection of the base and in a second position the support surface is arranged outside a vertical projection of the base.

7. The container handling vehicle according to claim 6, wherein the second movement mechanism is arranged in the base such that the support surface can be translated horizontally relative to the base.

8. The container handling vehicle according to claim 1, wherein the movement mechanism is arranged in the upper section such that the lifting frame can be moved horizontally relative to the base.

9. The container handling vehicle according to claim 1, wherein the container handling vehicle comprises a second movement mechanism to translate the support surface horizontally with respect to the base.

10. The container handling vehicle according to claim 1, further comprising a second support surface providing a second holding position arranged next to or above the first holding position.

11. The container handling vehicle according to claim 1, wherein the movement mechanism comprises a first linear guide system supporting the set of suspension points and/or a second movement mechanism comprises a second linear guide system supporting the support surface.

12. The container handling vehicle according to claim 11, wherein the first and/or second linear guide system is horizontally extendable.

13. The container handling vehicle according to claim 11, wherein the first and/or second linear guide system comprises at least two movement mechanisms, including:

a first movement mechanism for horizontal translational movement of the lifting frame or the support surface within an area defined by a vertical projection of the base, and a second movement mechanism for horizontal translational movement of the lifting frame or the support surface outside an area defined by the vertical projection of the base.

14. The container handling vehicle according to claim 13, wherein the first movement mechanism comprises linear bearings, rack and pinion, a linear actuator, and/or ball screw.

15. The container handling vehicle according to claim 13, wherein the second movement mechanism comprises linear bearings, rack and pinion, a linear actuator and/or ball screw.

16. The container handling vehicle according to claim 1, wherein at least a lifting device motor and a movement mechanism for moving the lifting frame horizontally are arranged at or above the lifting frame.

17. The container handling vehicle according to claim 1, wherein, when the storage container is positioned on the first holding position, an uppermost part of the storage container represents a first height; and the lifting frame, when in a docked state, has a lowermost part that represents a second height; and wherein the second height is above the first height, such that the lowermost part of a docked lifting frame can pass over the uppermost part of the storage container positioned on the first support surface.

18. The container handling vehicle according to claim 1, wherein the container handling vehicle comprises a second support surface providing a second holding position arranged above the support surface forming the first holding position and wherein a cross-section area of the through-going opening is configured for passing of the support surfaces therethrough, both when any of the support surfaces hold the storage container and when not holding the storage container.

19. The container handling vehicle according to claim 1, comprising two lifting frames and at least two support surfaces, wherein the two lifting frames are arranged on opposite sides of the base and outside a vertical projection of the base, and the at least two support surfaces are arranged within a vertical projection of the base, and wherein each of the support surfaces are movable relative the base to a position outside the base and below one of the lifting frames, respectively.

20. The container handling vehicle according to claim 1, the container handling vehicle comprising two wheeled bases and at least two support surfaces, where the wheeled bases are provided on each side of the support structure, and wherein one lifting frame is suspended from the upper section of the support structure, wherein each of the support surfaces are movable relative the wheeled bases to a position below the lifting frame.

21. The container handling vehicle according to claim 1, wherein the container handling vehicle comprises a second movement mechanism to translate horizontally the set of suspension points with respect to the base in the first or the second direction.

22. The container handling vehicle according to claim 1, wherein a centre of gravity of the support surface is positioned over the base.

23. The container handling vehicle according to claim 1, further comprising a weight distribution system comprising a movable load and a load moving device for changing a center of gravity of the container handling vehicle dependent on the load of the storage container and optionally additional storage containers carried by the container handling vehicle.

24. The container handling vehicle according to claim 23, wherein the weight distribution system comprises:

a set of sensors for measuring weight of the storage container supported by the support surface and/or by the lifting frame, and a control system connected to both the set of sensors and the load moving device, wherein the control system is configured to, based on measured data from the set of sensors, sense a change in mass of at least two opposite sides of the container handling vehicle and calculate a travel distance for the movable load corresponding to the change in mass, and instruct the load moving device to move the movable load the calculated travel distance in an opposite direction of a relatively heavier side of the container handling vehicle.

25. A method of loading a storage container between a stacked position in an automated storage and retrieval system and a storage position on a container handling vehicle for operation on a two-dimensional rail system comprising a first set of parallel rails arranged to guide movement of container handling vehicles in a first direction across a top of a frame structure, and a second set of parallel rails arranged perpendicular to the first set of rails to guide movement of the container handling vehicles in a second direction which is perpendicular to the first direction, the first and second sets of parallel rails forming a grid which divides the rail system into a plurality of grid cells, wherein the container handling vehicle comprises:

a base comprising moving means for guiding the container handling vehicle along the rail system in the first direction and the second direction respectively;

a support structure provided on the base, the support structure extending from a lower section at the base to an upper section;

a container lifting device comprising a lifting frame for lifting a storage container up from a storage position below the rail system, the lifting frame being suspended from a set of suspension points of the upper section of the support structure;

a support surface for supporting the storage container, the support surface providing a first holding position arranged at a lower elevation than the lifting frame when the lifting frame is in a docked state adjacent the upper section of the support structure;

and a movement mechanism configured to move the set of suspension points with respect to the base, wherein the set of suspension points and the lifting frame are configured to place a lifted storage container on the support surface, and the lifting frame is configured to disconnect from the lifted storage container once it is placed on the support surface, wherein the base is in the form of a wheel base unit where the moving means comprise a first set and a second set of wheels which form outer peripheries of a footprint of the wheel base unit;

a lower section which is provided on the wheel base unit, the lower section having a footprint with a horizontal extent which is equal to or less than the footprint of the wheel base unit, the lower section having an upper surface, wherein the upper surface provides the support surface;

a support section forming the support structure and extending vertically from the lower section, the support section having a footprint with a horizontal extent which is smaller than the footprint of the lower section; and a cantilever section forming the upper section and extending horizontally from the support section beyond the footprint of the lower section;

wherein the support section comprises a through-going opening for moving the support surface or the lifting frame therethrough;

wherein the method comprises:

picking up the storage container from the stacked position that is located below the rail system using the lifting frame of the lifting device; and placing the storage container onto the support surface of the container handling vehicle and disconnecting the lifting frame from the storage container.

26. The method according to claim 25, wherein the method further comprises:

moving the picked storage container by using the movement mechanism to translate horizontally the set of suspension points with respect to the base.

27. An automated storage and retrieval system comprising a two-dimensional rail system comprising a first set of parallel rails arranged to guide movement of container handling vehicles in a first direction across a top of a frame structure, and a second set of parallel rails arranged perpendicular to the first set of rails to guide movement of the container handling vehicles in a second direction which is perpendicular to the first direction, the first and second sets of parallel rails forming a grid which divides the rail system into a plurality of grid cells, wherein the automated storage and retrieval system comprises at least one container handling vehicle, wherein the at least one container handling vehicle comprises:

a base comprising moving means for guiding the at least one container handling vehicle along the rail system in the first direction and the second direction respectively;

a support structure provided on the base, the support structure extending from a lower section at the base to an upper section;

a container lifting device comprising a lifting frame for lifting a storage container up from a storage position below the rail system, the lifting frame being suspended from a set of suspension points of the upper section of the support structure;

a support surface for supporting the storage container, the support surface providing a first holding position arranged at a lower elevation than the lifting frame when the lifting frame is in a docked state adjacent the upper section of the support structure;

and a movement mechanism configured to move the set of suspension points with respect to the base, wherein the set of suspension points and the lifting frame are configured to place a lifted storage container on the support surface, and the lifting frame is configured to disconnect from the lifted storage container once it is placed on the support surface, wherein the base is in the form of a wheel base unit where the moving means comprise a first set and a second set of wheels which form outer peripheries of a footprint of the wheel base unit;

a lower section which is provided on the wheel base unit, the lower section having a footprint with a horizontal extent which is equal to or less than the footprint of the wheel base unit, the lower section having an upper surface, wherein the upper surface provides the support surface;

a support section forming the support structure and extending vertically from the lower section, the support section having a footprint with a horizontal extent which is smaller than the footprint of the lower section; and a cantilever section forming the upper section and extending horizontally from the support section beyond the footprint of the lower section;

wherein the support section comprises a through-going opening for moving the support surface or the lifting frame therethrough.

28. The automated storage and retrieval system according to claim 27, further comprising:

a plurality of stacks of storage containers below the grid cells.

29. The automated storage and retrieval system according to claim 27, wherein the system further comprises a control system configured to receive information concerning a footprint of the at least one container handling vehicle and use said information for controlling the system.

* * * * *